United States Patent
Carlson et al.

(10) Patent No.: US 6,724,512 B2
(45) Date of Patent: Apr. 20, 2004

(54) OPTICAL SWITCH DEVICE

(75) Inventors: Steven A. Carlson, Cambridge, MA (US); Arthur W. Berger, Cambridge, MA (US)

(73) Assignee: Optodot Corporation, Boston, MA (US)

(*) Notice: Subject to any disclaimer, the term of this patent is extended or adjusted under 35 U.S.C. 154(b) by 217 days.

(21) Appl. No.: 10/024,060

(22) Filed: Dec. 18, 2001

(65) Prior Publication Data

US 2002/0141029 A1 Oct. 3, 2002

Related U.S. Application Data

(63) Continuation-in-part of application No. 09/852,392, filed on May 9, 2001, now Pat. No. 6,583,916, which is a continuation-in-part of application No. 09/706,166, filed on Nov. 3, 2000, now Pat. No. 6,381,059.
(60) Provisional application No. 60/163,349, filed on Nov. 3, 1999.

(51) Int. Cl.$^7$ .............................. G02F 1/03; F21V 9/00
(52) U.S. Cl. ...................... 359/244; 359/885; 252/582; 252/587; 398/45; 398/79
(58) Field of Search ................................ 359/244, 252, 359/254, 290, 294, 321, 322, 320, 328, 884, 885; 385/16, 18, 140; 252/582, 587; 398/45, 47, 48, 49, 79

(56) References Cited

U.S. PATENT DOCUMENTS

| | | |
|---|---|---|
| 4,750,802 A | 6/1988 | Bhagavatula |
| 5,091,984 A | 2/1992 | Kobayashi et al. |
| 5,406,407 A | 4/1995 | Wolff |
| 5,539,100 A | 7/1996 | Wasielewski et al. |
| 5,635,729 A * | 6/1997 | Griessen et al. ............... 257/2 |
| 5,732,168 A | 3/1998 | Donald |
| 5,740,287 A | 4/1998 | Scalora et al. |
| 5,828,799 A | 10/1998 | Donald |
| 5,841,912 A | 11/1998 | Mueller-Fiedler et al. |
| 5,905,587 A | 5/1999 | Maeno et al. |
| 5,923,798 A | 7/1999 | Aksyuk et al. |
| 5,943,157 A | 8/1999 | Florence et al. |
| 5,943,453 A | 8/1999 | Hodgson |
| 5,959,749 A | 9/1999 | Danagher et al. |
| 5,960,133 A | 9/1999 | Tomlinson |
| 5,970,185 A | 10/1999 | Baker et al. |
| 5,995,695 A | 11/1999 | Aikawa et al. |
| 6,121,075 A | 9/2000 | Yamashita |
| 6,165,389 A * | 12/2000 | Asher et al. ............... 252/582 |
| 6,172,795 B1 | 1/2001 | Carlson |
| 6,204,517 B1 | 3/2001 | Wu |
| 6,211,013 B1 | 4/2001 | Park et al. |
| 6,307,422 B1 | 10/2001 | Roesner et al. |
| 6,480,309 B1 * | 11/2002 | Lee et al. ............... 398/45 |
| 6,583,916 B2 | 6/2003 | Carlson et al. |

FOREIGN PATENT DOCUMENTS

WO    WO9854615    1/2001

\* cited by examiner

Primary Examiner—Georgia Epps
Assistant Examiner—Tuyen Tra
(74) Attorney, Agent, or Firm—Richard L. Sampson, Esq.; Steven A. Carlson

(57) ABSTRACT

The present invention pertains to an optical shutter comprising an organic free radical compound, wherein the optical shutter is reversibly imageable to switch between a non-reflective and transparent state and a reflective state. This switching may be induced by the absorption of photons, the application of an electric current, or thermally. Preferably, the organic free radical compound is a salt of an aminium radical cation. Also provided are optical switch devices and optical buffers comprising such optical shutters, methods of switching an optical signal utilizing such optical shutters and switch devices, and methods of storing an optical signal utilizing such optical buffers.

45 Claims, 21 Drawing Sheets

OPTICAL SWITCH DEVICE

RELATED APPLICATIONS

This application is a continuation-in-part of U.S. patent application Ser. No. 09/852,392, filed May 9, 2001 now U.S. Pat. No. 6,583,916, which is a continuation-in-part of U.S. patent application Ser. No. 09/706,166, filed Nov 3, 2000 now U.S. Pat. No. 6,381,059, which claims priority to U.S. Provisional Patent Application No. 60/163,349, filed Nov. 3, 1999 and which relates to U.S. patent application Ser. No. 09/705,118, filed Nov. 2, 2000 now U.S. Pat. No. 6,589,451, all to the common assignee, the disclosures of which related applications are fully incorporated herein in their entirety for all purposes.

FIELD OF THE INVENTION

The present invention relates generally to the field of optical shutters and switches, and particularly, pertains to optical shutters and switches which operate in the near-infrared and/or visible wavelength regions. More specifically, this invention pertains to optical shutters, switches and buffers comprising a reversible non-reflective-to-reflective optical shutter. This invention also pertains to methods of buffering or storing an optical signal by utilizing the optical shutters and switches of this invention.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optic systems rapidly increases due to the growing demand from Internet usage and other communications, improved all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in improved all-optical switches.

An all-optical switch provides switching of an optical signal from one input path to a selected one of a plurality of different output paths without any intermediate conversion of the optical signal to an electrical signal. This is typically accomplished by applying an electrical signal to a switchable element to cause the optical signal to be selectively switched. These electro-optic switches are responsive to the electrical signal to selectively switch the light of the optical signal from the input path to the selected one of the output paths.

A variety of approaches are known for making all-optical or hybrid optical switches, such as, for example, described in U.S. Pat. No. 5,905,587 to Maeno, et al.; U.S. Pat. No. 5,923,798 to Aksyuk, et al.; U.S. Pat. No. 5,970,185 to Baker, et al.; U.S. Pat No. 5,841,912 to Mueller-Fiedler, et al.; U.S. Pat. No. 5,091,984 to Kobayashi, et al.; U.S. Pat. No. 5,406,407 to Wolff; U.S. Pat. No. 5,740,287 to Scalora, et al.; U.S. Pat. No. 5,960,133 to Tomlinson; U.S. Pat. No. 5,539,100 to Wasielewski, et al.; and U.S. Pat. No. 5,943,453 to Hodgson.

The need for improved optical switches is increased by the use of wavelength multiplexing which converts the optical signal in the optical fiber into, for example, 16 signals at 16 different wavelengths in a near-infrared range of about 1540 to 1560 nm, as, for example, described in *Bell Labs Technical Journal,* January–March 1999, pages 207 to 229, and references therein, by Giles, et al.; and in U.S. Pat. No. 5,959,749 to Danagher, et al. The primary function of the optical switch is to add and/or drop optical signals from the multiple wavelengths traveling through the optical fiber. It would be highly desirable to have arrays of optical switches to handle the optical signals from multiple wavelengths per optical fiber and from multiple optical fibers, such as up to 100×100 or greater optical switch arrays. Also, it would be highly desirable if the response time for the optical switch is ultrafast, such as 1 nanosecond or less.

It would be advantageous if an all-optical switching system were available which avoided the complexity and cost of optical-electrical-optical (so-called O-E-O) switching systems, conventional electro-optic and other all-optical switching systems while increasing the speed of the optical signal switching times from the millisecond range to the nanosecond or picosecond ranges. It would be further advantageous if an all-optical switching system were available which minimized or eliminated contention among optical signals in fiber optic systems by providing an optical buffer to temporarily store an optical signal for a desired time.

SUMMARY OF THE INVENTION

One aspect of this invention pertains to an optical shutter having a first state of a low reflectivity at a range of wavelengths and a second state of a high reflectivity at the range of wavelengths, wherein the optical shutter in the second state comprises an organic free radical compound. In one embodiment, the first state is transparent at the range of wavelengths. In one embodiment, the second state is opaque at the range of wavelengths. In one embodiment, the second state is transparent at the range of wavelengths.

In one embodiment of the optical shutters of this invention, the shutter comprises a first surface layer in the second state, a second surface layer in the second state, and optionally a photon-absorbing layer in an opaque state at the range of wavelengths and interposed between the first and second surface layers, wherein the optical shutter absorbs photons or alternatively, an electrical current is applied, to change at least one of the first and second surface layers to the first state of low reflectivity and to change the optional photon-absorbing layer, if present, to a transparent state at the range of wavelengths; and wherein the optical shutter is reversibly imageable between the first and second states. In one embodiment, the optical shutter absorbs photons to change both of the first and second surface layers to the first state. In one embodiment, the optical shutter responds to the application of an electric current to change both of the first and second surface layers to the first state. In one embodiment, the changes in reflectivity of the first and second surface layers occur at the same time. In one embodiment, one or both of the first and second surface layers of the optical shutter in the second state comprise an organic free radical compound. In one embodiment, the organic free radical compound is reflective at the range of wavelengths.

In one embodiment of the optical shutter of this invention, the imaging from the first state to the second state occurs with no external energy. In one embodiment, the imaging from the first state to the second state is induced by heat. In one embodiment, the imaging from the first state to the second state is induced by absorption of photons from one or more wavelength ranges selected from the group consisting of ultraviolet wavelength ranges, visible wavelength ranges, and infrared wavelength ranges. In one embodiment, the imaging from the first state to the second state is induced by applying an electric current to the optical shutter.

In one embodiment of the optical shutter of the present invention, the optical shutter comprises one or more external energy source elements to provide energy to switch the optical shutter, wherein the one or more external energy source elements are selected from the group consisting of electrical current source elements, heating source elements, ultraviolet light source elements, visible light source elements, and infrared radiation source elements. In one embodiment, the one or more external energy source elements are connected to a control circuit device that monitors the desired timing for providing the energy and delivers a signal to the one or more external sources of energy to provide the energy to the optical shutter.

Another aspect of the present invention pertains to an optical buffer for storing an optical signal for a desired time, which optical buffer comprises two or more optical shutters positioned at one or more first distances and one or more first angles from each other, wherein the two or more optical shutters are imageable and have a first state of a low reflection, such as, for example, no reflection or a reflectance less than 1%, at a wavelength, and a second state of a high reflection, such as, for example, a reflectance greater than 3% or a reflectance greater than 95% at the wavelength, and wherein the two or more optical shutters are reversibly imageable between the first and second states. In one embodiment, at least two of the two or more optical shutters are interposed between an input optical path for the optical signal and an output optical path for the optical signal, and wherein a first imaging between the first and second states of at least one of the at least two of the two or more optical shutters directs the optical signal into storage in an optical buffer path between the input and output optical paths and wherein a subsequent imaging between the first and second states of at least one of the at least two of the two or more optical shutters directs the optical signal from the optical buffer path into the output optical path. In one embodiment, the wavelength is a near-infrared wavelength. In one embodiment, at least one of the two or more optical shutters is interposed between an input optical path for the optical signal and an output optical path for the optical signal, and wherein a first imaging between the first and second states of at least one of the two or more optical shutters directs the optical signal into storage in an optical buffer path between the input and output optical paths and wherein a subsequent imaging between the first and second states of at least one of the two or more optical shutters directs the optical signal from the optical buffer path into the output optical path. In one embodiment, the two or more optical shutters of the optical buffer comprise optical shutters of this invention, as described herein.

Still another aspect of this invention pertains to a method of storing an optical signal in an optical buffer for a desired time, which method comprises the steps of (i) providing one or more optical shutters interposed between an input optical path for the optical signal and an output optical path for the optical signal, wherein the one or more optical shutters are imageable and have a first state of a low reflection at a wavelength and a second state of a high reflection at the wavelength, and wherein the one or more optical shutters are reversibly imageable between the first and second states; (ii) imaging at least one of the one or more optical buffers between the first and second states to direct the optical signal into storage in an optical buffer path between the input and output optical paths; and (iii) subsequently imaging at least one of the one or more optical shutters between the first and second states to direct the optical signal from storage in the optical buffer path into the output optical path. In one embodiment, the one or more optical shutters comprise optical shutters of the present invention, as described herein.

As will be appreciated by one of skill in the art, features of one aspect or embodiment of the invention are also applicable to other aspects or embodiments of the invention.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
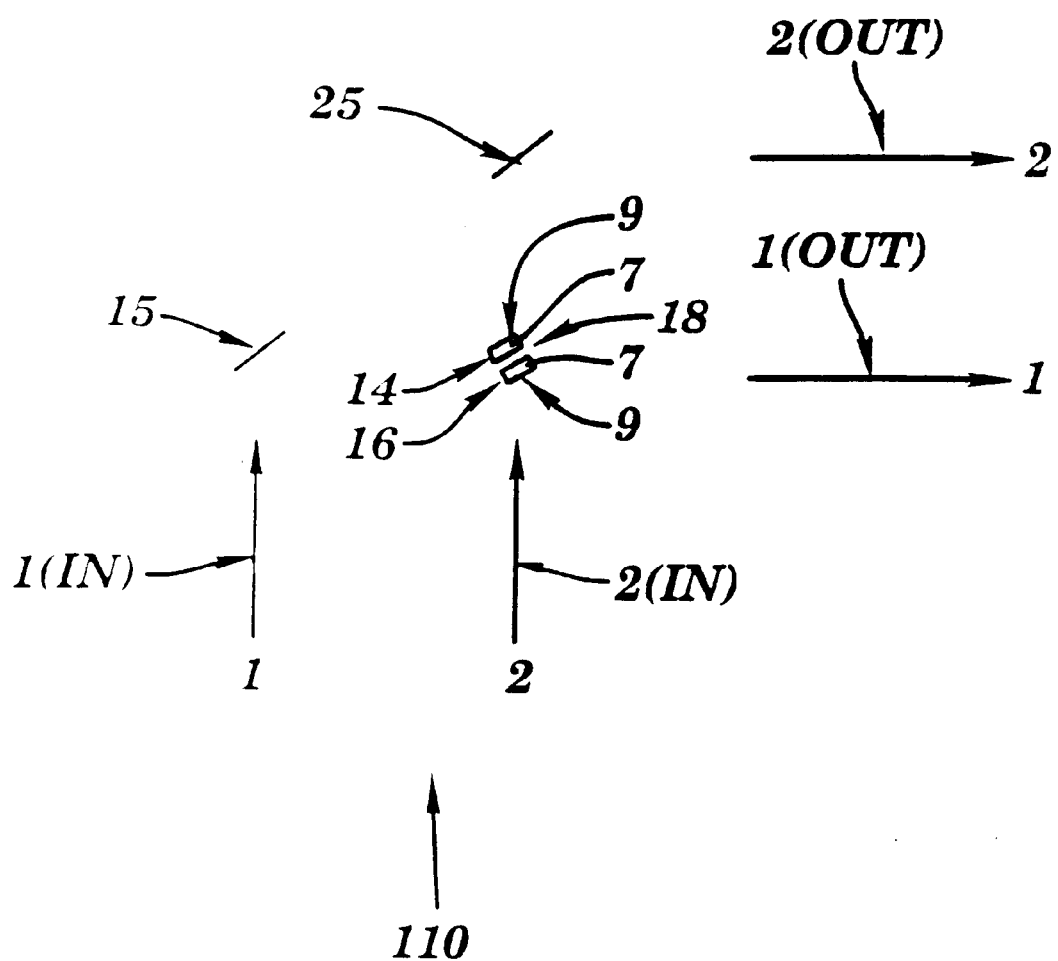
FIG. 1 shows one embodiment of an optical switch device utilizing the optical shutters of the present invention.

The optical shutters, switch devices, and buffers of the present invention provide dynamic and flexible response to the incident optical signals, and are particularly useful in resolving contention among optical signals in all-optical systems.

Organic Free Radical Compounds

The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the optical shutters, switch devices, and buffers of the present invention include neutral organic free radicals, salts of organic free radical cations, and salts of organic free radical anions. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. Similarly, the terms "organic free radical anion," "organic radical anion," and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the optical shutters, switch devices, and buffers of this invention include, but are not limited to, salts of aminium radical cations, such as, for example, tris (p-dibutylaminophenyl) aminium hexafluoroantimonate, which is commercially available as IR-99, a trademark for a dye available from Glendale Protective Technologies, Inc., Lakeland, Fla. An equivalent chemical name for IR-99, used interchangeably herein, is the hexafluoroantimonate salt of N,N-dibutyl-N',N'-bis[4-(dibutylamino)phenyl]-1,4-benzenediamine radical cation. IR-99 is known to be a stable material that may exist in a layer of material, such as in a polymeric coating, under normal room conditions for an extended period of time. Other suitable salts of aminium radical cations with a tris(p-dibutylaminophenyl) aminium salt related molecular structure include IR-126 and IR-165, which are trademarks for dyes available from Glendale Protective Technologies, Inc., Lakeland, Fla. These two dyes are likewise known to be stable in the dry powder form and in a layer of material, such as in a polymer-containing coating, under ambient room conditions for extended periods of time, such as for many years.

IR-126, which is the hexafluoroantimonate salt of tetrakis [4-(dibutylamino)phenyl]-1,4-benzenediamine radical cation, is particularly preferred for use in reversible transparent-to-opaque imaging layers in the optical shutters, switch devices, and buffers of this invention because of its very intense and relatively flat absorption across the 1400 to 1700 nm wavelength region typically utilized for optical Internet fiber optic communication channels and because of its one-electron reduction to a very transparent neutral non-free radical compound which has no significant absorption above 500 nm. Also, IR-126 may undergo a one-electron oxidation to IR-165, which has a much lower absorption in the 1500 to 1700 nm wavelength region.

A pure dye layer of IR-165 on a poly(ethylene terephthalate) (PET) plastic film was found to be reflective in the infrared, including over the 1400 to 1700 nm wavelength region. Although a pure dye layer of IR-126 on PET plastic film showed no significant reflectance in the infrared, IR-99 was found to have reflectance across the 1250 to 1700 nm wavelength region even though the IR-99 layer showed no significant absorption at wavelengths of 1250 nm and higher. Thus, certain organic free radical compounds, such as IR-99 and IR-165 aminium salts, show reflectance in the visible and/or infrared wavelength regions and, due to their reversible one-electron and two-electron reactions to form non-reflective products, are suitable for use in the reversible non-reflective-to-reflective switching of the optical shutters, switch devices, and buffers of this invention. Preferred are organic free radical compounds, such as IR-99, which are reflective and transmissive but not absorptive in the wavelength region of interest for the particular application, such as, for example, 1250 to 1700 nm for optical Internet applications.

Examples of suitable salts of organic free radical anions for the optical shutters, switch devices, and buffers of the present invention include, but are not limited to, salts of anthrasemiquinone radical anions, such as, for example, described in *Photochemistry and Photobiology*, Vol. 17, pages 123–131 (1973) by Carlson and Hercules.

For example, under reductive conditions, a light tan layer comprising IR-165 upon laser exposure at 1065 nm may undergo photo-induced electron transfer reactions which compete efficiently with the ultrafast photothermal processes of IR-165 to produce a reduced product having a change in absorption in both the visible and the near-infrared wavelength regions. The reduced product of IR-165 may be an intense yellow-green compound from an one-electron photo-induced electron transfer reaction, particularly when the layer of IR-165 comprises a polymer which does not promote oxidation or protonation of IR-165 upon exposure to radiation. The yellow-green, reduced product of IR-165 has new intense absorption peaks at 950 nm and 1480 nm, in comparison to the absorption of IR-165. One of the yellow-green, reduced products of IR-165 is IR-126, which is an one-electron reduction product of IR-165. Depending on the other materials present in the layer, these yellow-green reduced compounds may be transient compounds and may thermally revert to the starting IR-165 material at various speeds from less than 0.1 milliseconds to many seconds. A photo-induced reaction may be utilized to accelerate the reversion back to the starting IR-165 material.

Also, for example, layers comprising salts of anthrasemiquinone radical anions, including the many possible substituted and other derivatives of the anthrasemiquinone radical anion, may undergo photo-induced electron transfer reactions which occur very rapidly and compete efficiently with the photothermal processes of these radical anions, to produce a reduced product having a change in absorption in both the visible and the near-infrared wavelength regions. This change in absorption typically includes a loss in absorption in the near-infrared wavelength region due to the conversion of the radical anion to a non-free radical compound, such as, for example, to a dianion.

Optical Shutters and Switch Devices

One aspect of the present invention pertains to an optical shutter comprising an organic free radical compound in which the free radical compound forms an oxidized or a reduced product having a change in absorption and/or reflectivity in a visible and/or a near-infrared wavelength region as a result of a photo-induced and/or electric current-induced reaction of the free radical compound, preferably an electron transfer reaction of the free radical compound.

Another aspect of the present invention relates to an optical shutter having a first state of a low reflectivity at a range of wavelengths and a second state of a high reflectivity at the range of wavelengths, which optical shutter comprises an organic free radical compound in at least one of the first and second states; and wherein the optical shutter is imageable between the first and second states.

Still another aspect of this invention pertains to an optical shutter having a first state of a low reflectivity at a range of wavelengths and a second state of a high reflectivity at the range of wavelengths, wherein the optical shutter in the second state comprises an organic free radical compound. In one embodiment, the first state is transparent at the range of wavelengths. In one embodiment, the second state is opaque at the range of wavelengths. In one embodiment, the second state is transparent at the range of wavelengths.

In one embodiment of the optical shutter of this invention, the optical shutter comprises a first surface layer in the second state, a second surface layer in the second state, and optionally a photon-absorbing layer in an opaque state and interposed between the first and second surface layers, wherein the optical shutter absorbs photons or alternatively, adds electrons by applying an electric current, to change at least one of the first and second surface layers to the first state of low reflectivity and to change the optional photon-absorbing layer, if present, to a transparent state at the range of wavelengths. In one embodiment, the optical shutter is reversibly imageable between the first and second states. In one embodiment, the optical shutter absorbs photons to change both of the first and second surface layers to the first state of low reflectivity. In one embodiment, the changes in reflectivity of the first and second surface layers occur at the same time. In one embodiment, one or both of the first and second surface layers of the optical shutter in the second state comprise an organic free radical compound. In one embodiment, the organic free radical compound is reflective at the range of wavelengths. In one embodiment, the first and second surface layers are in direct contact to the photon-absorbing layer. In one embodiment, at least one of the first and second surface layers is not in direct contact to the photon-absorbing layer. In one embodiment, the optical shutter comprises two or more photon-absorbing layers interposed between the first and second surface layers. In one embodiment, the first surface layer is in direct contact to a first one of the two or more photon-absorbing layers and the second surface layer is in direct contact to a second one of the two or more photon-absorbing layers. In one embodiment, the photon-absorbing layer comprises an organic free radical compound and absorbs photons to form a reaction product having a change in absorption at the range of wavelengths. In one embodiment, the absorption of photons images the optical shutter from the second state to the first state, and, preferably, the reaction product is formed from the free radical compound.

The terms "near-infrared wavelength region," "near-infrared wavelength," and "near-infrared," as used interchangeably herein, pertain to wavelengths from 700 nm to 2000 nm. The terms "visible wavelength region," "visible wavelength," and "visible," as used interchangeably herein, pertain to wavelengths from 400 to 700 nm. In one embodiment, the free radical compound is a salt of a radical cation, preferably of an aminium radical cation, and most preferably, the radical cation is tris(p-dibutylaminophenyl) aminium hexafluoroantimonate (TAH). In a preferred embodiment, the free radical compound is a salt of a tetrakis[4-(dialkylamino)phenyl]-1,4-benzenediamine radical cation, such as, for example, the hexafluoroantimonate salt of tetrakis[4-(dibutylamino)phenyl]-1,4-benzenediamine radical cation. Besides n-butyl groups, other suitable alkyl groups include any of the alkyl groups, such as, for example, methyl, ethyl, 2-propyl, n-pentyl, and n-hexyl, and combinations thereof. In one embodiment, the organic free radical compound is a salt of a radical anion, preferably of an anthrasemiquinone (ASQ) radical anion.

In one embodiment, the optical shutter of this invention comprises a surface layer having a first state of a low reflectivity, such as a 45° or other angle of reflectivity of less than 1% at a range of wavelengths and preferably of 0%, wherein the optical shutter absorbs photons by the presence of an organic free radical compound or of another photon-absorbing compound to form a second state of a high reflectivity, such as a 45° or other angle of reflectivity of more than 3%, preferably more than 80%, more preferably more than 90%, and most preferably more than 95%, at the range of wavelengths; and wherein the optical shutter is reversibly imageable between the first and second states of low and high reflectivity, respectively. Preferably, the surface layer is on the side of the optical shutter through which the photons enter to be absorbed to form a reaction product. In one embodiment, the absorption of photons or, alternatively the application of an electric current, images the optical shutter from the first state to the second state, and preferably, the reaction product is an organic free radical compound. In one embodiment, the absorption of photons or, alternatively the application of an electric current, images the optical shutter from the second state to the first state, and preferably, the reaction product is formed from an organic free radical compound. In one embodiment, the absorption of photons or, alternatively the application of an electric current, reversibly images the optical shutter between the first and second states.

Suitable materials for the surface layer include, but are not limited to, metals that melt at a temperature above 25° C. and below 700° C., and preferably below 200° C. The surface layer may include an organic free radical compound selected for efficient photon-to-heat conversion and other organic materials, such as, for example, those that undergo a rapid reversible melt-solidification process that enhances the reversible speed and the per cent reflectivity of the high reflectivity state. Also, for example, the surface layer may include a thermochromic compound, such as, for example, a vanadium (IV) oxide that reversibly changes between a transparent state and a reflective and opaque state at about 68° C. A metallized layer on at least one side of the photon-absorbing layer may enhance the efficiency of the reversible imaging.

In a preferred embodiment of the optical shutter of this invention, the surface layer of the optical shutter comprises an organic free radical compound that is reflective and reversibly images between a non-reflective state and a reflective state. In one embodiment, the optical shutter comprising the organic free radical compound that is reflective is imaged from the second state to the first state by the absorption of photons and, preferably, the reaction product in the first state is formed from the reflective free radical compound. In one embodiment, the optical shutter comprising the organic free radical compound that is reflective is imaged from the second state to the first state by applying an electric current.

The optical shutter of the present invention may be utilized in a variety of product applications. In one embodiment, the optical shutter is utilized in an optical switch device for a fiber optic communications channel. In one embodiment, the optical shutter is utilized in an optical buffer for a fiber optic communications channel.

In one embodiment, the range of wavelengths is from 400 to 2000 nm. In one embodiment, the range of wavelengths is from 1000 to 1700 nm. In one embodiment, the range of wavelengths is from 1400 to 1700 nm. In one embodiment, the range of wavelengths is from 1500 to 1700 nM.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In one embodiment of the optical shutter of this invention, the electron transfer reaction induced by applying an electric current occurs in less than 1 microsecond after applying the electric current through the optical shutter, preferably occurs in less than 1 nanosecond, more preferably occurs in less than 0.1 nanoseconds, and most preferably occurs in less than 0.01 nanoseconds.

In one embodiment of the optical shutter of the present invention, the electron transfer reaction, whether induced by photons, by applying an electric current, or thermally, is an oxidation or a reduction of the organic free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound. For example, the oxidation product of a radical cation may be a diradical dication which may readily undergo reverse electron transfer reactions to regenerate the radical cation. Also, for example, the reduction product of a radical anion may be a dianion which may readily undergo reverse electron transfer reactions to regenerate the radical anion and, in the case of an ASQ radical anion and the corresponding dianion, this could involve the controlled presence of oxygen during the reverse electron transfer reaction. Also, for example, the electron transfer reaction may involve the reversible transfer of an electron from the anion of the salt of a radical cation to the radical cation moiety.

In one embodiment, the wavelength range of the photons absorbed to form the electron-transfer reaction product comprises one or more ultraviolet wavelengths. In one embodiment, the wavelength range of the photons absorbed to form the reaction product comprises one or more wavelengths from 400 to 700 nm. In one embodiment, the wavelength range of the photons absorbed to form the reaction product comprises one or more wavelengths from 700 to 2000 nm.

In one embodiment of the optical shutter of the present invention, the photo-induced electron transfer reaction is induced by ultraviolet radiation. In one embodiment, the photo-induced electron transfer is induced by visible radiation, and preferably is induced by near-infrared radiation. In one embodiment, the photo-induced electron transfer reaction is induced by absorption of photons by a free radical ground state of the free radical compound. This is particularly important where the excited states of the free radical moiety ground state of the free radical compound can not be efficiently populated by absorption by a non-free radical ground state, such as, for example, by an aromatic moiety ground state, and by its subsequent internal conversion to a lower excited state related to the free radical moiety ground state.

A wide variety of organic free radical compounds, such as various neutral free radicals, salts of radical cations, and salts of radical anions, may be utilized in the optical shutters of the present invention. Particular advantages for the use of organic free radical compounds in the optical shutters of this invention include, but are not limited to, their extremely intense near-infrared absorptions and/or reflectivities at the desired wavelengths for optical Internet and other applications; their large absorption and/or reflectivity changes over a broad range of wavelengths; their extremely transparent and non-reflective states in the near-infrared when switched by the transfer of one or more electrons by the absorption of photons, by applying an electric current, and thermally; their unique ultra-high speed photon conversions at as fast as sub-picosecond times; their stability to degradation by heat, light, or ambient conditions of moisture and air; their ease of fabrication by, for example, coating or plastic molding; and their non-toxicity.

Their extremely intense absorptions and/or reflectivities are particularly beneficial in reducing the amount of material that is needed to produce the desired reversible change in the optical shutter and thereby allow the optical shutter to be made on a very miniature scale, such as less than 8 microns for the thickness of the optical shutter which causes the reflectivity and/or absorption change. This layer may be made much thicker than 8 microns if desired in the fabrication of the optical shutter for use in optical switch devices and other optical components, but the amount of the organic free radical compound used may be kept small since the thicker layers do not need to contain any additional organic free radical compound to maintain the desired level of absorption and/or reflection changes. In one embodiment, the thickness of the reflective surface layer of the optical shutters of this invention is 0.1 to 100 microns. In one embodiment, the thickness of the reflective surface layer is 0.2 to 8 microns. In one embodiment, the thickness of the reflective surface layer is 0.4 to 1 micron.

For example, IR-165 and IR-126 are illustrative of one type of the organic free radical compounds for the optical shutters of this invention and may be reversibly formed in a photon-induced one electron transfer reaction, where IR-126 is the one-electron reduction product of IR-165 and, conversely, IR-165 is the one-electron oxidation product of IR-126. IR-165 has an extremely high molar extinction coefficient of about 80,000 liters/mole-cm at 1065 nm where photon excitation may be done and has low molar extinction coefficients of less than about 5,000 liters/mole-cm in the 1530 to 1620 nm range where optical shutters may be utilized in optical switch devices and other optical components in a fiber optic communications channel. Also, IR-165 has reflectance in the infrared region, including in the 1400 to 1700 nm range of wavelengths. IR-126 has a very high molar extinction coefficient of about 40,000 liters/mole-cm in a broad and relatively flat absorption across the 1530 to 1620 nm wavelength range, as well as absorbing at about this same molar extinction coefficient down to about 900 nm and also absorbing out to above 2000 nm. Also, IR-126 does not have significant reflectance in the visible and near-infrared regions.

Assuming that IR-126 is present at about a 25% loading by weight in a photon-absorbing layer of the optical shutter and needs to have an optical density of greater than 3.1 in order to provide greater than 99.9% absorption at the wavelengths in the 1530 to 1620 nm range to obtain the contrast ratio of greater than 30 dB that is desired in an optical shutter in a fiber optic communications channel, the photon-absorbing layer containing IR-126 only needs to be about a minimum of 4 microns thick in the direction that the optical signal travels. Since the optical signals are typically traveling in only one plane of the optical shutter, the dimensions of the optical shutter perpendicularly to this plane may be significantly less or greater than the thickness traveled by the optical signal through the optical shutter. For example, in the case where a source of photons is utilized to switch the optical shutter and is provided from a direction above and/or below the plane of the optical shutter traveled by the optical signals, the optical density may be, for example, only about 1.0 with a thickness of the photon-absorbing layer in that direction of about 1.3 microns when the loading of IR-126 is 25% by weight. When the loading of the compound whose absorption is switching in the optical shutter of this invention is increased or decreased, the dimensions of the photon-absorbing layer may be correspondingly decreased or increased. In the case where IR-126 switches by a reversible one-electron reduction to a highly transparent non-free radical amine, the ability to achieve a contrast ratio of greater than about 1000 or about 30 dB is particularly enhanced.

Assuming, for example, a 25% loading of IR-126 in a photon-absorbing layer of the optical shutter of the present invention with about a 4 micron thickness of the photon-absorbing layer in the direction that the optical signals travel and about a 1.3 micron dimension in the perpendicular directions to the optical signal path, one form for the optical shutter would be a cylinder. The optical signals could pass through the cylinder in the direction of the axis of the cylinder, and the source of photons would be directed at the sides of the cylinder. In the optical shutters comprising a surface layer on each side of the photon-absorbing layer in the direction that the optical signals pass, it is advantageous to keep the thickness of the photon-absorbing layer in this optical signal direction as low as possible so that light reflected off both these surface layers in the reflective state may be collected in the selected output optical path with an efficiency similar to that when the light of the optical signal passes through the optical shutter in its transparent state to another output optical path.

In the case where the surface layers in the reflective state comprise an organic free radical compound having reflectance, such as, for example, IR-99 or IR-165, the surface layer may be comprised of a single reflective layer or of multiple reflective layers with non-reflective layers interposed between the reflective layers to make a reflective stack with individual reflective layers. Even when a reflective stack with multiple reflective layers, such as, for example, 10 individual reflective layers, is present, the overall thickness of the reflective surface layers may be 4 microns or less, since the individual reflective layers of the organic free radical compounds may have a thickness in the range, for example, of only about 0.1 to 0.3 microns and the non-reflective layers between the reflective layers may also have a thickness in the range, for example, of only about 0.1 to 0.3 microns.

To aid in this efficient collection of the optical signal into the output optical path, a variety of light collection elements, such as, for example, a focusing lens for an optical shutter in a free space configuration or a tapered waveguide of greater dimensions next to the reflective surface area in a waveguide configuration, may be utilized with the optical shutters and switch devices of the present invention.

Also, for example, since each optical shutter in this case would contain about $2 \times 10^{-12}$ grams of IR-126, less than 1 microgram of IR-126 would be needed to make approximately 16,000 optical shutters, such as might be utilized in a 1200×1200 optical switch device. Also, for example, in a case where IR-99 is utilized as a switchable reflective-to-non-reflective material in the surface layers of the optical shutter, the amount of IR-99 in each optical shutter would be in the same range as described above for IR-126. Also, for example, due to the extremely small size of the optical shutters, a 1200×1200 optical switch device could have a volumetric size as small as 0.001 cm$^3$ or even smaller, although a larger size might be selected for ease of fabrication and integration with the source of photons, electric current, and other energy sources to provide switching and for the ease of integration with other optical components.

While not wishing to be bound by any particular theory, the unique ultra-high speed photon conversions of the organic free radical compounds, such as at sub-picosecond speeds, are thought to be greatly influenced by the unique free radical character of their ground states and perhaps of their excited states. Picosecond and sub-picosecond speeds are particularly useful for optical shutters where, for example, nanosecond optical switching of optical data packets is desired, as known in the art of fiber optic communications channels, and, also for example, where protection of eyes or sensors from radiation is desired in a picosecond or faster speed.

The optical shutter of the present invention may be illustrated in one embodiment by an optical shutter comprising a photon-absorbing layer, wherein the photon-absorbing layer comprises IR-165, a salt of an organic radical cation. The thickness of the photon-absorbing layer is 4 microns, and the IR-165 is present at 25 weight per cent of the photon-absorbing layer. This optical shutter is imageable by photons, such that, for example, when IR-165 in the photon-absorbing layer absorbs photons of 1065 nm wavelength and the photon-absorbing layer comprises a reductive, electron-donating matrix of polymers, counteranions, and other additives around the aminium radical cation, IR-165 forms a reaction product, such as an one-electron reduction product which is the same as or similar to IR-126 depending on the counteranion. Prior to the absorption of photons, the optical shutter has a state of low absorption, such as an optical density of less than 0.05 due to IR-165, at a wavelength, such as 1620 mn. After the absorption of photons and the formation of the reaction product, the optical shutter has a state of high absorption, such as an optical density of 3.1 due to IR-126 or a similar organic free radical compound, at the wavelength, such as 1620 mn. Subsequently, by a dark reaction at ambient or room temperatures or at temperatures less than 50° C. in the absence of radiation, the reaction product, such as IR-126 or a similar organic free radical compound, undergoes a reverse reaction to regenerate the starting free radical compound, IR-165, and to return the optical shutter to the state of low absorption at the wavelength, such as 1620 nm.

Alternatively, the reverse reaction may be induced by heat, either by heat produced during the imaging process that raises the temperature of the photon-absorbing layer above 50° C. or by the external application of heat from a heat source, such as maintaining the optical shutter in a hot environment at a temperature greater than 50° C. The salts of aminium radical cations are typically stable at temperatures up to 100° C. and higher and are known to be stable under non-thermal equilibrium conditions, such as those experienced in laser ablation imaging, at temperatures up to 600° C.

Also, alternatively, the reverse reaction may be induced by radiation selected from the group consisting of ultraviolet radiation, visible radiation, and infrared radiation. Where the reaction product or other components present in the photon-absorbing layer have oxygen-sensitive reactivities, the presence of a desired level of oxygen in combination with the radiation may be utilized to induce the reverse reaction. In one embodiment, the wavelength of the radiation inducing the reverse reaction is different from the wavelength of the photons absorbed to form the reaction product. In one embodiment of the optical shutters of this invention, the wavelength range of photons imaging the optical shutter from the first state to the second state is different from the wavelength range of photons imaging the optical shutter from the second state to the first state. For example, a photosensitizer such as an anthraquinone, an ASQ radical anion, or an anthraquinone dianion in the case of a salt of an aminium free radical cation as the free radical compound that switches, may be utilized to sensitize the reverse reaction where the photosensitizer has a strong absorption in the visible region in the wavelength range of about 500 to 700 nm, where the aminium radical cations typically have a very weak absorption. In this case, for example, low cost laser diodes, such as those emitting at 635 nm as used for DVD recording or those emitting at 680 nm as used for magneto-optic disk recording, may be utilized for one of the two different photon-induced reversible switching reactions. For example, a photosensitizer absorbing strongly at 635 nm could be utilized in a photon-absorbing layer comprising IR-126 to cause the photon-induced reduction to its corresponding highly transparent non-free radical amine or, alternatively, to cause the photon-induced oxidation of this amine back to IR-126. Thus, although the mechanism of the reverse reaction may be varied, the optical shutter of this invention is reversibly imageable between the first and second states of absorption and/or reflectivity at the wavelength.

The speed and/or timing of the reverse reaction may be varied over a wide range depending on the requirements of the product application. In one embodiment of the optical shutters of this invention, the reverse reaction occurs in 1 second to 10 years after the photon-induced formation of the reaction product. In one embodiment, the reverse reaction occurs in less than 1 second. In one embodiment, the reverse reaction occurs in less than 10 milliseconds. In one embodiment, the reverse reaction occurs in less than 1 millisecond. In one embodiment, the reverse reaction occurs in less than 0.1 milliseconds. In one embodiment, the reverse reaction occurs in less than 0.01 nanoseconds or 10 picoseconds, such as in 2 to 3 picoseconds or less. When radiation is used to induce the reverse reaction, the timing of the reverse reaction may be selected depending on the timing of the exposure of the optical shutter to the radiation.

Also, with radiation to induce the reverse reaction, the speed may be as fast as the speeds of forming the reaction product after the absorption of the photons, such as, for example, sub-picosecond speeds. For example, when a reversible photon-induced electron transfer occurs in the optical shutter, the speed of the formation of the reaction product from an organic free radical compound may be sub-picosecond and as low as 40 femtoseconds or less and the speed of a dark or heat-induced reverse reaction of the reaction product to regenerate the starting organic free radical compound may be as fast as 2 to 3 picoseconds or even faster. Since the reversible electron transfer involved in the switching of the optical shutters, switch devices, and buffers of this invention does not require a chemical bond breaking, the speeds of the optical switching may be as fast as the sub-picosecond range. These fast speeds are particularly advantageous for optical shutters for use in nanosecond optical packet switching, as known in the art of fiber optic communications channels.

The wavelengths of the photons absorbed by the photon-absorbing layer to form the reaction product of an organic free radical compound may be selected from a wide variety of wavelengths depending on the absorption spectra of the organic free radical compound and of the photon-absorbing layer, the wavelengths available from the source of photons, and any need to avoid using a wavelength that may interfere with the wavelength at which the optical shutter has its states of low and high absorptions and/or reflectivities and is designed to operate as an "on-off" switch. In one embodiment, the wavelength of the photons is one or more ultraviolet wavelengths. In one embodiment, the wavelength of the photons is one or more visible wavelengths from 400 to 700 nm. In one embodiment, the wavelength of the photons is one or more near-infrared wavelengths from 700 to 2000 nm. In a preferred embodiment, the absorption of the photons by the organic free radical compound is from a free radical ground state of the free radical compound, and more preferably, the wavelength of the photons absorbed by the free radical ground state is one or more near-infrared wavelengths from 700 to 2000 nm.

A wide variety of sources of the photons to form the reaction product and, when radiation is used to induce the reverse reaction, to regenerate the starting organic free radical compound, may be utilized. Suitable sources of photons include, but are not limited to, lasers, continuous light sources such as mercury lamps, pulsed light sources such as xenon pulse lamps, and electroluminescent light-emitting diodes (LEDs), as known in the art of high intensity sources of photons. It is preferred to provide the photons in pulses such that suitable light sources include pulsed lasers, modulated lasers, and other pulsed light sources.

Alternatively, in one embodiment, with lasers and continuous light sources, a first modulator is interposed between the laser or the continuous light source to provide a desired length of imaging time and a desired imagewise area for the imaging of the optical shutter by the photons. Suitable modulators may be any of the variety of light modulators, such as electro-optic modulators, known in the art of light modulators, depending on the requirements for the "on-off" imaging times, such as, for example, 1.5 picoseconds "on" of providing photons and 20 nanoseconds "off" or, alternatively, 20 nanoseconds "on" and 1.5 picoseconds "off", of the modulator and of the desired imagewise area, such as, for example, a dot or pixel shape of about 6 microns in diameter or of about 6 microns per edge in a square shape, on the photon-absorbing layer of the optical shutter. Also, the optical shutters of the present invention, particularly when the application of an electric current reversibly images the optical shutters, may be utilized as modulators for the light source that images the optical shutters by photons.

In one embodiment, wherein the reverse reaction to regenerate the organic free radical compound is induced by radiation selected from the group consisting of ultraviolet radiation, visible radiation, and infrared radiation, a second modulator may be interposed between the source of the radiation and the optical shutter to provide a desired length of imaging time and a desired imagewise area for the reverse reaction of the optical shutter by the radiation. Suitable modulators for the photon-induced reverse reaction may be any of the variety of light modulators, such as electro-optic modulators, known in the art of light modulators, depending on the requirements for the "on-off" imaging times, such as described above for the first modulator, and of the desired imagewise area, such as a dot or pixel shape of about 6 microns in diameter or of about 6 microns per edge in a square shape, on the photon-absorbing layer of the optical shutter. In one embodiment, the wavelength of the photons to form the reaction product from the organic free radical compound is different from the wavelength of the radiation inducing the reverse reaction of the reaction product. Also, as described above for the first modulator, the optical shutters of this invention may be utilized for the second modulator, as well as for other optical modulator applications.

In one embodiment, the source of the photons is an electroluminescent light-emitting device, as known in the art of inorganic and organic electroluminescent LEDs. In one embodiment, the light-emitting device has a plurality of light-emitting pixels having a circumference and an intermittent light emission to provide a desired length of imaging time, such as, for example, 1.5 picoseconds of "on" time with 20 nanoseconds of "off" time and a desired imagewise area, such as, for example, a dot or a pixel shape of about 6 microns in diameter or of about 6 microns per edge in a square shape, for the imaging of the optical shutter by the photons. In one embodiment, wherein the reverse reaction to regenerate the organic free radical compound is induced by radiation selected from the group consisting of ultraviolet radiation, visible radiation, and infrared radiation, a second electroluminescent light-emitting device with a plurality of light-emitting pixels having a circumference and an intermittent light emission provides a desired length of imaging time, such as, for example, 1.5 picoseconds of "on" time and 60 nanoseconds of "off" time, and a desired imagewise area, such as, for example, a dot or a pixel shape of about 6 microns in diameter or of about 6 microns per edge in a square shape, for the reverse reaction of the optical shutter by the radiation. In one embodiment, the wavelength of the photons to form the reaction product from the organic free radical compound is different from the wavelength of the radiation inducing the reverse reaction of the reaction product.

Suitable salts of organic radical cations for the optical shutters of this invention include, but are not limited to, salts of an aminium radical cation. The choice of the counteranion for the salt depends on a variety of factors such as, for example, the desired speed of the photo-induced or other switching reaction, such as results from the application of an electric current at a low voltage such as 0.1 to 5 volts, to form the reaction product from the organic free radical compound, the desired speed of the reverse reaction of the reaction product to regenerate the starting organic free radical compound, and the required stability of any photon-absorbing layers and of any reflective surface layers where a reflective organic radical cation salt is utilized, against degradation by oxygen, moisture, and photon exposures and against possible side reactions in switching during the operation of the reversible optical shutter.

For example, an anthrasemiquinone radical anion is a type of counteranion to use with an aminium radical cation, such as an IR-165 type aminium radical cation, since the anthrasemiquinone radical anion is an electron-donating material which may participate by being oxidized in the photon-induced reduction of the aminium radical cation and also may participate in the reverse reaction of the reaction product to regenerate the starting aminium radical cation by a simultaneous reverse reduction to reform the anthrasemiquinone radical anion, particularly when the reverse reaction is induced or sensitized by ultraviolet, visible, or infrared radiation absorbed by the oxidation product, such as the corresponding anthraquinone, of the anthrasemiquinone radical anion. By the proper selection of the type of anthrasemiquinone radical anion derivative, the anthrasemiquinone radical anion of the combined aminium radical cation-anthrasemiquinone radical anion salt may be the organic free radical that absorbs the photons to form the reaction product having a change in absorption at the wavelength, and the aminium radical cation may participate in promoting this photon-induced reaction and in promoting the reverse reaction to regenerate the starting anthrasemiquinone radical anion.

The wavelength at which the optical shutter has the states of low and high absorption may be varied depending on the product application by the selection of the organic free radical compound and by the total composition of the photon-absorbing layer. Suitable wavelengths include, but are not limited to, the range of 400 to 2000 nm. The wavelength may be a single wavelength or a range of multiple wavelengths. In one embodiment, the wavelength is a wavelength from 400 to 1000 nm. In one embodiment, the wavelength is a wavelength from 1000 to 1400 nm. In one embodiment, the wavelength is a wavelength from 1400 to 1600 nm, preferably 1520 to 1580 nm and more preferably 1500 to 1700 nm, for applications in fiber optic communications channels. In one embodiment, the wavelength is in the range of wavelengths mentioned above, such as 400 to 2000 nm and 1500 to 1700 nm.

The levels of absorption of the states of low and high absorption may be varied depending on the product application by the selection of the type and amount of the free radical compound and by the total composition of the photon-absorbing layer. Typically, the change in absorption at the wavelength is the primary property and may be a range of values from, for example, 0.1 in optical density to greater than 3.0 in optical density, depending on the product application. For example, for a typical application of an optical shutter in an optical switch device in a fiber optic communications channel, the optical density of the low state of absorption at the wavelength, such as 1620 nm, should be as low as possible, such as less than 0.01 or completely transparent, and the optical density of the high state of absorption at the wavelength should be very high, such as 3.1 or greater, when measured through the path of the optical shutter that the optical signals are directed to travel, to provide a contrast ratio of greater than 30 dB or of a factor greater than 1000.

In the example of the optical shutter with a photon-absorbing layer comprising IR-165 described above, the absorption of the photons images the optical shutter from the first state of low absorption to the second state of high absorption. Depending on the requirements for the optical shutter in the specific product application, it is readily possible to modify the photon-absorbing layer so that the absorption of photons images the optical shutter from the second state of high absorption to the first state of low absorption. For example, the photon-absorbing layer may comprise IR-126 or a similar aminium radical cation and the photon-absorbing layer may comprise an oxidative, electron-accepting matrix of polymers, counteranions, and other additives around the aminium radical cation. Upon imaging of this optical shutter by photons, for example, at 980 nm, the IR-126 type aminium radical cation forms a reaction product, such as an one-electron oxidation product that is the same or similar to IR-165. Prior to the absorption of photons, the optical shutter has a state of high absorption, such as an optical density of 3.1 due to the IR-126 or similar organic free radical compound, at a wavelength, such as 1620 nm. After the absorption of photons and the formation of the reaction product, the optical shutter has a state of low absorption, such as an optical density of less than 0.05 due to IR-165 or similar organic free radical compound, at the wavelength, such as 1620 nm. The reverse reaction of the optical shutter, as described heretofore, regenerates the starting free radical compound, a IR-126 type radical cation, and returns the optical shutter to the state of high absorption at the wavelength, such as 1620 nm. Thus, this embodiment of the optical shutter of the present invention is also reversibly imageable between the first and second states of absorption at the wavelength.

In one embodiment of the optical shutters of this invention, the reaction product forms in less than 1 nanosecond after the absorption of the photons by the organic free radical compound, preferably forms in less than 0.1 nanoseconds after the absorption of the photons, more preferably forms in less than 0.01 nanoseconds after the absorption of the photons, and most preferably forms in less than 0.001 nanoseconds after absorption of photons by the free radical compound. The formation of the reaction product at speeds of less than 0.001 nanoseconds or 1 picosecond is particularly advantageous for product applications in fiber optic communications channels where nanosecond optical data packet switching is desired.

Organic free radical compounds, such as salts of aminium radical cations, are particularly suitable for sub-picosecond speeds of forming the reaction product, particularly by an photon-induced electron transfer reaction where no covalent bond breaking is required. The fact that IR-165 has a sub-picosecond conversion of photons to heat in certain types of photon-absorbing layers but still exhibits some reversible formation of IR-126 or a similar compound or, alternatively, some reversible formation of a blue, organic free radical oxidation product, illustrates that the speed of formation of these reaction products is fast enough to compete with the sub-picosecond photon-to-heat conversion. In fact, this may reversibly occur to a significant extent with some heat formation during the reverse reaction during the photon excitation of an IR-165 containing layer when the photon excitation times are long, such as greater than 3 picoseconds, especially since photon-induced electron transfer reactions are known to occur in sub-picosecond times as fast as 40 femtoseconds and to be reversible by dark reactions at speeds as fast as 2 to 3 picoseconds. An organic free radical compound where the excited state is an excited state from the free radical ground state may have a rapid internal conversion from this excited state back to the ground state with a concomitant production of heat in a time scale of as low as 1 picosecond or less. In one example of this, an organic radical cation compound absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published Dec. 3, 1998, to Carlson. The present invention utilizes an organic free radical compound. In one embodiment, the organic free radical compound undergoes a photo-induced electron transfer reaction which causes changes in absorption due to the oxidation or the reduction of the free radical compound. This photon-induced electron transfer reaction may occur faster and with higher efficiency than internal conversion of the absorbed photons to heat or, alternatively, may have a similar or slightly lower speed and efficiency than this internal conversion to heat so that both electron transfer and heat formation processes occur. The composition of the photon-absorbing layer may be varied to maximize the efficiency of the formation of the reaction product and to minimize direct photon-to-heat and photon-to-luminescence conversions with a target to approach a quantum efficiency of 100% or 1.0 for the conversion of each photon absorbed to form a molecule of reaction product. This efficiency would be advantageous in reducing the amount of photons which are needed for imaging of the optical shutter. The very intense absorptions of the organic free radicals are advantageous in making photon-absorbing layers with a high optical density at the wavelength of the photons used to form the reaction product, thus providing a high per cent absorption of these incident photons.

In one embodiment of the optical shutters, switch devices, and buffers of this invention, the reaction product is an oxidation product of the organic free radical compound, such as, for example, an one-electron oxidation product or a two-electron oxidation product. IR-126 as the organic free radical compound and IR-165 as the reaction product is an example of the reaction product being an one-electron oxidation product. In one embodiment, the reaction product is a reduction product of the organic free radical compound, such as, for example, an one-electron reduction product and a two-electron reduction product. IR-165 as the organic free radical compound and IR-126 as the reaction product is an example of the reaction product being an one-electron reduction product. IR-126 as the free radical compound and its corresponding non-free radical amine as the reaction product is another example of the reaction product being an one-electron reduction product.

In addition to the organic free radical compound, the photon-absorbing layer of the optical shutter of the present invention may comprise other materials to provide increased mechanical integrity to the layer and to optimize the formation of the reaction product and the reverse reaction to regenerate the starting organic free radical compound. Suitable materials for the photon-absorbing layer include, but are not limited to, organic polymers such as polycarbonate and cellulosic polymers; inorganic glasses, such as a porous grade of silica glass as known in the art of inorganic glasses; and one or more inorganic xerogel layers, as known in the art of xerogel layers. Because of the small sizes possible for the optical shutter of this invention, organic polymers and inorganic xerogel layers are preferred because, unlike inorganic glasses, they are known to be readily fabricated in layers with thicknesses of less than 8 microns by coating and other deposition processes known in the art of manufacturing layers with thicknesses of 0.1 to 8 microns. The one or more inorganic xerogel layers typically have a nanoporous structure with average pore diameters in the range of 0.5 to 300 nm, which may be utilized advantageously to be filled partly or completely with the organic free radical compound and other materials, such as polymeric materials, electron-accepting compounds, and electron-donating compounds, to provide a nanocomposite photon-absorbing layer.

The organic nature of the organic free radical compounds and of the optical shutter of the present invention are advantageous for ease of fabrication, such as by conventional methods of coating or plastic molding, in comparison to inorganic glass or inorganic semiconductor materials typically used in all-optical or hybrid optical shutters and switches. Since only the area of the photon-absorbing layer that receives photons is imaged and acts as an optical shutter, the optical shutter may be made for ease of fabrication and possible extension of its product lifetime with a photon-absorbing layer of greater thickness and surface area than is needed. This excess photon-absorbing layer may be utilized later if the original optical shutter has degraded and a new optical shutter is needed by re-positioning the optical shutter to then expose this excess, previously unused photon-absorbing layer as the replacement optical shutter in the product application.

The unique properties of the optical shutter of the present invention are adapted for use in a variety of optical components for fiber optic communications channels, such as, for example, for an optical switch device, an optical buffer, an optical router, and a tunable optical gain filter or variable optical attenuator (VOA).

The optical shutter of the present invention may be utilized in any of the optical switch devices known in the art of fiber optic communications channels where the optical switch devices utilize one or more optical shutters, or optical gates as optical shutters are often referred to in fiber optic applications, that operate by a reversible imaging between states of low and high absorptions, including where there is also simultaneous reversible imaging between states of low and high reflectivity. Each of these types of reversible imaging of optical shutters or optical gates are described herein for the optical shutter of this invention.

One aspect of the optical switch devices of this invention pertains to an optical switch device comprising one or more input optical paths, two or more output optical paths, and one or more optical shutters, which one or more optical shutters are imageable by photons and have a first state of a low absorption at a wavelength and a second state of a high absorption at the wavelength, at least one of the one or more optical shutters comprising a photon-absorbing layer, wherein the photon-absorbing layer comprises an organic free radical compound and is characterized by absorption of photons by the free radical compound to form a reaction product having a change in absorption at the wavelength and by a reverse reaction of the reaction product to regenerate the free radical compound; and wherein at least one of the one or more optical shutters is reversibly imageable between the first and second states of absorption; and further wherein at least one of the one or more optical shutters further comprise a surface layer having a low reflectivity state at the wavelength, wherein the at least one of the one or more optical shutters absorbs photons to form a surface layer having a high reflectivity state and by a reverse reaction of the high reflectivity state to regenerate the low reflectivity state of the surface layer; and wherein the at least one of the one or more optical shutters is reversibly imageable between the low and high reflectivity states; and wherein the optical switch device is capable of switching an optical signal of the wavelength entering the switch device from a first input optical path to exiting the switch device in a first or a second output optical path. In one embodiment, instead of utilizing photons for imaging, the one or more optical shutters are reversibly imageable by applying an electric current through the photon-absorbing layers and the surface layers having a low and a high reflectivity state. For example, an organic free radical compound in the photon-absorbing layer and/or in the reflective surface layer, forms a reaction product having a change in absorption and/or reflectance at the wavelength by the application of an electrical current through the optical shutter and undergoes a reverse reaction of the reaction product to regenerate the organic free radical compound.

Still another aspect of this invention pertains to an optical switch device comprising one or more input optical paths, two or more output optical paths, and one or more optical shutters, the one or more optical shutters having a first state of transparency and of low reflectivity at a range of wavelengths and a second state of opacity and of high reflectivity at the range of wavelengths, and at least one of the one or more shutters comprising a first surface layer in a transparent state, a second surface layer in a transparent state, and a photon-absorbing layer in a transparent state and interposed between the first and second surface layers, wherein the at least one of the one or more optical shutters, as described herein, that comprise the photon-absorbing and surface layers, absorbs photons to change at least one of the first and second surface layers to a state of high reflectivity and to change the photon-absorbing layer to a state of opacity, and further is reversibly imageable between the first and second states; and wherein the optical switch device is capable of switching an optical signal entering the switch device from one of the one or more input paths to a selected one of the two or more output paths. In one embodiment, instead of utilizing photons for imaging, the one or more optical shutters are reversibly imageable by the application of an electric current through the photon-absorbing layers and the surface layers having a low and a high reflectivity state. For example, an organic free radical compound in the photon-absorbing layer and/or in the reflective surface layer, forms a reaction product having a change in absorption and/or reflectivity at the wavelength by the application of an electric current through the optical shutter and undergoes a reverse reaction of the reaction product to regenerate the organic free radical compound.

In one embodiment of the optical shutters and switch devices of this invention, at least one of the one or more optical shutters comprising the photon-absorbing and surface layers comprises a metallized layer on at least one side of the photon-absorbing layer. In one embodiment, the metallized layer comprises aluminum.

In one embodiment of the optical shutters and switch devices of this invention, the photon-absorbing layer comprises an organic free radical compound and absorbs photons to form a reaction product having a change in absorption at the range of wavelengths.

In one embodiment of the optical switch devices of the present invention, the imaging from the second state to the first state occurs with no external source of energy. In one embodiment, the imaging from the second state to the first state is induced by heat. In one embodiment, the imaging from the second state to the first state is induced by absorption of photons from one or more wavelength ranges selected from the group consisting of ultraviolet wavelength ranges, visible wavelength ranges, and near-infrared wavelength ranges. In one embodiment, the first and second surface layers are in direct contact to the photon-absorbing layer. In one embodiment, at least one of the first and second surface layers is not in direct contact to the photon-absorbing layer. In one embodiment, at least one of the one or more shutter comprises two or more photon-absorbing layers interposed between the first and second surface layers. In one embodiment, the first surface layer is in direct contact to a first one of the two or more photon-absorbing layers and the second surface layer is in direct contact to a second one of the two or more photon-absorbing layers.

In one embodiment of the optical shutters and switch devices of this invention, the absorption of the photons images at least one of the one or more optical shutters from the first state of low absorption to the second state of high absorption, thereby insuring that no optical signal is transmitted through the photon-absorbing layer while the optical signal is simultaneously reflected from the surface layer having a high reflectivity state. Referring to FIG. 1, one embodiment of an optical switch device 110 utilizing the optical shutters of this invention having reversible imaging between both low and high absorption states of a photon-absorbing layer and between low and high reflectivity states of a surface layer, is illustrated. A first input path 1 having an input optical signal 1(IN) at the wavelength, such as, for example, 1620 nm, of the specific communication channel directs the input optical signal 1(IN) to a reflective surface 15, such as a mirror. The reflective surface 15 then directs the input optical signal 1(IN) at an optical shutter 14 comprising a surface layer 9 having a low reflectivity state and a photon-absorbing layer 7 comprising an organic free radical compound or other photon-absorbing compound, such as a non-free radical organic compound that forms an organic free radical compound by an electron transfer. When the photon-absorbing layer 7 of optical shutter 14 absorbs photons from a light source such as a light source above or below the plane of the optical path of the optical signals in FIG. 1, the organic free radical compound or other photon-absorbing compound absorbs the photons and forms a reaction product providing a change from a state of low absorption to a state of high absorption at 1620 nm, such as, for example, an increase in optical density at 1620 nm from 0.03 to 3.10 in the optical path of the optical switch that the optical signals are directed to travel. Simultaneously the surface layer 9 of optical shutter 14 is imaged from the low reflectivity state to a second state of high reflectivity. While the reaction product is formed and the optical density and the reflectivity at 1620 nm are very high, this optical signal is reflected to a reflective surface 25, such as a mirror. The optical signal is then reflected by reflective surface 25 to a second output path 2 where the optical signal becomes an output optical signal 2(OUT) at 1620 nm. Alternatively, instead of a reflective surface 25, the change in direction of the optical signal may be done by bends in a waveguide carrying the optical signal or by other direction-changing optical components known in the art of fiber optic communications channels. Prior to any absorption of photons by optical shutter 14 or when the reaction product and the surface layer with the high reflectivity state undergo the reverse reaction to regenerate the starting organic free radical compound or other photon-absorbing compound and to regenerate the surface layer with a low reflectivity state, the optical density and the reflectivity at 1620 nm are very low, and the optical signal can pass through optical shutter 14 and optical shutter 16 to output path 1 where the optical signal becomes an output optical signal 1(OUT) at 1620 nm.

Similarly, a second input path 2 having an input optical signal 2(IN) at the wavelength, such as, for example, 1620 nm, of the specific communications channel directs the input optical signal at an optical shutter 16 comprising a surface layer 9 having a low reflectivity state and a photon-absorbing layer 7 comprising an organic free radical compound or other photon-absorbing compound. When the photon-absorbing layer 7 of optical shutter 16 absorbs photons from a light source such as a light source above or below the plane of the optical signals in FIG. 1, the organic free radical compound or other photon-absorbing compound absorbs the photons and forms a reaction product providing a change from a state of low absorption to a state of high absorption at 1620 nm and simultaneously the surface layer 9 of optical shutter 16 is imaged from the low reflectivity state to a second state of high reflectivity. While the reaction product is formed and the optical density and the reflectivity at 1620 nm are very high, this optical signal is reflected to output path 1 where the optical signal becomes an output optical signal 1(OUT) at 1620 nm. Prior to any absorption of photons by optical shutter 16 or when the reaction product and the surface layer with the high reflectivity state undergo the reverse reaction to regenerate the starting organic free radical or other photon-absorbing compound and to regenerate the surface layer with a low reflectivity state, the optical density and the reflectivity at 1620 nm are very low, and the optical signal can pass through optical shutter 16 and optical shutter 14 to the reflective surface 25. The optical signal is then reflected by reflective surface 25 to the second output path 2 where the optical signal becomes an output optical signal 2(OUT) at 1620 nm.

Optical shutter 16 and optical shutter 14 are in close proximity and form an optical shutter in the configuration of a double optical shutter assembly 18, but the light sources to image the optical shutters may be collimated and focused to provide photons that image only a single optical shutter in the optical switch device, such as only imaging optical shutter 16 without imaging optical shutter 14 of double optical shutter assembly 18. In one embodiment, the reversible imaging of optical shutter 16, optical shutter 14, and double optical shutter assembly 18 may be induced by the application of an electrical current through the optical shutter and the double optical shutter assembly, instead of being induced by the absorption of photons.

Many variations and combinations of the optical shutters of the present invention with their flexibility to be "transparent-to-opaque" optical shutters, "opaque-to-transparent" optical shutters, "transparent-to-reflective" optical shutters, and "reflective-to-transparent" optical shutters, as described herein, may be utilized in the designs of the optical switch devices of this invention, including use in optical switch devices known in the art where the designs require "transparent-to-opaque" opaque shutters, "opaque-to-transparent" optical shutters, "transparent-to-reflective" optical shutters, and "reflective-to-transparent" optical shutters.

Figure 2:
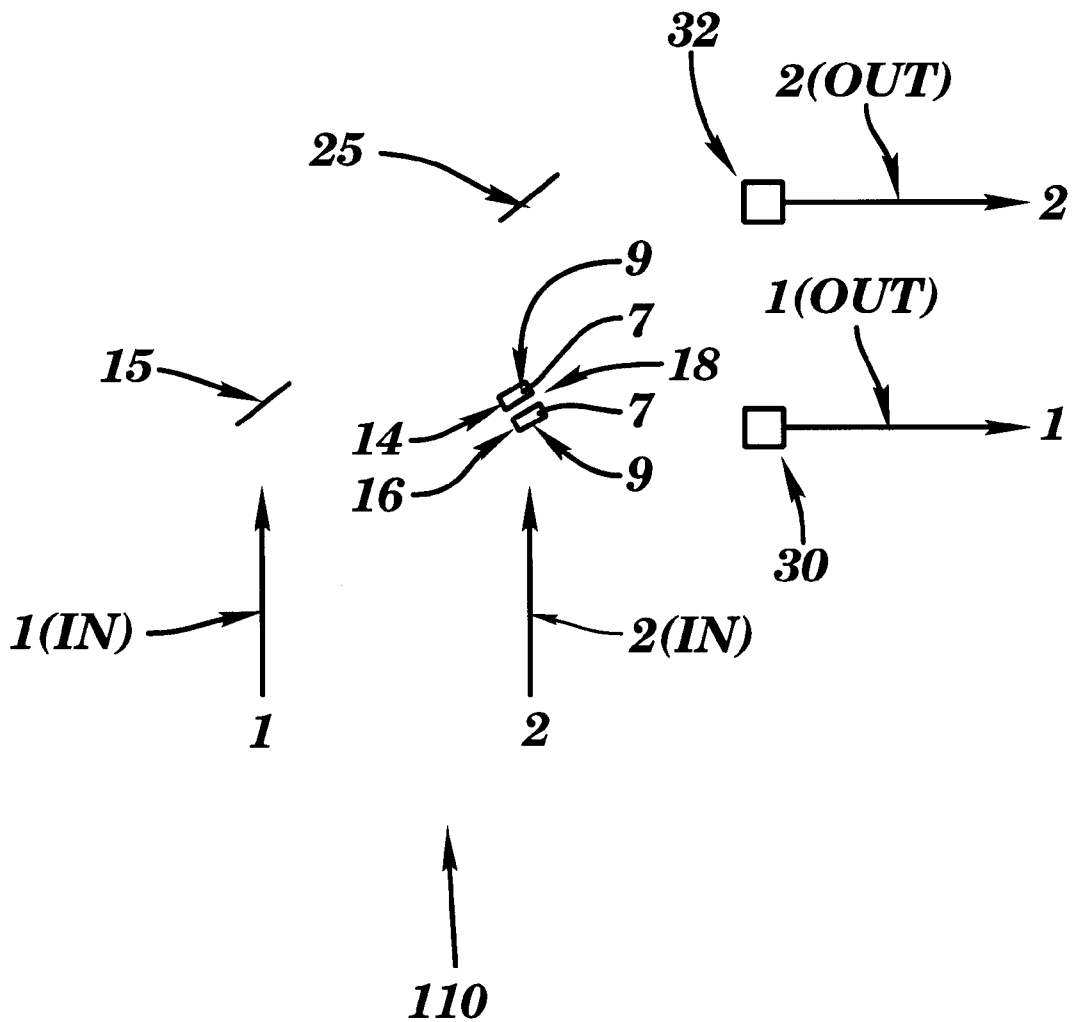
FIG. 2 shows another embodiment of an optical switch device utilizing the optical shutters of this invention and incorporating optical combining devices.

Referring to FIG. 2 where the numbers and words have the same meaning as used for these same symbols in FIG. 1, in another embodiment of the optical switch devices of the present invention, an optical combining device 30 is placed after the double optical shutter assembly 18 to combine and collect the optical signals that have either reflected from fixed mirror 15 or from optical shutter 16, as well as any other optical signals also directed to the combining device 30 at the same time, and to direct these optical signals to output path 1. Similarly, an optical combining device 32 is placed after fixed mirror 25 to combine and collect the optical signals that have reflected from fixed mirror 25 either after passing through double optical shutter assembly 18 in its transparent state or after reflecting off optical shutter 14 of double optical shutter assembly 18 in a reflective state and to direct these signals to output path 2. Optical combining devices, as known in the art of devices for combining optical signals that are on different paths and directions but are in close proximity, are useful with the optical shutters, such as the double optical shutter assemblies, and the optical switch devices of this invention to collect optical signals which may be on slightly different optical paths depending on the switching path being utilized and then combining and connecting these optical signals in an efficient manner to the desired output path.

Figure 3:
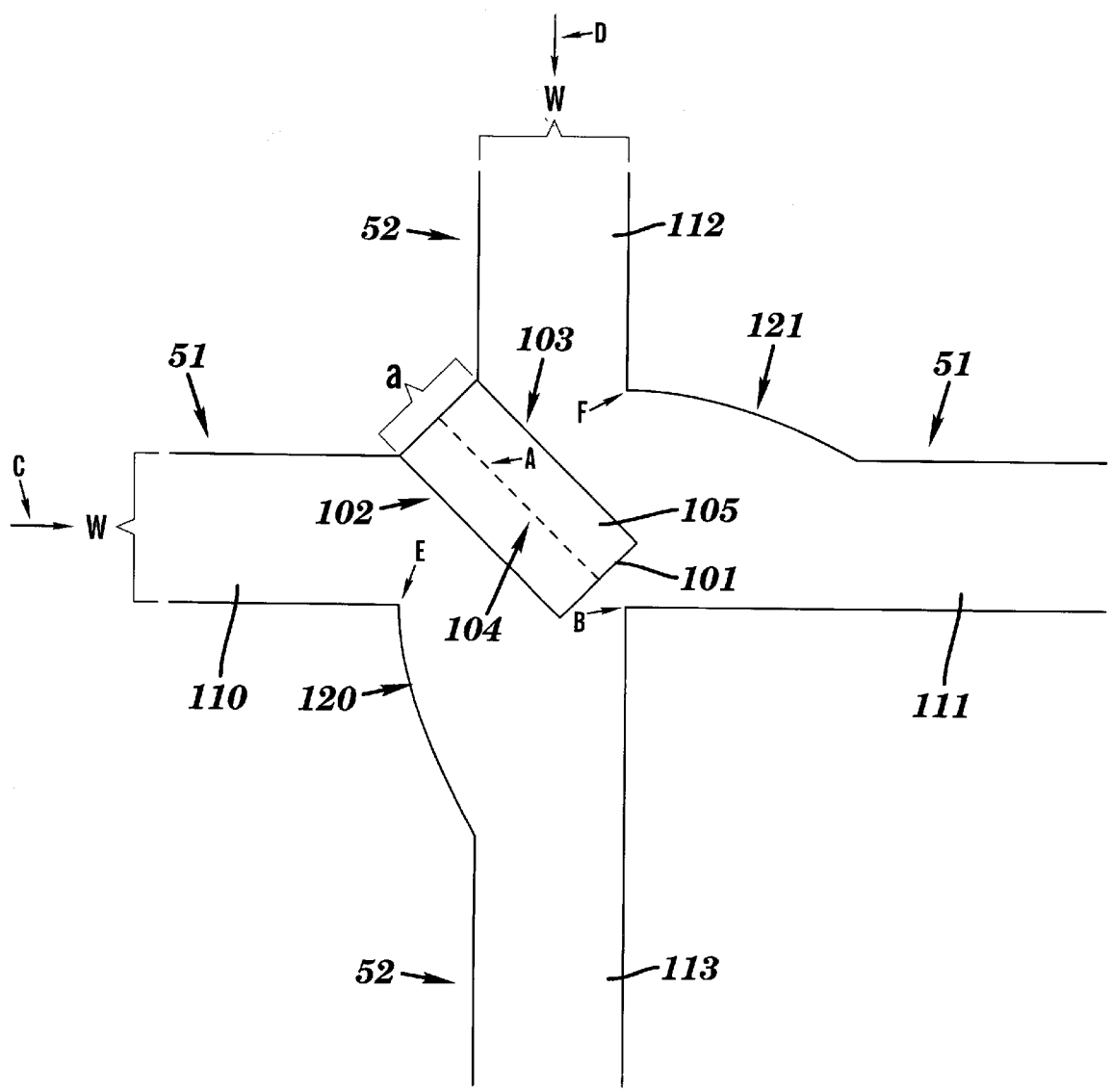
FIG. 3 shows a top down view of one embodiment of the optical shutters of the present invention and utilizing waveguides to transmit the optical signals with tapered waveguides on the output optical paths.

Referring to FIG. 3, in another embodiment of the optical shutters of this invention, the optical shutter 101 has a single photon-absorbing layer 105 interposed between two surface layers 102 and 103. The photon-absorbing layer 105 is in a transparent state when the two surface layers 102 and 103 are in a transparent state to provide the optical shutter 101 in a transparent state. In the reflective state of the optical shutter, the photon-absorbing layer 105 is in an opaque state and the two surfaces 102 and 103 are in a reflective state. As illustrated in FIG. 3, the optical signals are provided to and from the optical shutter 101 through waveguides. Two waveguides 51 and 52, whose internal width where the optical signals are present, is represented by w, intersect at an angle $\theta$ with respect to the input paths of the incoming optical signals. In FIG. 3, $\theta$ is 90° and in general, 0<$\theta$<180°. The width of the photon-absorbing layer 105 in the optical shutter 101 is denoted as a. The optical shutter 101 is positioned at an angle of $\theta/2$ with respect to the input paths of the incoming optical signals and with its centerline 104 over points A and B of intersection of waveguides 51 and 52.

When the optical shutter 101 is in the transparent state, an optical signal C that is entering the 2×2 optical switch device on the first input path 110 will pass through the optical shutter. 101 and exit on the first output path 111. Similarly, an optical signal D that is entering the 2×2 optical switch device on the second input path 112 will pass through the optical shutter 101 and exit on the second output path 113. In contrast, when the optical shutter 101 is in the reflective state, an optical signal C that is entering the 2×2 optical switch device on the first input path 110 will be reflected at surface layer 102 and exit on the second output path 113, and optical signal D that is entering the 2×2 optical switch device on the second input path 112 will be reflected at surface layer 103 and exit on the first output path 111.

Referring to FIG. 3 and considering the state when the optical shutter 101 is in the reflective state on both surfaces, the path of optical signal C when reflected at surface layer 102 into the second output path 113 is shifted relative to the path of optical signal D when the latter exits on the second output path 113 when the optical shutter 101 is in the transparent state. The tapered regions 120 and 121 are useful to efficiently collect the optical signals after they have passed through the optical shutter 101 and to funnel them to a waveguide region of a desired reduced width, such as, for example, the width w of the input waveguides.

A wide variety of shapes are suitable for the tapered region, with FIG. 3 disclosing one alternative. For example, the wider width of the tapered region compared to the width of the input waveguide may be on one side of the output waveguide after the optical signal exits the reflecting surface layer, as for example illustrated in FIG. 3, or it may be divided between both sides of the output waveguide after the optical signal exits the reflecting surface layer, such as, for example, symmetrically divided between both sides. The preferred configuration of the tapered region will be dependent on the position of the optical shutter 101 in the intersection of the two input paths and the two output paths. For example, the minimum width f of the widest width of the tapered region in the section of the output waveguide that is adjacent to the reflective surface layer is the distance between points E and B and equivalently between points B and F in FIG. 3. The minimum width f depends on w, a, and $\theta$ by the relationship shown in equation (1):

$$f = w + [a \cdot \cos(\theta/2)] \qquad (1)$$

For the sake of simplicity, the energy source that causes the optical shutter to change its state from transparent to reflective or from reflective to transparent in the 2×2 optical switch device of FIG. 3 is not shown. This energy source may be above and/or below the plane of the optical switch device as this plane is illustrated in the top down view of FIG. 3.

In the case where the energy source is the application of an electric current, electrode pads, for example, may be in contact to the opposing ends of surface layers 102 and 103 in order to reversibly switch the surface layers between reflective and non-reflective states by providing the necessary voltage and current flow across the gap between the electrodes. Similarly, electrode tabs may be in contact to the opposing ends of photon-absorbing layer 105. In a preferred embodiment, a single set of electrode tabs are in contact with the opposing ends of surface layers 102 and 103 and of photon-absorbing layer 105 and thereby a single set of electrode tabs and the application of the electric current between the electrode tabs may reversibly switch all the layers of the optical shutter at the same time.

In one embodiment, the optical signal travels in a waveguide in the one or more input paths immediately prior to, and in a selected one of the two or more output paths immediately after, the optical signal reaches at least one of the one or more optical shutters comprising the photon-absorbing and surface layers. In one embodiment, the waveguide in the two or more output paths is tapered from a larger dimension in contact to at least one of the first and second surface layers to a smaller dimension at a distance from at least one of the first and second surface layers.

Figure 4:
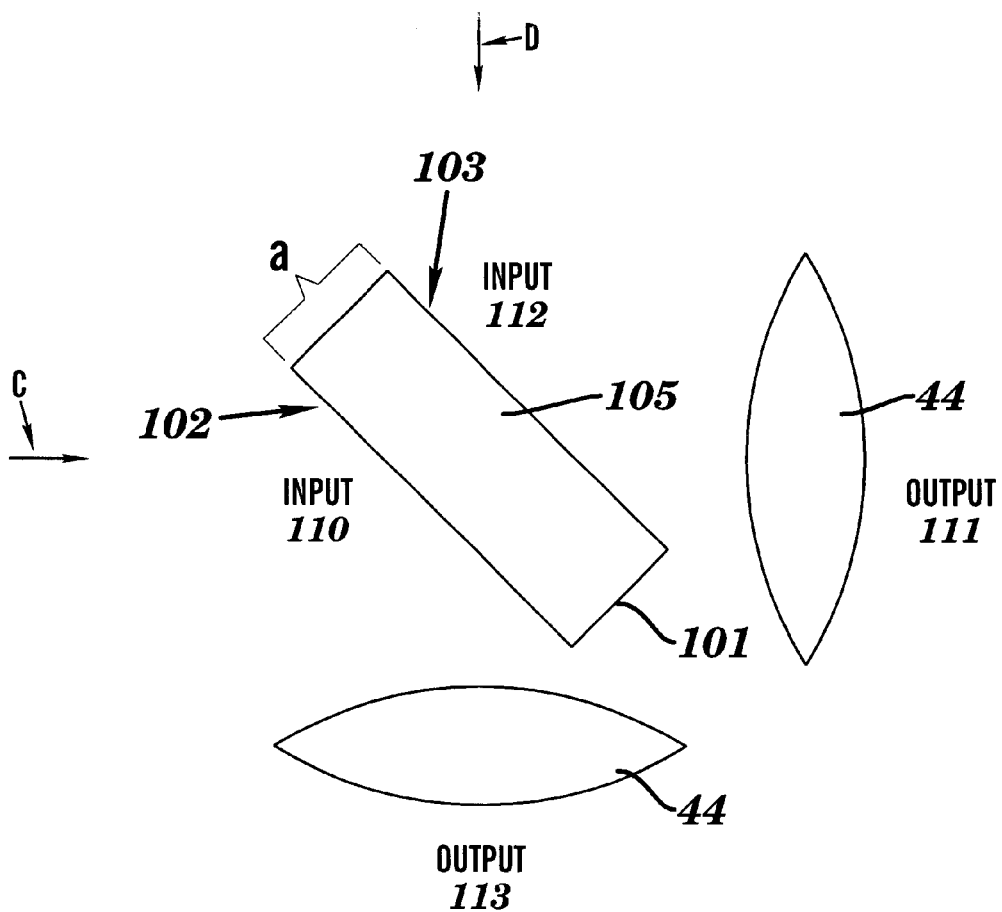
FIG. 4 illustrates a top down view of another embodiment of the optical shutters of this invention and transmitting the optical signals in free space with lenses present in the output optical paths.

Referring to FIG. 4, the numbers and letters have the same meaning as used for these same symbols in FIG. 3. FIG. 4 illustrates one embodiment of a 2×2 optical switch device comprising an optical shutter of the present invention where the optical signals travel into and from the optical shutter in a free space configuration rather than in a waveguide configuration. To efficiently collect the optical signal from the reflective surface layers when the optical shutter is in the reflective state, as well as when the optical shutter is in a transparent state, the tapered regions of the waveguide mode as illustrated in FIG. 3, are replaced with lenses 44 with a suitable curvature to shape and focus the output optical signal to a desired shape. This desired shape is typically less in size than the shape represented by the optical signals as they would exit the optical shutter in an output path from both the reflective and transparent states. In one embodiment, the optical signal travels in free space in the one or more input paths immediately prior to, and in a selected one of the two or more output paths immediately after, the optical signal reaches at least one of the one or more shutters comprising the photon-absorbing and surface layers. In one embodiment, the optical switch device comprises a lens in the two or more output paths to focus the optical signal.

Figure 5A:
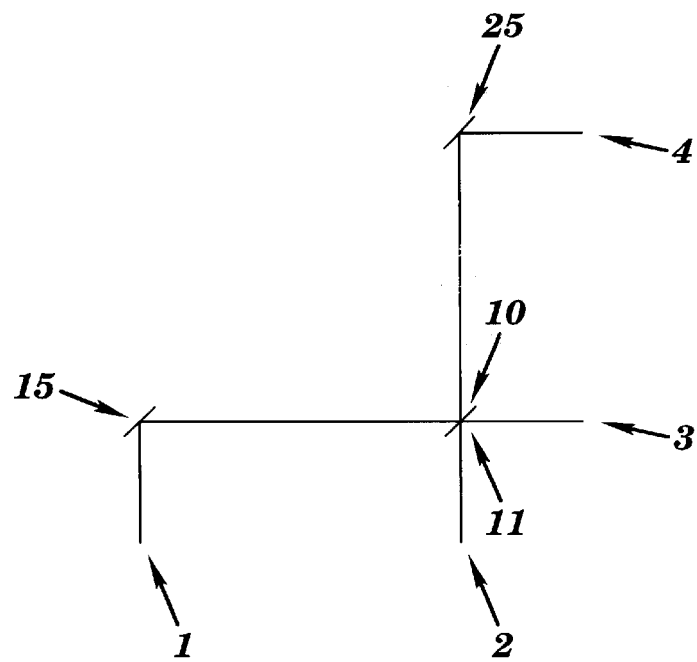
FIG. 5A shows a top down view of one embodiment of the optical switch devices and shutters of the present invention with the optical shutter in the transparent state and having fixed mirrors present to reflect the optical signals in the direction of the output optical paths.
Figure 5B:
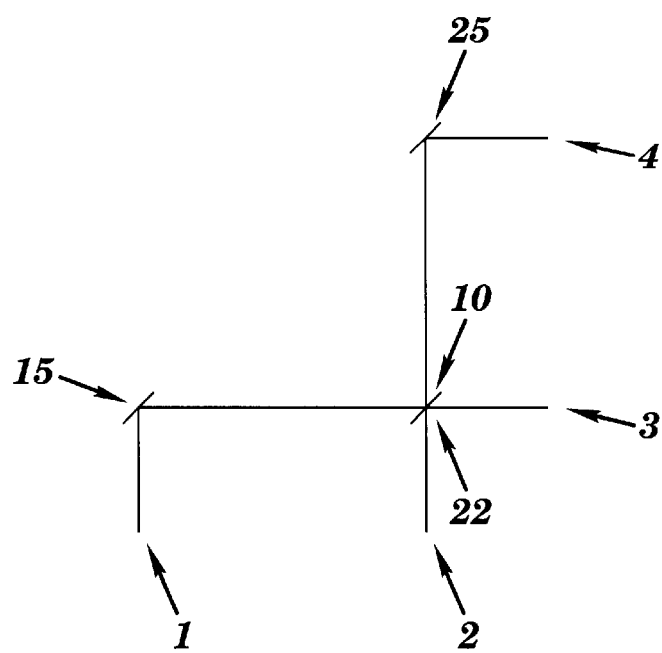
FIG. 5B shows a top down view of one embodiment of the optical switch devices and shutters of the present invention with the optical shutter in the reflective state and having fixed mirrors present to reflect the optical signals in the direction of the output optical paths.

Referring to FIGS. 5A and 5B, one embodiment of a 2×2 optical switch device of the present invention is illustrated. For the sake of simplicity, the optical shutter as illustrated in FIGS. 1 to 4, is illustrated in FIGS. 5A and 5B as a single line and, instead of a waveguide mode or a free space mode, only the path of the input and output optical signals is indicated by lines to indicate the paths which could involve either a waveguide mode or a free space mode in the optical shutters and optical switch devices of the present invention.

In FIG. 5A in a top down view, the optical shutter 10 is in the transparent state 11. The optical signal on the first input path 1 reflects from mirror 15 and is directed to pass through the transparent optical shutter 10 and to exit the 2×2 optical switch device on the first output path 3. The optical signal on the second input path 2 passes through the transparent optical shutter 10, reflects from mirror 25, and is directed to exit the 2×2 optical switch device on the second output path 4.

In FIG. 5B in a top down view, the optical shutter 10 is in the reflective state 22. The optical signal on the first input path 1 reflects from mirror 15, is directed to the reflective optical shutter 10 where it is reflected and directed to mirror 25, then reflects from mirror 25, and is directed to exit the 2×2 optical switch device on the second output path 4. The optical signal on the second input path 2 reflects from the reflective optical shutter 10 and is directed to exit the 2×2 optical switch device on the first output path 3.

Figure 6:
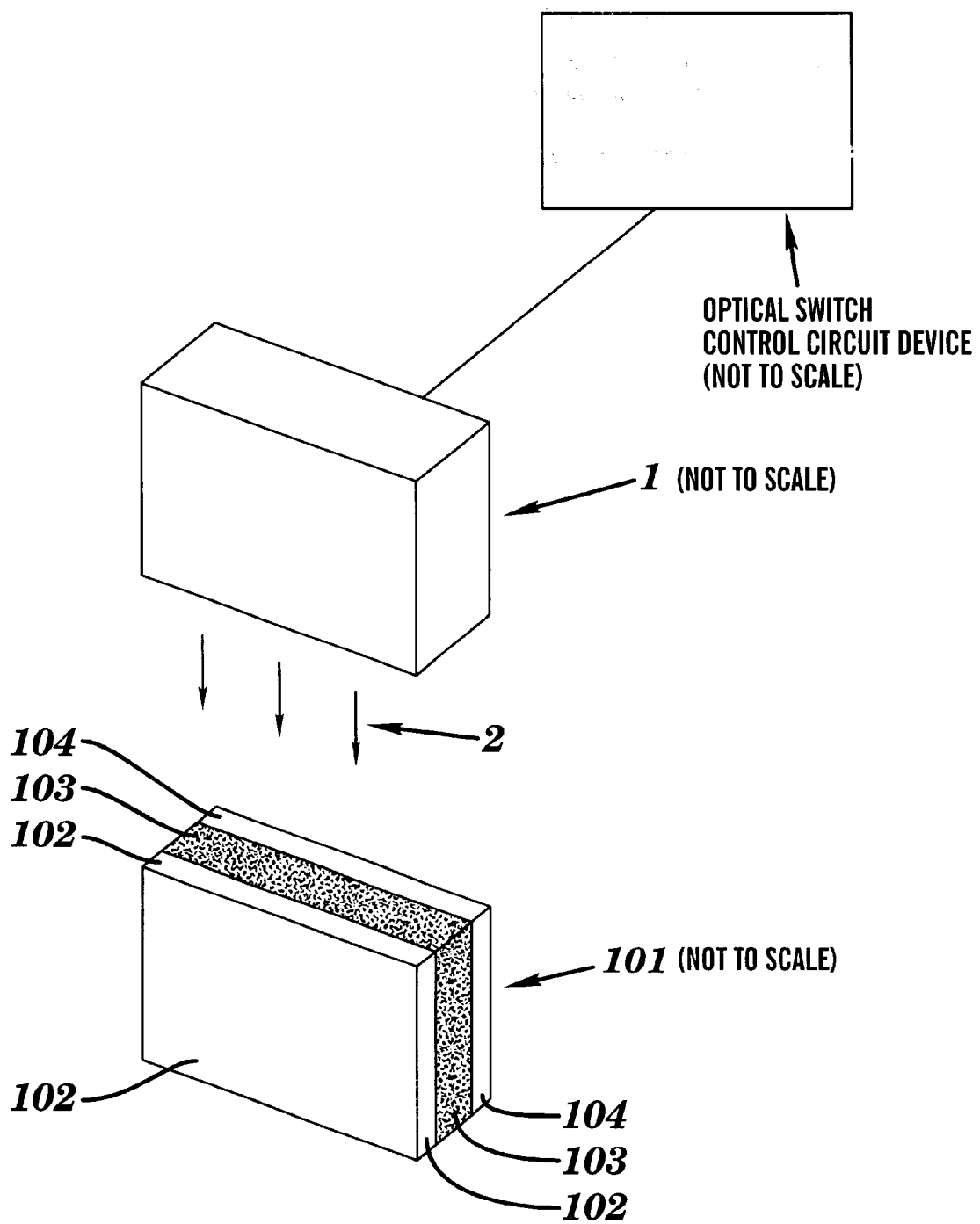
FIG. 6 illustrates one embodiment of the optical shutters of this invention with a source of photons for switching the optical signals when a signal is provided by a optical shutter control circuit device.

Referring to FIG. 6 (not to scale), one embodiment of an energy source in combination with an optical shutter is illustrated for use in the optical shutters and optical switch devices of this invention. An optical shutter 101 (not to scale) is shown in a perspective view from one side. The optical shutter 101 has a first surface layer 102, a second opposite surface layer 104, and a photon-absorbing layer 103 interposed between the two surface layers. Above the optical shutter 101, there is a source 1 of photons 2 which can provide photons of the desired wavelengths and intensities to cause the optical shutter 101 to change from a transparent to a reflective state or from a reflective to a transparent state. Where photons of different wavelengths are desired to reverse the change of the optical shutter, source 1 may be tunable directly or by the indirect use of filters to provide these photons of different wavelengths or, alternatively, a second source of photons may be positioned below or positioned above in a different exposure path to the optical shutter to cause the reverse photon-induced change in the optical shutter. More than one source of photons may be positioned to provide the desired photolytic exposure of the optical shutter for the forward and for the reverse changes of the optical shutter. For the sake of simplicity, lenses, such as, for example, aspheric lenses, and other optical components known in the art of photolytic imaging for focusing a beam of photons on the desired imagewise area, are not shown in FIG. 6. Also, as shown in FIG. 6, an optical switch control circuit device is connected to the source of photons. The optical switch control circuit device monitors the desired timing for providing the photons and delivers a signal to the source of photons to provide the photons to at least one of the one or more optical shutters comprising the photon-absorbing and surface layers. Instead of photons, suitable sources of energy to switch the optical shutters and switch devices of this invention include, but are not limited to, electrical current source elements and heating source elements. In one embodiment, the optical shutters and switch devices of this invention comprise one or more external energy source elements to provide energy to switch the optical shutter comprising the photon-absorbing and surface layers, wherein the one or more external energy source elements are selected from the group consisting of electrical current source elements, heating source elements, ultraviolet source elements, visible light source elements, and infrared radiation source elements. In one embodiment, the one or more external energy source elements are connected to an optical switch control circuit device that monitors the desired timing for providing the energy and delivers a signal to the one or more external sources of energy to provide the energy to at least one of the one or more optical shutters comprising the photon-absorbing and surface layers.

Figure 7:
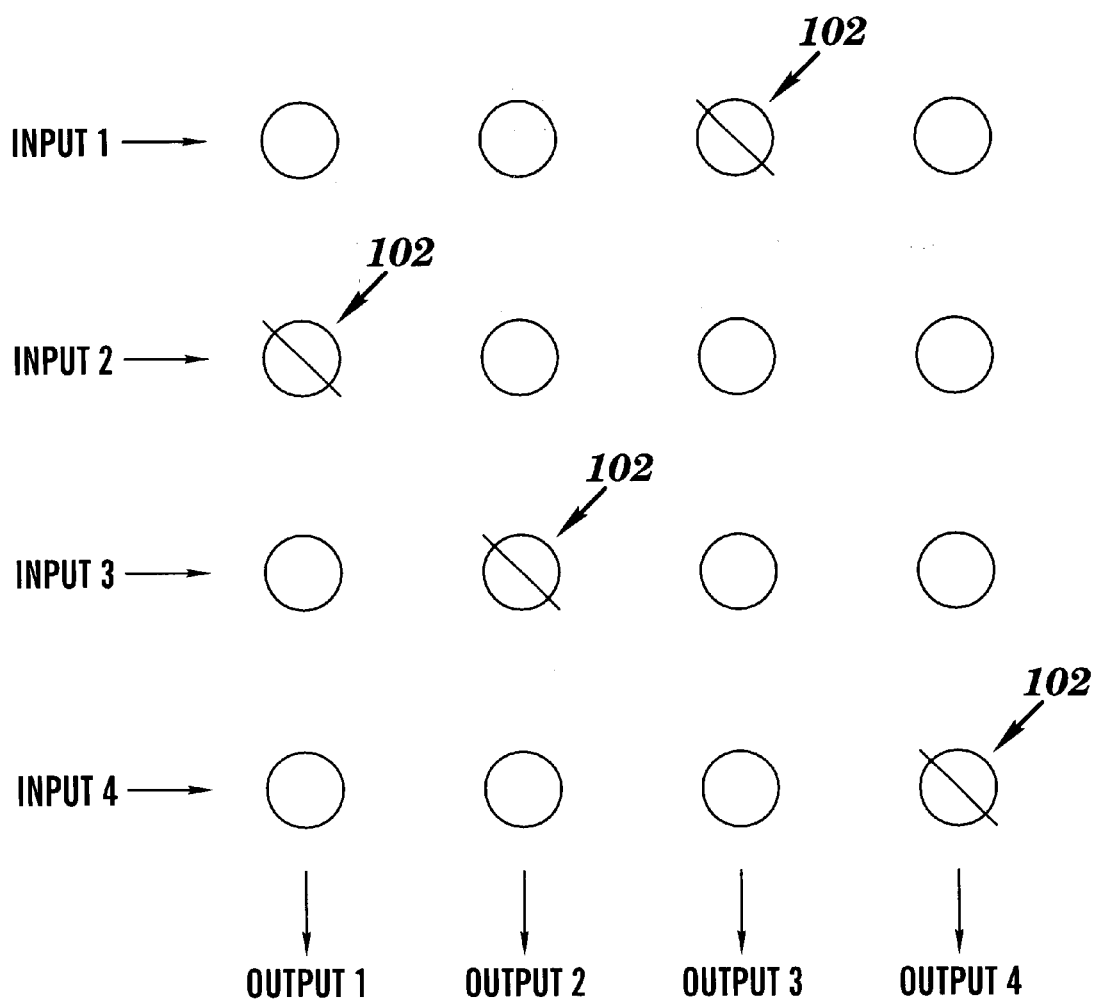
FIG. 7 shows one embodiment of the optical switch devices of the present invention.

A wide variety of optical switch device designs are possible utilizing the reversible transparent-to-reflective optical shutters of the present invention. For example, optical switch devices where the number of input paths for the optical signals is represented by M and the number of output paths for the optical signals is represented by N, where M may or may not be equal to N, may be implemented from the interconnection of 2×2 optical switches, as known in the art of M×N optical switch devices and arrays. For example, the cross-bar is a known design wherein the switching component, such as the reversible transparent-to-reflective optical shutters of the present invention, may be arranged in a rectangular array of dimensions M×N. When an optical signal enters on any one of the M input paths, it may exit on any one of the N output paths depending on the state of the optical shutters in the optical switch device. For example, FIG. 7 illustrates a 4×4 optical cross-bar switch device having 16 optical shutters represented by a circle only for the optical shutters in the transparent state, wherein each optical shutter has a transparent-to-reflective surface positioned at an angle to the input optical signal such that, in the reflective state of the optical shutter, the input optical signal is directed to a specific output path. As an illustration of one possible state of this 4×4 cross-bar, optical shutters 102 are in the reflective state as also indicated by a diagonal line through the circle, and the other 12 optical shutters are in the transparent state. In such a configuration, an optical signal that enters on input path 1 will exit on output path 3. Similarly, optical signals entering on input paths 2, 3, and 4 will exit on output paths 1, 2, and 4, respectively. By changing the state of this 4×4 cross-bar to have other combinations of 4 optical shutters in the reflective state, optical signals on any one of the 4 input paths may exit from any one of the four output paths.

As illustrated, for example, in FIG. 7, one aspect of the present invention pertains to an optical cross-bar switch device, comprising (a) an array of optical shutters arranged in a plurality of columns and rows, each optical shutter having a first state of transparency and of low reflectivity in a range of wavelengths and a second state of opacity and of high reflectivity in the range of wavelengths; wherein the optical shutter is reversibly imageable between the first and second states; and (b) a plurality of fiber optic ports, each fiber optic port disposed at a respective one of the columns and rows and capable of emitting and receiving a light beam so that when the light beam from a light emitting fiber optic port located at a selected one of the columns and rows is transmitted to a selected light receiving fiber optic port located at a selected remaining one of the columns and rows, the optical shutter located at an intersection formed by the selected column and row is switched to change from the non-reflective state to the reflective state to reflect the light beam from the light emitting fiber optic port to the selected light receiving fiber optic port. In one embodiment, the optical switch device further comprises a plurality of collimator elements, each collimator element being disposed adjacent to respective ones of each fiber optic port and between each fiber optic port and the optical shutters. In one embodiment, when the optical shutter located at the intersection formed by the selected column and row is in the second state, remaining ones of the optical shutters located in the selected column and row are in the first state, as illustrated, for example, in FIG. 7. In one embodiment, a plurality of light beams from a plurality of light emitting fiber optic ports located at selected ones of the columns and rows are transmitted to a plurality of selected light receiving fiber optic ports located at selected remaining ones of the rows and columns through a plurality of optical shutters located at respective intersections formed by the selected columns and rows in the respective reflective states, as illustrated, for example, in FIG. 7. In one embodiment, when the plurality of rows are oriented parallel to each other, the plurality of columns are oriented parallel to each other, and the plurality of rows and columns are oriented perpendicularly relative to each other, as illustrated, for example, in FIG. 7.

Figure 8:
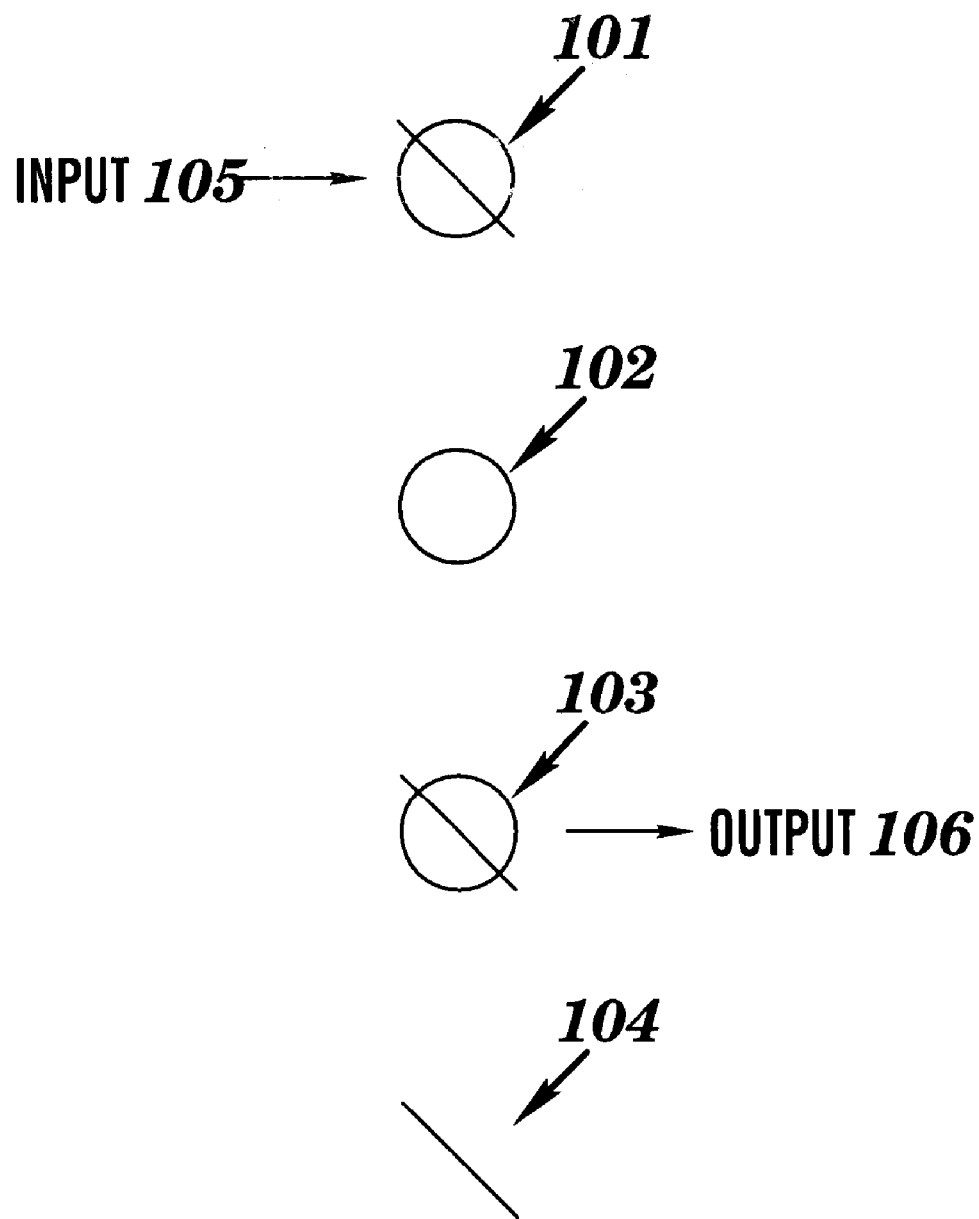
FIG. 8 illustrates another embodiment of the optical switch devices of this invention.

A special case of the cross-bar switch device is the 1×N switch, where a common application is to switch an optical signal to one of N alternate paths, each path having a distinct attribute or function, and then the alternate paths may be recombined at an optical combining device. FIG. 8 illustrates one embodiment of a 1×N switch array where N is four and the output paths for the optical signals are positioned parallel to the input path. The switching function is implemented with three optical shutters, each represented by a circle and having a transparent-to-reflective surface. Optical shutter 101 has its reflective surface layer, as represented by a diagonal line, facing to the lower left side of the figure, while optical shutters 102 and 103 have reflecting surface layers, represented by diagonal lines in the case of optical shutter 103 in FIG. 8, facing to the upper right. A permanent reflecting surface 104, such as a mirror, is used so that all four alternate output paths are parallel to one another. For example, an optical signal entering on input path 105 will exit on output path 106 if optical shutters 101 and 103 are in the reflective state and optical shutter 102 is in the transparent state.

2×2 optical switch devices, as illustrated, for example, in FIGS. 1, 2, 3, 4, 5A, and 5B may be readily expanded to larger switch devices, such as, for example, to 1280×1280 optical switch devices where there may be, for example, 16 optical fibers carrying optical signals with each fiber having 80 different wavelengths, such as 80 wavelengths ranging from 1530 to 1620 nm. The "transparent-to-reflective" type of optical shutter, as illustrated, for example, in FIGS. 1, 2, 3, 5A, and 5B with its optical shutter assembly of either two optical shutters in close proximity or a single optical shutter comprising a photon-absorbing layer interposed between two surface layers, may have an overall size as small as, for example, about 8 microns per edge of a cubic shape. If the optical switch device operates by having the 16 incoming fibers of each specific wavelength be demultiplexed and input to the optical switch device in a single plane for each specific wavelength, with the 16 fibers carrying the other 79 specific wavelengths being likewise successively positioned and provided with demultiplexed signals in 79 individual planes parallel and above or below this first plane and further operates by having the optical shutters of each plane offset enough from the optical shutters of any other plane that the source of light from above or below the 80 planes of the optical switch device may image a single individual optical shutter without imaging any other optical shutters, the optical switch device may have a very compact size. For example, assuming a 8 micron length per edge of a cubic shape for double optical shutter assembly 18 in FIG. 1, the dimensions of a corresponding 1280×1280 optical switch device based on this type of "transparent-to-reflective" optical shutter and double optical shutter assembly may be estimated to be as small as about 8 microns multiplied by 16 fibers or 128 microns in one dimension in a single plane of 16 optical signals, about 8 microns multiplied by 80 wavelengths or 640 microns in depth to account for the total of 80 planes for each of the individual wavelengths, and about 8 microns multiplied by 80 wavelengths and then multiplied by 16 signals or 10,240 microns in the second dimension in each single plane carrying optical signals to account for the offsetting to provide the ability to image only a single optical shutter without imaging any other optical shutters. This extremely small size is very advantageous for cost, ease of manufacturing, and space considerations for both optical switch devices and for the light sources to image the optical switch devices. A waveguide configuration is particularly preferred for the optical switch devices of this invention, especially where the optical switch devices are larger and comprise multiple planes of switching elements as, for example, in the 1280×1280 optical switch devices herein described.

Figure 9:
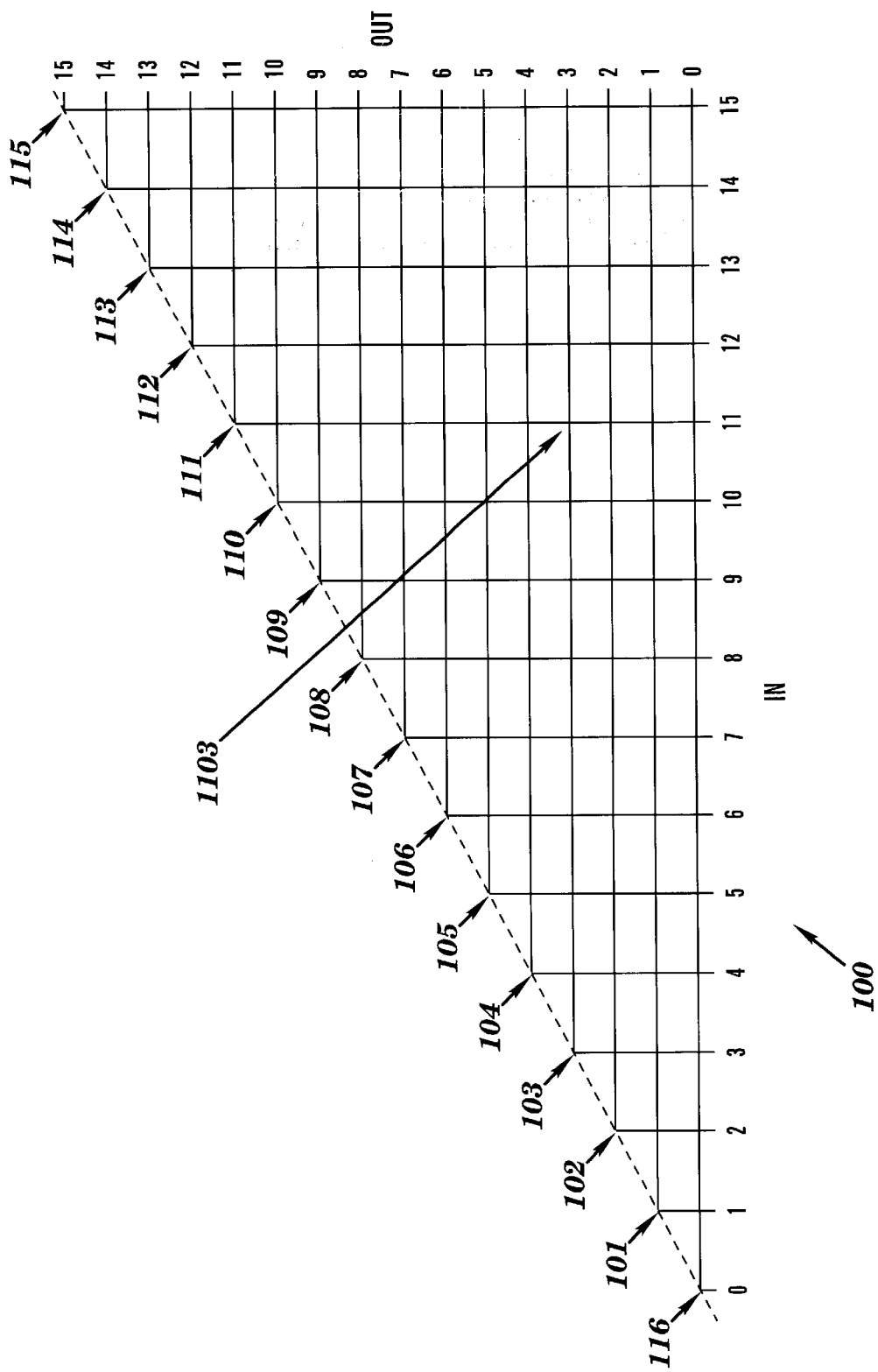
FIG. 9 shows another embodiment of the optical switch devices of the present invention and having fixed mirrors to reflect the optical signals in the direction of the output optical paths.

Referring to FIG. 9, one embodiment of a 16×16 optical switch device 100 of the present invention is illustrated. As described above, this 16×16 optical switch device could be just one plane of a 3-dimensional optical switch device of a larger size, such as up to 1280×1280 and larger M×N devices, where different optical switch devices are on planes parallel to each other and offset relative to the source of photons to switch the optical shutter so that the source of photons from above and/or below the planes carrying the optical signals may expose and switch only specific optical shutters, as desired. FIG. 9 is a top down view that is similar to the smaller optical switch devices shown in FIGS. 1, 2, 5A, and 5B. Input optical signals are represented by the vertical lines just above the numbers 0 through 15 on the bottom side of the optical switch device triangle where it is labeled IN and before any intersections with horizontal lines. Output optical signals are represented by the horizontal lines just to the left of the numbers 0 through 15 on the right side of the optical switch device triangle where it is labeled OUT and before any intersections with vertical lines. The dashed lines 101–116 are reflecting surfaces, such as mirrors. Each intersection of continuous horizontal and vertical lines represents a double optical switch assembly configuration of the optical shutters of the present invention, as described herein. Similar to the functioning as described for FIGS. 1, 2, 5A, and 5B, for example, an optical signal entering on input path 3 maybe switched to output path 11 by switching the optical shutter at the intersection 1103 of the vertical line extending from input path 11 and the horizontal line extending from output path 3. This reflects the optical signal at the intersection 1103 to reflecting surface 111, where it is again reflected to exit on output path 11. Similarly, the input optical signals on any one of the input paths may be switched to exit on any one of the output paths.

Since the optical switch devices, such as 2×2 optical switch devices, may be used in conjunction with other components, including other 2×2 optical switch devices, an important feature is the convenient interconnection of the optical components in the case of optical switching devices in both waveguide and free space configurations. The optical switch devices of this invention may have a wide variety of alternative configurations where the input paths and the output paths for the optical signals have various orientations with respect to each other. For example, in FIGS. 1 and 2, the two input paths for the optical signals are parallel to each other, and the two output paths for the optical signals are parallel to each other and at right angles to the input paths. The optical shutters of this invention provide excellent flexibility for alternative orientations of the input and the output paths. For example, if it is desired to position two input optical paths such that when the optical shutter is in the transparent state, the two optical signals cross one another at an angle $\theta$ where this angle is determined with respect to the incoming paths, and when the optical shutter is in the reflective state, it is desired that the optical signals switch positions on the output optical paths, this may be obtained if the double optical shutter assembly configuration of the optical shutter is positioned with the reflecting surface on the optical input side at an angle of one half of $\theta$ to the input optical path.

Figure 10:
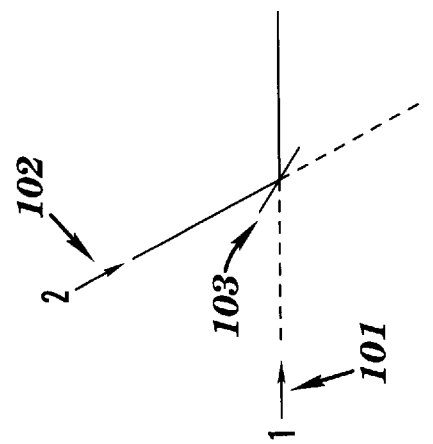
FIG. 10 shows one embodiment of the optical shutters of the present invention in the reflective state with an angle of 30° between the paths of the optical signals and the reflective surfaces of the optical shutters.

For example, referring to FIG. 10 in a top down view similar to that in FIGS. 5A and 5B with the double optical shutter assembly configuration of the optical shutter represented as a single line, the input path 1 for the first optical signal 101 is at an acute angle to the input path 2 for the second optical signal 102. $\theta$ in this case is 60° so one half of $\theta$ is 30°. For the reflective state of the optical shutter 103, the path taken by the first optical signal 101 is represented by a dashed line, and the path taken by the second optical signal 102 is represented by a solid line. The output paths for both of these optical signals are at an angle of one half of $\theta$ or 30° with respect to the plane of the reflecting surfaces of the optical shutter 103.

Figure 11:
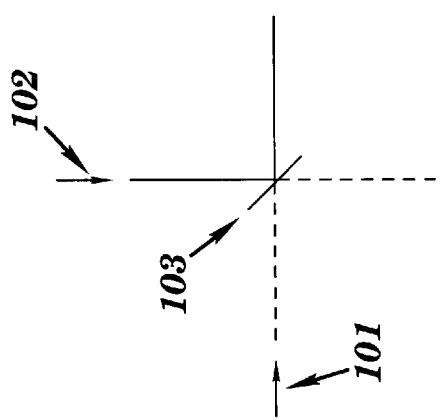
FIG. 11 shows one embodiment of the optical shutters of the present invention in the reflective state with an angle of 45° between the paths of the optical signals and the reflective surfaces of the optical shutters.

FIG. 11 further illustrates the flexibility of the orientation of the input and output optical paths with the optical shutters and switch devices of the present invention. In this case, the input paths for the two optical signals 101 and 102 are at right angles to each other. $\theta$ is thus 90°, and one half of $\theta$ is 45°. As with FIG. 10, in FIG. 11, for the reflective state of the optical shutter 103, the path taken by the first optical signal 101 is represented by a dashed line, and the path taken by the second optical signal 102 is represented by a solid line. The output paths for both of these optical signals are at an angle of one half of $\theta$ or 45° with respect to the plane of the reflecting surfaces of the optical shutter 103.

Figure 12:
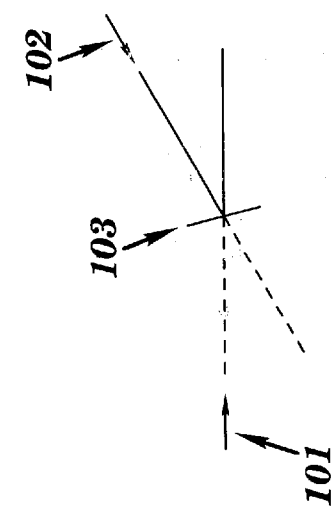
FIG. 12 shows one embodiment of the optical shutters of the present invention in the reflective state with an angle of 75° between the paths of the optical signals and the reflective surfaces of the optical shutters.

FIG. 12 provides another illustration of the flexibility of the orientation of the input and output optical paths with the optical shutters and switch devices of this invention. In this case, the input paths for the two optical signals 101 and 102 are at an angle of 150° to each other, and one half of $\theta$ is 75°. As with FIGS. 10 and 11, for the reflective state of the optical shutter 103, the path taken by the first optical signal 101 is represented by a dashed line, and the path taken by the second optical signal 102 is represented by a solid line. Accordingly, the output paths for both of these optical signals is at an angle of one half of $\theta$ or 75° with respect to the plane of the reflecting surfaces of the optical shutter 103.

Thus, in one embodiment of the optical switch devices of the present invention, the reaction product formed in the photon-absorbing layer is an organic free radical compound. In one embodiment, the absorption of photons images at least one of the one or more optical shutters comprising the photon-absorbing and surface layers from the second state of high reflectivity and opacity to the first state of low reflectivity and transparency, and preferably, the reaction product is formed from an organic free radical compound.

In one embodiment, the optical switch devices comprise an organic free radical compound, and the free radical compound is a salt of an aminium radical cation. In a preferred embodiment, the organic free radical compound is a salt of a tetrakis[4-(dialkylamino)phenyl]-1,4-benzenediamine radical cation. In a preferred embodiment, the free radical compound is a salt of a N,N-dialkyl-N',N'-bis[4-(dialkylamino)phenyl]-1,4-benzenediamine radical cation. In one embodiment, the free radical compound is a salt of an anthrasemiquinone radical anion. In one embodiment, the wavelength range of the photons to form the reaction product from the organic free radical compound comprises one or more ultraviolet wavelengths. In one embodiment, the wavelength range of the photons to form the reaction product comprises one or more visible wavelengths from 400 to 700 nm. In one embodiment, the wavelength range of the photons to form the reaction product comprises one or more near-infrared wavelengths from 700 to 2000 nm. In one embodiment, the application of an electric current, as known in the art of electrochromic imaging utilizing the application of an electric current, is utilized to form the reaction product from the organic free radical compound and to regenerate the organic free radical compound from the reaction product.

In one embodiment of the optical switch devices of this invention, the reversible imaging of the optical shutters between the first and second states of low and high absorption and/or reflectivity, respectively, is induced by absorption of photons, and wherein the wavelength range of photons imaging the optical shutters from the first state to the second state is different from the wavelength range of photons imaging the optical shutters from the second state to the first state. In one embodiment, the range of wavelengths which photolytically induces switching between the first and second states is from 400 to 2000 nm. In one embodiment of the optical switch devices of this invention, the reversible imaging between the first and second states is induced by applying an electric current.

In one embodiment of the optical switch devices of the present invention, an optical combining device is present in at least one of the two or more output paths to direct the optical signal to the selected one of the two or more output paths.

In one embodiment of the optical switch devices of this invention, the optical signal is reflected from at least one of the first and second surfaces of the optical shutter at an angle from 1° and 89°, as illustrated, for example, in FIGS. 10, 11, and 12. In one embodiment, the optical signal is reflected from at least one of the first and second surfaces of the optical shutter at an angle of 45°, as illustrated, for example, in FIG. 11.

In one embodiment of the optical switch devices of the present invention, the number of the input optical paths is from 2 to 1280, the number of the output optical paths is from 2 to 1280, and the number of the optical shutters comprising the photon-absorbing and surface layers is from 1 to 9600. In one embodiment, the optical switch device is connected to input optical paths or to output optical paths of one or more other optical switch devices, such as an optical buffer, for example, as described herein. In one embodiment, the second surface layer of the optical shutter is reflective so that a different optical signal can be reflected while the first surface layer is reflecting the optical signal. In this case, for example, the optical shutters of the present invention may also switch optical signals traveling in opposite directions in the same input optical paths and output optical paths. In one embodiment, optical signals in the one or more input optical paths and the two or more output optical paths are bi-directional, and the optical switch device is characterized by the ability to switch the optical signals traveling in opposite directions through the optical switch device.

In one embodiment of the optical shutters and switch devices of this invention, the optical shutters may comprise three or more surface layers in a transparent state and a photon-absorbing layer in a transparent state and interposed between each of the three or more surface layers. For example, the optical shutter could be cubic in shape and have 6 surface layers with the photon-absorbing layer between each of the 6 surface layers or have 3 to 5 only of the sides of the cubic-shaped optical shutter that are surface layers that reversibly image between a transparent state and a reflective state while the photon-absorbing layer reversibly images between a transparent state and an opaque state. These optical shutters and switch devices with three or more transparent-to-reflective surface layers may be useful in certain applications requiring a more complex geometry for the paths of the optical signals.

In one embodiment of the optical switch devices of this invention, the optical switch device further comprises an optical wavelength conversion element to convert the optical signal at the wavelength, such as 1542 nm, to a second different wavelength, such as 1544 nm. This provides additional flexibility in switching the optical signals to other output paths, such as to other available wavelengths in the same or in a different optical fiber. For example, the addition of one or more optical wavelength conversion elements could convert the eighty 16×16 optical switch devices described in connection with FIG. 9 into a 1280×1280 optical switch device, where any input optical signal may be switched to any one of the 1280 possible output paths for the output optical signals. Preferred are optical wavelength conversion elements which are capable of converting the optical signal to a different wavelength that is one, two, or three wavelength increments above or below the wavelength of the input optical signal, as the transmission wavelength increments are specified in the industry standards for the transmission wavelengths for optical Internet telecommunications. Stable organic free radical compounds typically have large molecular structures in order to stabilize the free radical moiety. As such, they typically have large molecular cross-sections, very high absorption extinction coefficients, and often sub-picosecond speed conversions of photons absorbed to heat, to electron transfer reactions, and to luminescence. Accordingly, these organic free radical compounds may be modified to provide non-linear optical properties that alter the frequency of the photons passing through a layer comprising the organic free radical compound and thereby provide a wavelength conversion to the photons. In one embodiment, the optical wavelength conversion layer comprises an organic free radical compound. In one embodiment, the optical switch device further comprises an optical wavelength conversion element to convert the optical signal having a first wavelength to an optical signal of a second different wavelength. In one embodiment, the optical wavelength conversion element comprises an organic free radical compound as an active material for converting the wavelength of the optical signal having the first wavelength to an optical signal of a second different wavelength.

Methods of Switching Optical Signals

As described herein, the optical shutters and switch devices of the present invention provide a variety of methods for switching an optical signal from an input optical path to a selected output optical path.

One aspect of this invention pertains to a method for switching an optical signal from one input optical path to a predetermined one of a plurality of different output optical paths, which method comprises the steps of (a) providing a free-space optical switch device, comprising an optical shutter disposed between an input optical path and a first and second output optical paths, the optical shutter being switchable between a transparent state in which the light from the input path is transmitted through the optical shutter to the first output path, and a reflective state in which the light from the input path is reflected from the optical shutter to the second output path; (b) inputting an optical signal into the input path; and (c) providing photons to switch the optical shutter reversibly between the transparent state and the reflective state in order to selectively direct the optical signal to a predetermined one of the output paths. In one embodiment, instead of photons in step (c), there is a step (c) of providing electrons from applying an electric current at a first voltage and removing electrons from applying an electric current at a second voltage to switch the optical shutter reversibly between the transparent state and the reflective state in order to selectively direct the optical signal to a predetermined one of the output paths. In one embodiment, the optical shutter comprises a first surface layer in a transparent and non-reflective state, a second surface layer in a transparent and non-reflective state, and a photon-absorbing layer in a transparent state and interposed between the first and second surface layers. In one embodiment, the optical shutter absorbs photons to change at least one of the first and second surface layers to a state of high reflectivity and to change the photon-absorbing layer to a state of opacity; and wherein the optical shutter is reversibly imageable between the transparent and non-reflective and the reflective states. In one embodiment, the optical shutter removes electrons from the application of an electric current at a voltage to change at least one of the first and second surface layers to a state of high reflectivity and to change the photon-absorbing layer to a state of opacity; and wherein the optical shutter is reversibly imageable between the transparent and non-reflective and the reflective states. In one embodiment, the reverse imaging from the reflective state to the non-reflective and transparent state of the optical shutter is induced by providing electrons from the application of an electric current at a voltage. In one embodiment, the photon-absorbing layer comprises an organic free radical compound in at least one of the first and second states. In one embodiment, at least one of the first surface layer and the second surface layer comprises an organic free radical compound in at least one of the first and second states.

Another aspect of this invention pertains to a method for switching an optical signal from one input optical path to a predetermined one of a plurality of different output optical paths, which method comprises the steps of (a) providing a optical switch device, comprising an optical shutter disposed between an input optical port in a first input waveguide and both a first output optical port in a first waveguide and a second output optical port in a second output waveguide, the optical shutter being switchable between a transparent state in which the light from the input port is transmitted through the optical shutter to the first output port, and a reflective state in which the light from the input port is reflected from the optical shutter to the second output port; (b) inputting an optical signal into the input port; and (c) providing photons to switch the optical shutter reversibly between the transparent state and the reflective state in order to selectively direct the optical signal to a predetermined one of the output ports. In one embodiment, the optical shutter comprises a first surface layer in a transparent and non-reflective state, a second surface layer in a transparent and non-reflective state, and a photon-absorbing layer in a transparent state and interposed between the first and second surface layers. In one embodiment, the optical shutter is characterized by the absorption of photons to change at least one of the first and second surface layers to a state of high reflectivity and to change the photon-absorbing layer to a state of opacity; and wherein the optical shutter is reversibly imageable between the transparent and non-reflective and the reflective states. In one embodiment, the photon-absorbing layer comprises an organic free radical compound in at least one of first and second states. In one embodiment, at least one of the first surface layer and the second surface layer comprises an organic free radical compound in at least one of the first and second states. In one embodiment, instead of photons in step (c), there is a step (c) of providing electrons from the application of an electric current to switch the optical shutter reversibly between the transparent state and the reflective state in order to selectively direct the optical signal to a predetermined one of the output ports.

Another aspect of the present invention pertains to a method for switching an optical signal from one or more input optical paths to a predetermined one of two or more output optical paths, which method comprises the steps of (a) providing an optical switch device, comprising an optical shutter disposed between the one or more input optical paths and the two or more output optical paths; (b) inputting an optical signal into the one or more input paths; and (c) providing photons to switch the optical shutter between a first state of low reflectivity and a second state of high reflectivity in order to selectively direct the optical signal to a predetermined one of the two or more output paths. In one embodiment, instead of photons in step (c), there is a step (c) of providing electrons from the application of an electric current at a first voltage and removing electrons from the application of an electric current at a second voltage to switch the optical shutter between a first state of low reflectivity and a second state of high reflectivity in order to selectively direct the optical signal to a predetermined one of the two or more output paths.

Optical Buffers

The optical shutters of the present invention may be utilized to prepare an optical buffer to store optical signals for a specified delay time before sending the optical signals on to their next destination in the optical network system. As the bit rates and the quantities of optical signals increase, a situation known generally as data contention, as known in the art of fiber optic communication channels, becomes more prevalent. This is especially a technical challenge as the fiber optic communication channels evolve to nanosecond optical burst switching and nanosecond optical packet switching. Data contention involves, for example, two different packets of optical signals being in contention at the same time for transmission to their next destination in the optical network. To resolve this contention, one of the packets of optical signals may be delayed in its transmission, such as, for example, by being placed into a fiber delay line where the speed of light (about 0.3 mm per picosecond) may be used to provide the specified delay time. Individual fixed fiber delay lines are expensive, complex, space-consuming, and relatively inflexible to making variations in the desired delay time. These disadvantages may be overcome by utilizing the optical shutters of the present invention in an optical buffer.

Figure 13:
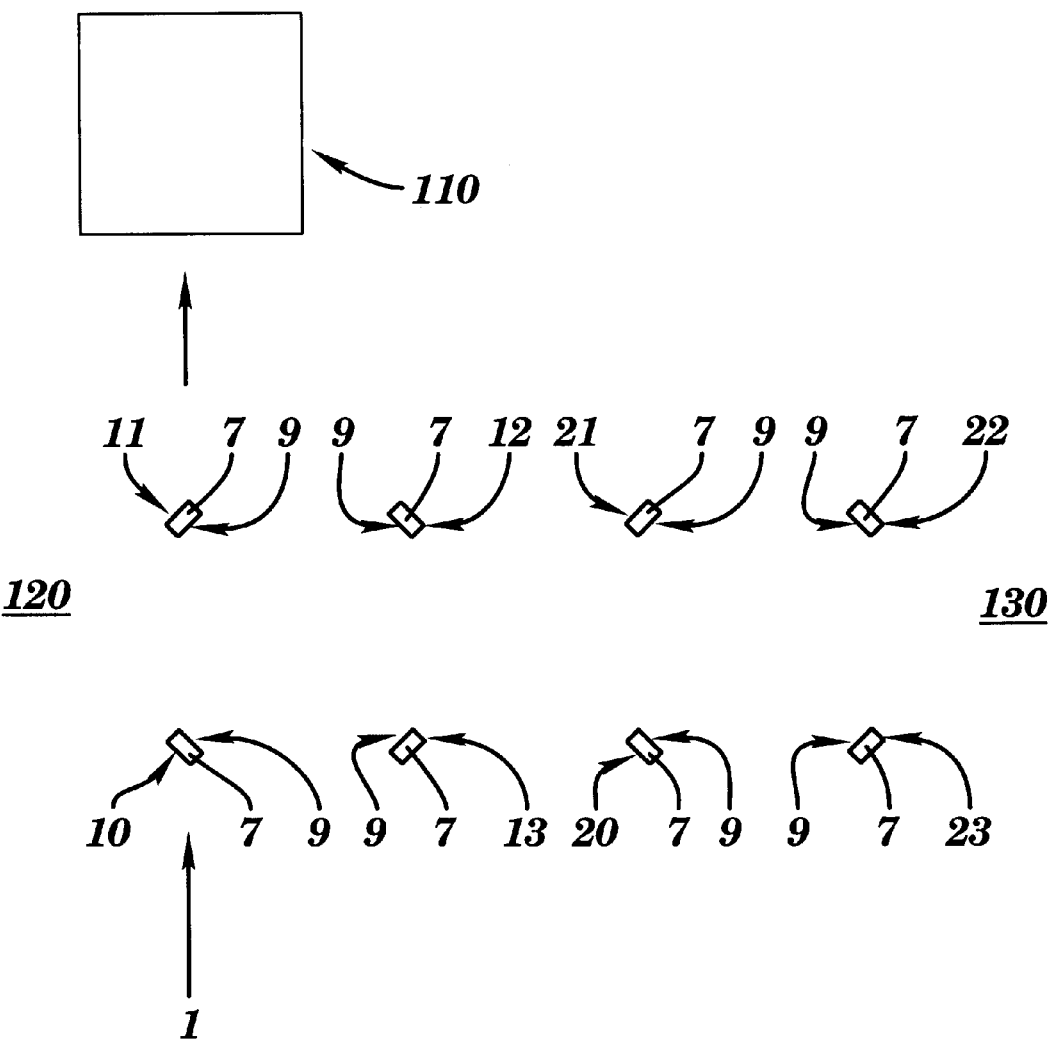
FIG. 13 illustrates one embodiment of an optical buffer utilizing the optical shutters of the present invention.

Referring to FIG. 13, in one embodiment of an optical buffer, utilizing the optical shutters of this invention having reversible imaging between both low and high absorption states of a photon-absorbing layer and between low and high reflectivity states of a surface layer, is illustrated. An optical signal 1 at a wavelength, such as, for example, 1620 nm, or at multiple wavelengths, such as, for example, 80 wavelengths in the range of 1530 to 1620 nm, is directed to an optical network destination 110, such as, for example, an optical switch device for network optical core switching or an optical amplifier or an electro-optic switch array for network edge switching, as described for example in "Architectural and Technological Issues for Future Optical Internet Networks," in *IEEE Communications Magazine,* September 2000, pages 82 to 92, and references therein, by Listanti et al., the disclosures of which are fully incorporated herein by reference. Optical signal 1 must pass through optical shutters 10 and 11 of optical buffer 120 prior to continuing on to optical network destination 110. If a data contention or other reason to delay the transmission of optical signal 1 occurs, optical shutter 11 comprising a surface layer 9 of a low reflectivity state and a photon-absorbing layer 7 is imaged, for example, as described previously for the similar optical shutters 14 and 16 in FIG. 1. Optical signal 1 is then reflected to optical shutter 12 comprising a surface layer 9 of a low reflectivity state and a photon-absorbing layer 7 and, if delay in optical buffer 120 is desired, optical shutter 12 is imaged, for example, as described previously for the similar optical shutters 14 and 16 in FIG. 1. Optical signal 1 is then reflected to optical shutter 13 comprising a surface layer 9 of a low reflectivity state and a photon-absorbing layer 7 and is imaged, for example, as described previously for the similar type of optical shutters 14 and 16 in FIG. 1. Optical signal 1 is then reflected to optical shutter 10 comprising a surface layer 9 of a low reflectivity state and a photon-absorbing layer 7 and is imaged, for example, as described previously for the similar type of optical shutters 14 and 16 in FIG. 1. Optical signal 1 is then reflected to optical shutter 11, which by the time optical signal 1 has traveled around optical buffer 120, has undergone the reverse reaction to regenerate the states of the low absorption and the low reflectivity.

If no further delay is required, optical shutter 11 is not imaged, and optical signal 1 continues on to optical network destination 110. If further delay is required, optical shutter 11 is imaged, and optical signal 1 is reflected again to optical shutter 12 and the process of storing or delaying optical signal 1 in optical buffer 120 continues until no further delay is required when optical signal 1 reaches optical shutter 11. If only a single optical buffer is required, optical shutters 12 and 13 do not need to be optical shutters and may be permanent reflective surfaces, such as mirrors. At about 0.3 mm per picosecond for the speed of light, the distance traveled by optical signal 1 in optical buffer 120 may be set to provide the desired delay time in a single loop or in multiples of single loops around optical buffer 120. If the desired delay time varies and can not be met with a single loop or any number of multiples of single loops, the distance for a single loop in optical buffer 120 may be adjusted by moving two or more of the four optical shutters or mirrors to create a new distance for a single loop or any number of multiple loops which matches the new desired delay time.

If delay or optical signal storage in optical buffer 130 is desired instead, optical shutter 12 is not imaged, and optical signal 1 continues on to optical buffer 130. Optical shutters 20, 21, 22, and 23 have the same layers and alternative permanent reflective surfaces as herein described for optical shutters 10, 11, 12, and 13, respectively, in FIG. 13. Thus, it can be seen that optical signal 1 may be circulated in a loop around optical buffer 130 by imaging the optical shutters and may continue back to optical buffer 120 if optical shutter 20 is not imaged when optical signal 1 reaches optical shutter 20. When optical signal 1 is back in optical buffer 120, optical signal 1 may be circulated in a loop around optical buffer 120 by imaging the optical shutters and may continue on to optical network destination 110 if optical shutter 11 is not imaged when optical signal 1 reaches optical shutter 11. An optical buffer, such as optical buffer 130, that does not have an optical shutter in the direct path of optical signal 1 to optical network connection 110 is particularly advantageous to avoid additional data contention by having the optical signals in the optical buffer, such as optical buffer 120, pass additional times through the input optical path where they may interfere with a new input optical signal. Also, this is useful when the desired delay time is long, such as more than 10 nanoseconds.

Similar optical buffers may be provided in other locations adjacent to optical buffers 120 and 130 in a manner similar to which optical buffers 120 and 130 are adjacent to each other and may also be accessed by optical signal 1. Also, the reflective surface of one or more optical shutters in a first optical buffer may be angled such that the optical signal is reflected to a second optical buffer on a different plane. Similarly, the reflective surface of one or more optical shutters in the second or other optical buffer may be angled such that the optical signal is reflected back to the plane of the first optical buffer. This would provide more flexibility in storing and retrieving the optical signals from a number of optical buffers of the present invention. Additional optical buffers would provide additional buffering capacity and additional flexibility in handling a variety of optical data packets which may have a wide range of byte sizes from, for example, 50 bytes to 1500 bytes and thus may have varying desired delay times which are not all integer multiples of each other. As one alternative to additional optical buffers connected optically to a first optical buffer, a single optical buffer may have more than two optical shutters on each edge of the optical buffer, such as, for example, a total of 100 optical shutters opposite to each other on each edge instead of the two pairs of two optical shutters opposite to each other on each edge in optical buffers 120 and 130, so that the delay time may be readily changed by the choice of which of the optical shutters to image when the optical signal reaches the specific optical shutter.

Thus, one aspect of the optical buffers of this invention pertains to an optical buffer for storing an optical signal for a desired time, which optical buffer comprises at least two optical shutters positioned at first distances and first angles from each other, wherein the at least two optical shutters are imageable by photons and have a first state of a low absorption at a wavelength and a second state of a high absorption at the wavelength, which optical shutters comprise a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein the at least two optical shutters are reversibly imageable between the first and second states of absorption; and the at least two optical shutters further comprise a surface layer having a low reflectivity state at the wavelength, wherein the at least two optical shutters are characterized by absorption of the photons to form a surface layer having a high reflectivity state and by a reverse reaction of the high reflectivity state to regenerate the low reflectivity state, wherein the at least two optical shutters are reversibly imageable between the low and high reflectivity states; and wherein at least two of the at least two optical shutters are interposed between an input path carrying the optical signal and an output path for the optical signal.

In one embodiment of the optical buffers of this invention, the absorption of the photons images the optical shutter from the first state of low absorption to the second state of high absorption. In one embodiment, the optical buffer further comprises two or more reflective surfaces, such as, for example, two or more "transparent-to-reflective" optical shutters or two mirrors, positioned at second distances and second angles from the at least two optical shutters to return the optical signal to at least one of the at least two optical shutters. In one embodiment, the first distances, first angles, second distances, and second angles are selected to return the optical signal in the desired time to one of the at least two optical shutters interposed between the input optical path and the output optical path. In one embodiment, the first distances, first angles, second distances, and second angles are adjustable to match changes in the desired time for storing the optical signal.

In the optical buffers of the present invention, the photon-absorbing layers of the optical shutter preferably comprise an organic free radical compound, but other materials that induce a reversible "transparent-to-opaque" imaging of the photon-absorbing layer may be utilized.

In the buffering of optical signals, the following are some useful terms and definitions of the terms. The term, "transparent signal," as used herein, means an optical signal that is not decoded and individual bit values are not known by the optical component, such as an optical switch device. The term, "decoded signal," as used herein, means an optical signal that is decoded and individual bit values are known by the optical component. For transparent signals, time is partitioned into slots, and the entity that may be buffered is the portion of the optical signal that is within a given time slot. The optical component needs to have timing synchronized with other components, in order to know the epochs of the boundary of the time slots. For a decoded signal, the timing circuit of the optical component needs to be synchronized to the bit boundary times. The segment of an optical signal that occupies a given time slot is referred to herein as an "optical signal parcel" or "optical parcel." A transparent signal may be buffered by some type of an optical switch device, including optical switch devices comprising a delay line in one or more output optical paths, as described herein.

To better understand the design of an optical buffer comprising an optical switch device and one or more delay lines and for use with transparent signals, Table 1 provides examples of lengths for the delay line. The bit rate of the digital signal and the size of the data parcel to be handled in a time slot (quantities not known to the optical components) implies the nominal duration of the time slot, not consider ing any padding or added duration for various overheads, such as for forward error correction (FEC). Assuming a

TABLE 1

| Bit Rate of Digital Signal (Gigabits/second) | Size of Data Parcel (Bytes) | Duration of Time Slot (Nanoseconds) | Length of Delay Time (Meters) |
|---|---|---|---|
| 40 | 64 | 12.8 | 2.56 |
| 40 | 128 | 25.6 | 5.12 |
| 10 | 64 | 51.2 | 10.24 |
| 40 | 512 | 102.4 | 20.48 |
| 40 | 1,500 | 300.0 | 60.00 |
| 10 | 1,500 | 1,200.0 | 240.00 | speed of light in the given medium of 0.2 meters/nanosecond, the duration of the time slot implies the length required for the delay line to buffer the optical signal parcel for one slot time.

Figure 14:
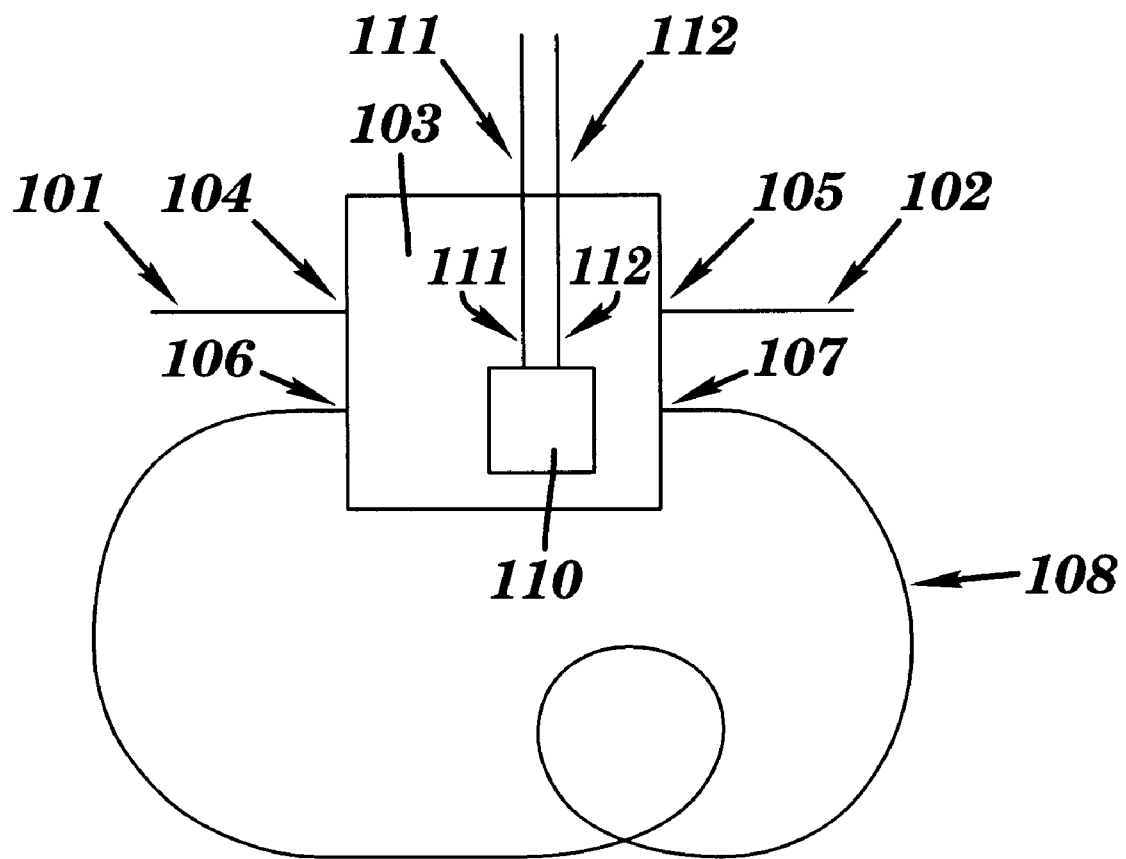
FIG. 14 shows one embodiment of an optical buffer comprising a 2×2 optical switch device.

FIG. 14 shows one embodiment of an optical buffer for a single optical parcel, wherein the optical buffer comprises ingress and egress waveguides 101 and 102, a two-state 2×2 optical switch device 103, such as, for example, an optical switch device of this invention as illustrated in FIG. 3, with ports 104, 105, 106, and 107, and a delay line 108. The delay line 108 may, for example, involve connecting an output optical path and an input optical path of a 2×2 optical switch device to form a continuous optical path between egress port 107 and ingress port 106, such as, for example, by connecting output waveguide 52 to input waveguide 52 in FIG. 3. At the beginning of a time slot, if the switch 103 is in a first state, such as the transparent and non-reflective state, then for the given time slot, an optical parcel, if any, incoming on waveguide 101 and ingress port 104, will not be buffered and will exit on egress port 105 and waveguide 102, and a second optical parcel, if any, previously buffered in the delay line will recirculate in the delay line 108 for the present time slot, and in so doing will pass through ingress port 106 and egress port 107. Likewise, at the beginning of a time slot, if the switch 103 is in a second state, such as the reflective state, then for the given time slot, an optical parcel, if any are incoming on waveguide 101 and ingress port 104, will be buffered and will exit switch 103 on egress port 107 and enter the delay line 108, and a second optical parcel, if any, previously buffered in the delay line will not recirculate and will enter ingress port 106 and exit on egress port 105 and waveguide 102. The 2×2 optical switch device 103 comprises a control component 110 that processes the timing and control information from control input lines 111 and 112 and actuates any change in state as needed at the beginning of each time slot.

Figure 15:
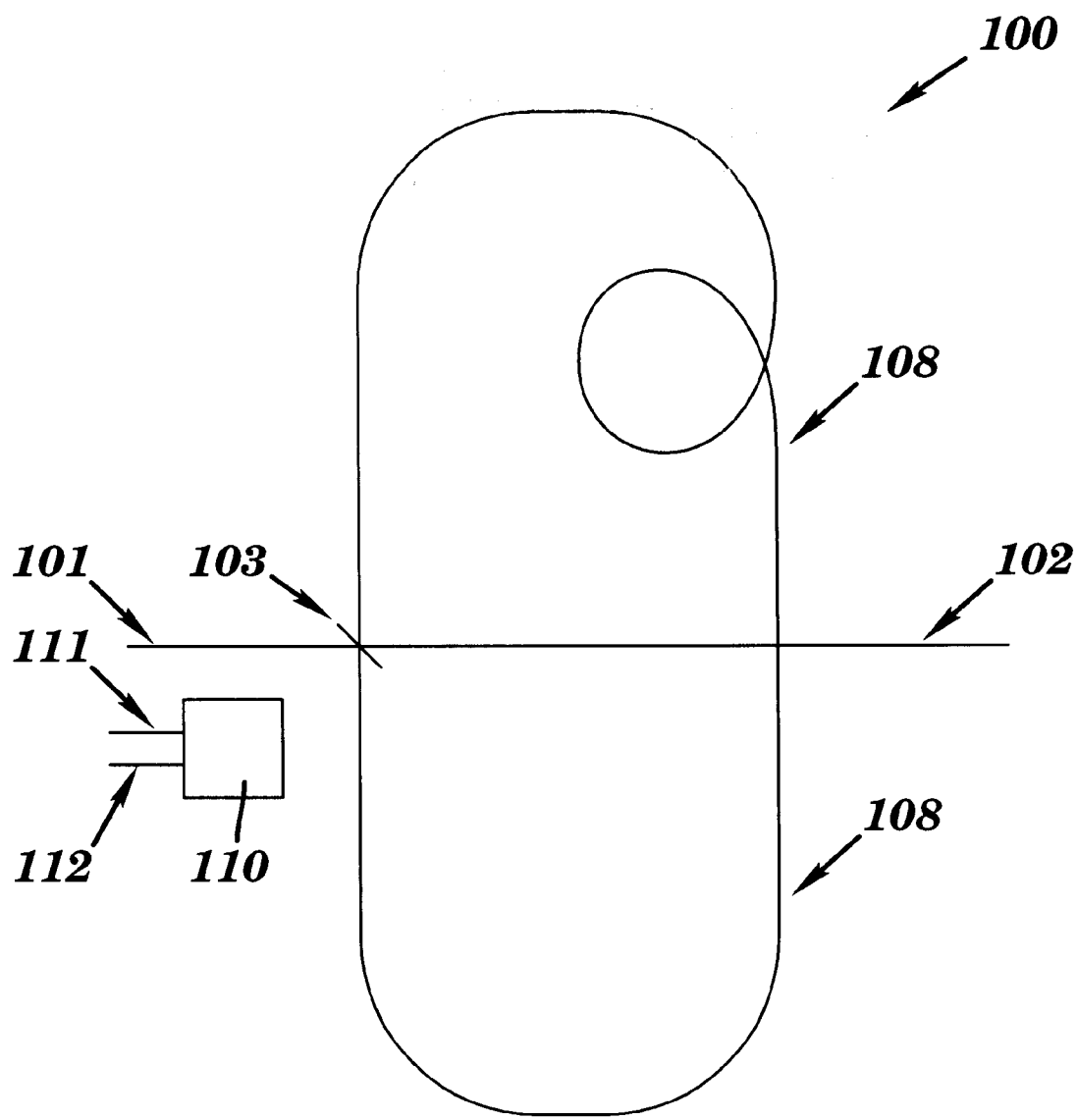
FIG. 15 shows one embodiment of an optical buffer comprising a reflective optical shutter.

In FIG. 14, the optical buffer is based on a 2×2 optical switch device, where the 2×2 optical switch device is used as a discrete component. FIG. 15 discloses an embodiment of an optical buffer where the discrete component is the optical shutter. This is particularly useful for integration of multiple optical buffers, as described herein. In analogy with FIG. 14, FIG. 15 shows an optical buffer for a single optical parcel, wherein the optical buffer 100 comprises ingress and egress waveguides 101 and 102, a double sided controlled-reflective optical shutter 103 of the present invention, and a delay line 108. At the beginning of a time slot, if the optical shutter 103 is in the transparent and non-reflective state or, simply, the transparent state as used herein to denote the switched state with both transparent and non-reflective properties, then for the given time slot, an optical parcel, if any, incoming on waveguide 101 will not be buffered and will exit on waveguide 102, and a second optical parcel, if any, previously buffered in the delay line will recirculate in the delay line 108 for the present time slot. Likewise, at the beginning of a time slot, if the optical shutter 103 is in the double-sided reflective state, then for the given time slot, an optical parcel, if any, incoming on waveguide 101 will be buffered by being reflected at optical shutter 103 and entering the delay line 108, and a second optical parcel, if any, previously buffered in the delay line will not recirculate and will also be reflected at optical shutter 103 and exit on waveguide 102. This embodiment also includes a control unit 110 which via input lines 111 and 112, respectively, receives timing information in order to remain synchronized to time slot boundaries, and receives control information regarding the appropriate state for the optical shutter for each time slot. The control unit 110 then actuates the appropriate state for the optical shutter.

A key feature of the optical buffers shown in FIGS. 14 and 15 is that the optical parcel can recirculate in the delay line. Thus, from an architecture viewpoint, the delay line only needs to be long enough to store an optical parcel for a single time slot. From a functionality viewpoint, the duration that an optical parcel is buffered does not need to be known, determined, or fixed at the time the parcel is first buffered.

The two-state 2×2 optical switch device has a wide range of flexibility in the relative orientation of the ingress and egress ports. Also, a key feature of the configuration is that the 2×2 optical switch device may change state on the order of a few picoseconds, which is much faster than the duration of the time slot, which typically is tens of nanoseconds. Thus, the optical switching function may impose negligible overhead to the time slot duration.

Figure 16:
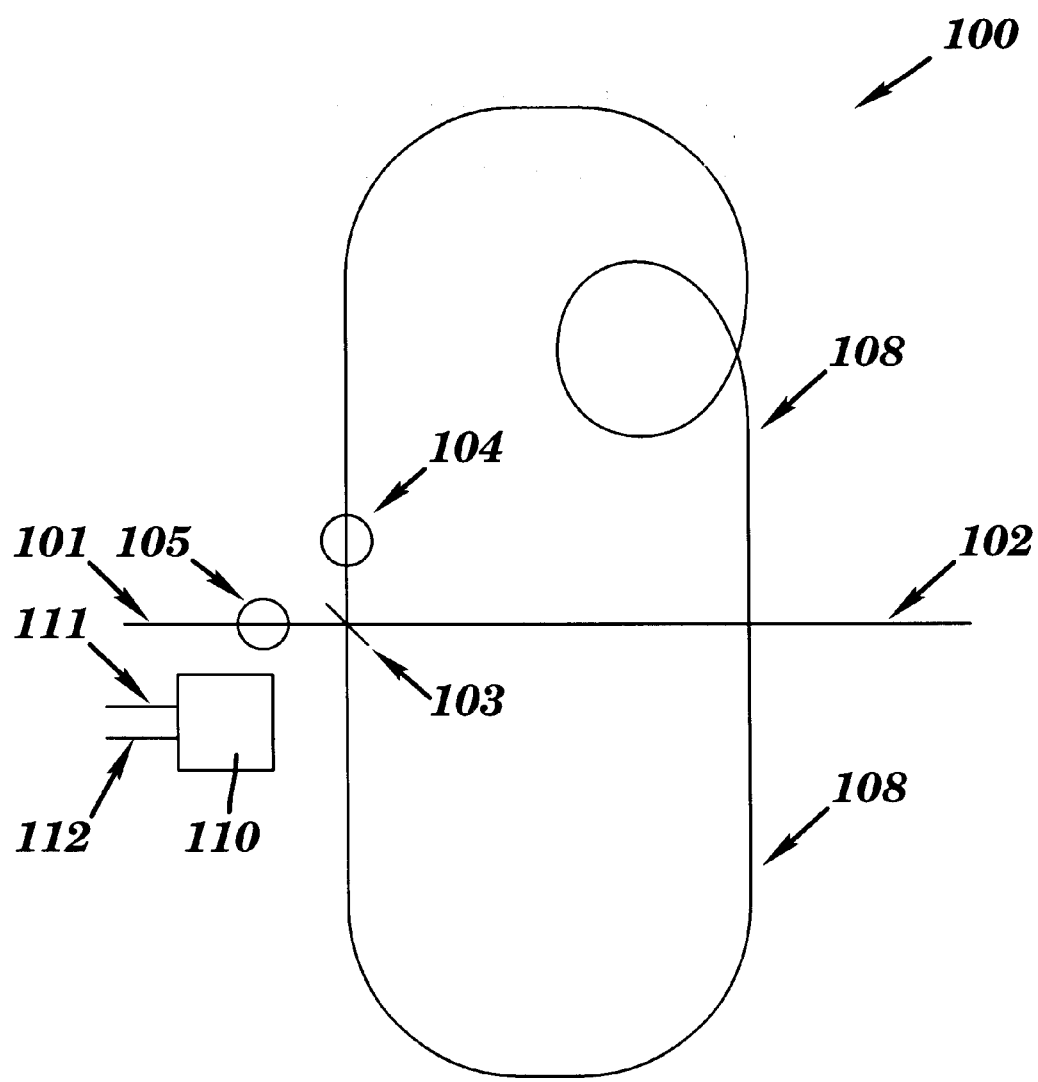
FIG. 16 illustrates one embodiment of an optical buffer for discarding a buffered optical signal.

FIG. 16 shows an embodiment of an optical buffer with an added feature relative to the optical buffer shown in FIG. 15, whereby a buffered optical parcel can be discarded in a given time slot. The embodiment shown in FIG. 15 has two alternative actions in a given time slot for an arriving, or a previously buffered, optical parcel: the optical parcel can either continue to be buffered or become buffered, or the optical parcel can exit from the component. In contrast, the embodiment shown in FIG. 16 has a third alternative of discarding the buffered optical parcel. Discard is an important feature in the circumstance when an arriving optical parcel is by some criterion more important than the optical parcel previously buffered and when it is not appropriate, or is not desired, to allow the previously buffered optical parcel to egress or exit from the component. In this circumstance, one wishes to have the functionality of overwriting the previously stored optical parcel with the new one. Analogously, if the arriving optical parcel is less important than the previously buffered optical parcel and neither should exit the component in the given time slot, then one wishes to discard the arriving optical parcel. The optical buffer shown in FIG. 16 has these functionalities. FIG. 16 is the same as FIG. 15, except FIG. 16 has additional optical shutters 104 and 105 and where these additional optical shutters can be in either a transparent or an absorbing, opaque state. The control unit 110 actuates the states of optical shutters 103, 104, and 105. When optical shutters 104 and 105 are in the transparent state, then the optical buffer 100 in FIG. 16 is functionally equivalent to the one in FIG. 15. However, when the optical shutter 104 is in the absorbing state and optical shutter 105 is in the transparent state for a given time slot, then an optical parcel, if any, previously stored in the delay line will be discarded as the photons of the stored optical signal reach the absorbing optical shutter 104. This functionality of discard enables the overwriting of a previously stored optical parcel with a new one, whereby an optical parcel arriving on waveguide 101 can be buffered in delay line 108 in the same time slot as a previously buffered optical parcel is discarded by being absorbed in optical shutter 104. Likewise, when optical shutter 105 is in the absorbing state and optical shutter 104 is in the transparent state, then an arriving optical parcel will be discarded, and a previously buffered optical parcel will remain in the optical buffer.

Figure 17:
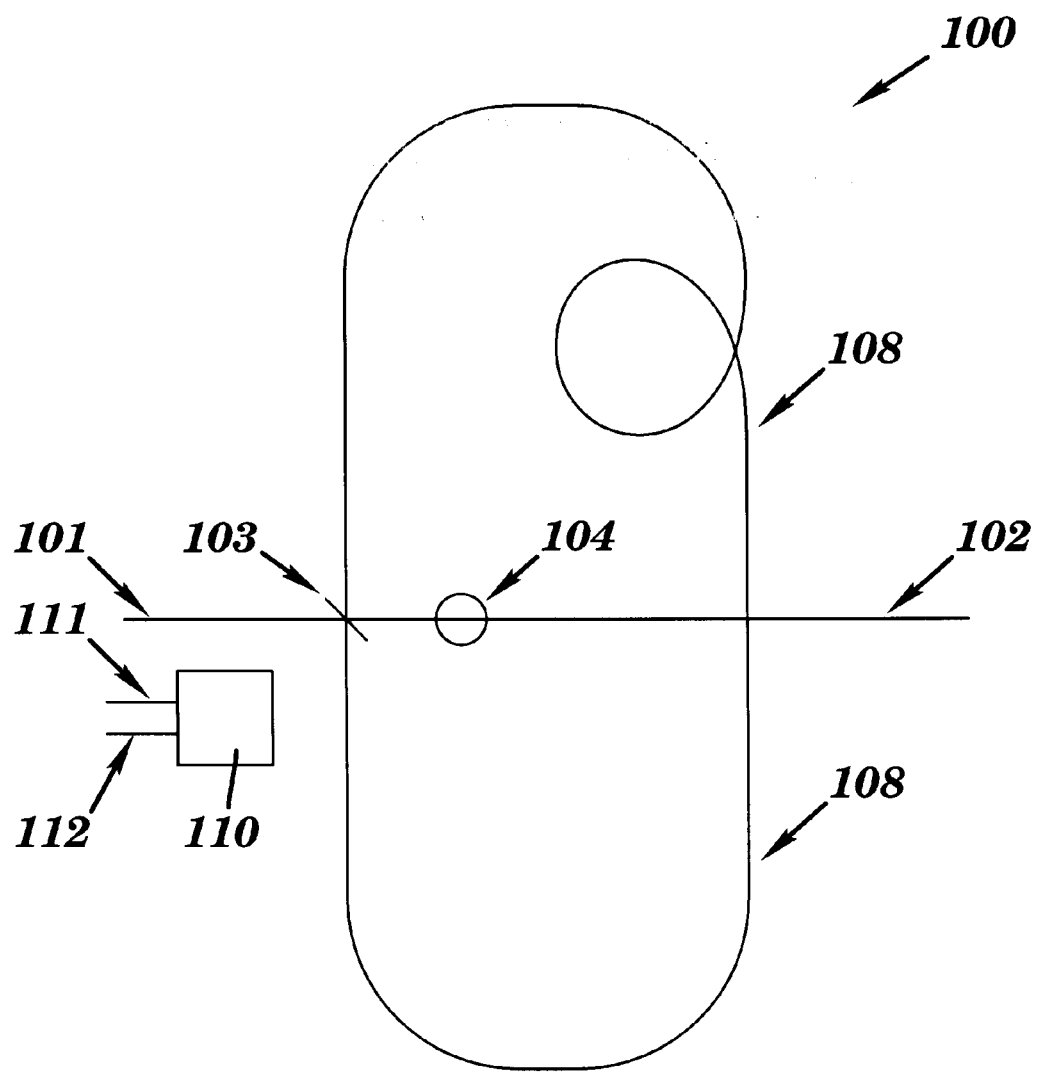
FIG. 17 shows another embodiment of an optical buffer for discarding a buffered optical signal.

The embodiment shown in FIG. 16 enables the following specialized alternatives to FIG. 15: (1) an arriving optical parcel can exit the optical buffer and a buffered optical parcel can be discarded when optical shutters 103 and 105 are transparent and optical shutter 104 is absorbing; and (2) an arriving optical parcel can be discarded and a buffered optical parcel can exit the optical buffer when optical shutter 103 is reflective, optical shutter 104 is transparent, and optical shutter 105 is absorbing. If the only interest in discard options is where a discard would occur when an optical parcel remains in, or is added to, the optical buffer, then the above two alternatives are not needed, and the configuration of the optical buffer may be simplified by using two, as opposed to three, optical shutters. FIG. 17 illustrates this embodiment where a single, transparent-to-absorbing optical shutter 104 is placed downstream of the transparent-to-reflective optical shutter 103. The numbers in FIG. 17 have the same meaning as used for these same symbols in FIG. 16.

Figure 18:
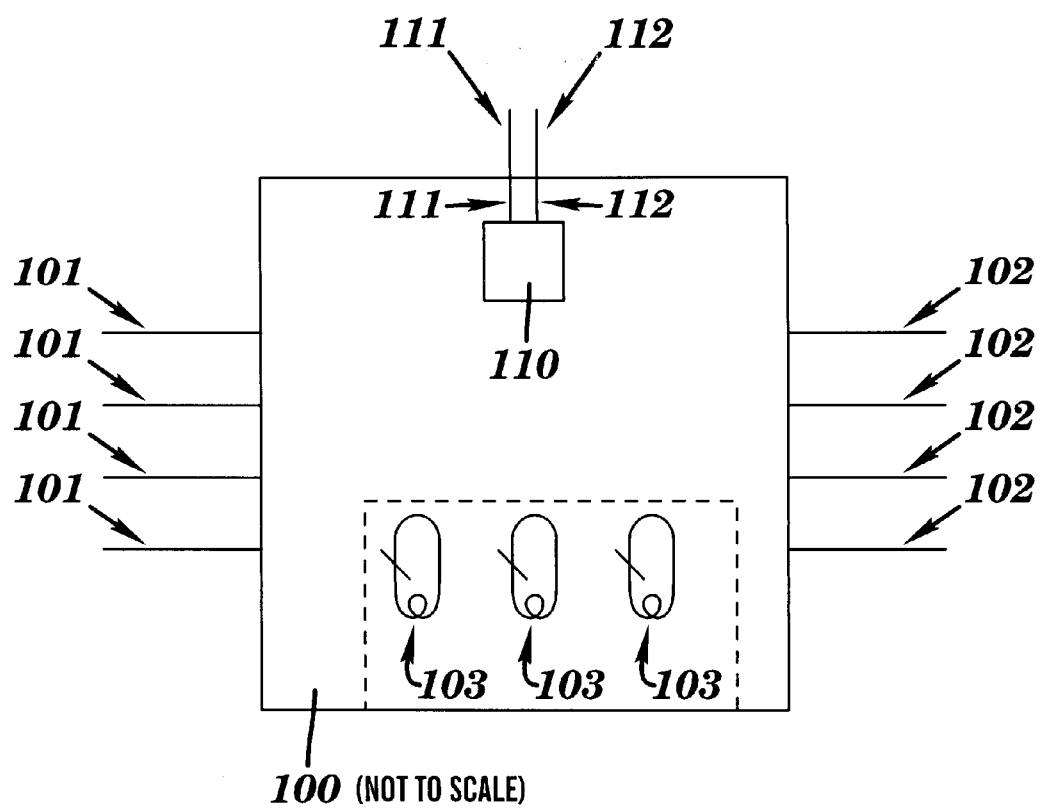
FIG. 18 shows one embodiment of an optical buffer with multiple ingress and egress ports and multiple single-parcel optical buffers.

FIG. 18 shows one embodiment of a general configuration for an optical buffer 100 (not to scale) with one or more ingress ports 101 and one or more egress ports 102, where the optical buffer 100 comprises one or more single-parcel optical buffers 103 and a control unit 110 with input lines 111 and 112 for timing and control information, respectively. The single-parcel optical buffers 103 comprise one or more optical shutters and a delay line as, for example, shown in FIGS. 15 and 16. For the sake of simplicity and clarity, FIG. 18 shows a specific and limited number of ingress and egress ports and single-parcel optical buffers. The ingress ports, the single parcel optical buffers, and the egress ports are mutually interconnected. A specific interconnection is not shown in FIG. 18. The single-parcel optical buffers 103 are shown inside optical buffer 100 in a cut-away view indicated by the area bordered by the dashed lines. Many particular configurations are possible, and a few illustrative configurations are described herein. In each time slot, at most one optical parcel arrives at each ingress port 101 and at most one optical parcel exits on each egress port 102. The optical parcel that arrives, if any, could potentially exit on an egress port 102 or be buffered in a selected single-parcel optical buffer 103, or be discarded. Likewise, of the optical parcels previously buffered in the single-parcel optical buffers 103, if any, at most one can exit on each of egress ports 102. Each remaining previously buffered optical parcel, on a per-parcel basis, can continue to be buffered, for example by shifting from one single-parcel buffer to another, or can be discarded. At the beginning of each time slot, the control unit 110 actuates the states of the optical shutters in the single-parcel optical buffers 103 to obtain the desired configuration.

A key feature of the optical buffer shown in FIG. 18 is that it enables the flexibility that for each time slot any one of the optical parcels previously buffered can be output on an egress port. Thus, there is no constraint on the order of service. A second key feature is that this embodiment enables the flexibility to discard any arriving or previously buffered optical parcels.

As used herein, the well-known term, "service discipline," means the determination of the arriving of the optical parcel and of which previously buffered optical parcel will exit the component in a given time slot. As used herein, the well-known term, "buffer management," means the determination of where arriving and previously buffered optical parcels are stored and to be stored or transmitted, including the option of discarding an optical parcel. The optical buffer illustrated in FIG. 18 is particularly advantageous in enabling arbitrary service disciplines and buffer management policies. One important application is as an input optical buffer with output optical paths to an optical switch device or to an optical packet switch where the signals switched are optical parcels. Thus, it functions as an input optical buffer to an optical switch device or an optical packet switch. The key features of arbitrary service discipline provided by the optical buffers of this invention enable resolution of the known problem of head of line blocking. Also, the features of the optical buffers enable various Quality of Service (QoS) alternatives. For example, one class of optical parcels could be served with priority over another. Another important application is for a shared optical buffer in the interconnection between smaller optical switch devices within a larger optical switch device or in a larger optical packet switch. Here again, the key features of arbitrary service discipline and buffer management policies can be utilized. A further important application is for optical interconnections more generally, beyond just its use in optical switch arrays or devices and in optical packet switches. Examples would be optical interconnections in a chip, chip-to-chip, board-to-board, and box-to-box applications, as these applications for ultrafast data communications are known in the art of digital data generation, transmission, receiving, and storage.

Although the optical parcel itself is transparent, if the control unit 110 uses attributes associated with the optical parcel, then these attributes can not be transparent. For example, one method is to encode the information in a header that is transmitted on the same optical channel and in advance of the optical parcel, and where the header can be decoded and information therein conveyed to control unit 110. Another example would be to send the header information on a separate optical channel that is used only for header information and supports optical parcels that are transmitted on one or more companion optical channels.

Figure 19:
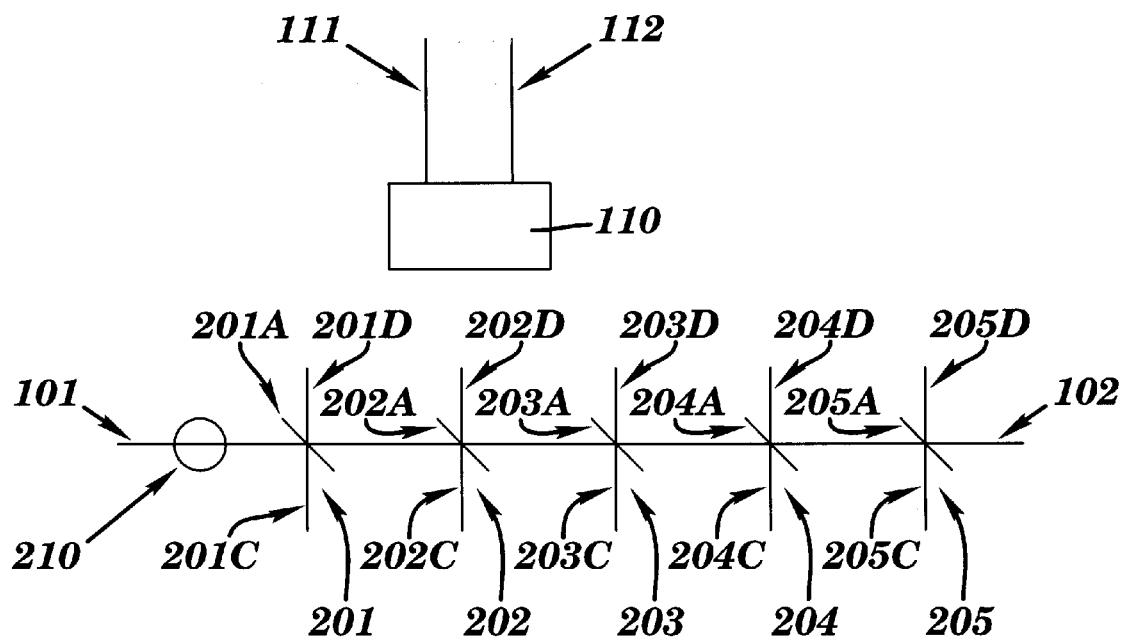
FIG. 19 shows one embodiment of an optical buffer with single-parcel optical buffers interconnected in a series configuration.
Figure 20:
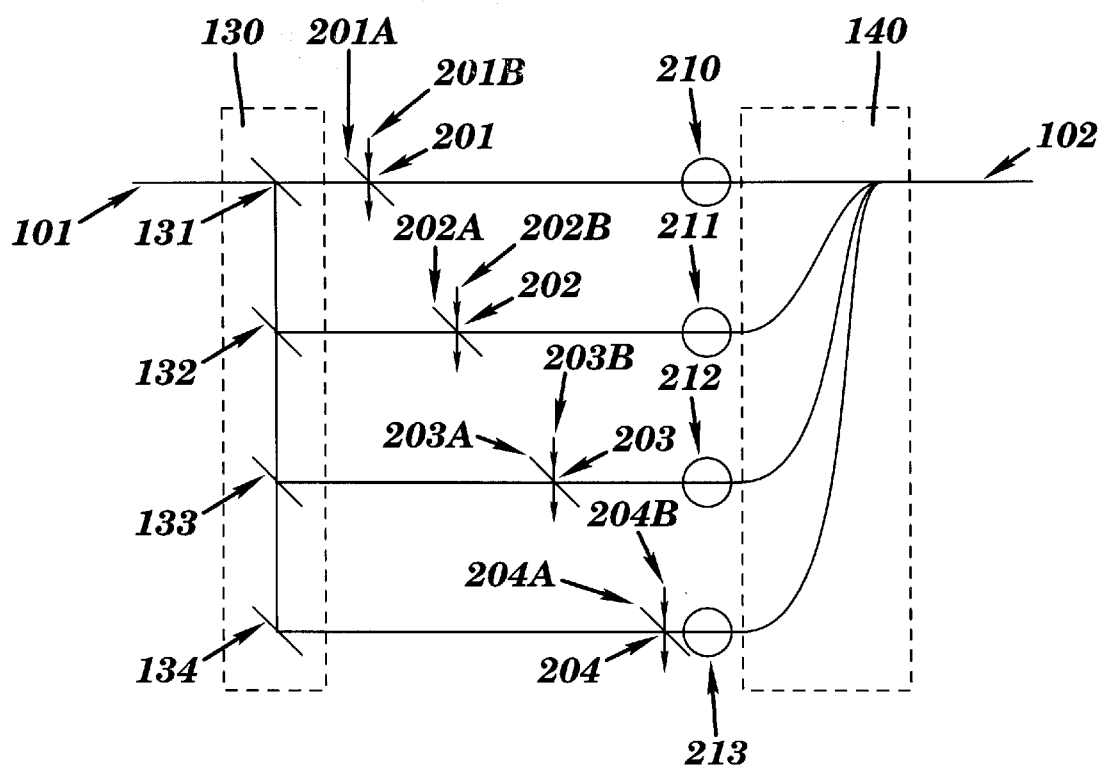
FIG. 20 shows one embodiment of an optical buffer with single-parcel optical buffers interconnected in a parallel configuration.

FIG. 19 shows an embodiment related to the optical buffer shown in FIG. 18. In FIG. 19, the single-parcel optical buffers are interconnected in a series, and there is a single ingress port and a single egress port. An arbitrary number of single-parcel optical buffers may be so interconnected and for illustration purposes, five are shown in FIG. 20. As in FIG. 15, double-sided controlled-reflective optical shutters of the present invention are used. At each optical shutter, nA, a delay line nB (not shown to avoid complicating the figure) connects waveguide nC to waveguide nD, for single-parcel optical buffers, where n=201, 202, 203, 204, and 205. A single transparent-to-absorbing optical shutter 210 is positioned between the ingress port 101 and the series of single-parcel optical buffers.

A control unit 110 with control input lines 111 and 112 for timing and control information, respectively, could actuate states of the optical shutters to obtain various service policies. One of the simplest policies is First-In-First-Out (FIFO), wherein in each time slot, the optical parcel that has been buffered the longest is the parcel to exit the component. Suppose during some time slots, the control unit is instructed that no optical parcel may exit. During such times, an arriving optical parcel is stored in the empty buffer that is closest to the egress. For example, the first such optical parcel to be stored is placed in the optical parcel buffer 205. In a time slot when the control unit may de-buffer an optical parcel, then the optical parcel in the optical parcel buffer closest to egress port 102 in FIG. 19 exits on port 102 and any other buffered optical parcel moves to the delay line one closer to the egress. For example, if optical buffers 203, 204, and 205 contain an optical parcel, then in the given time slot, optical shutters 203A, 204A, and 205A are set to the reflective state, and optical shutters 201A, 202A, and 210 are set to the transparent state. Thus, the optical parcel that had been stored in delay line 203B would be reflected at optical shutter 203A and thus exit from delay line 203B and then would be reflected at optical shutter 204A into delay line 204B. If an optical parcel were to arrive in the present time slot, it would be reflected at optical shutter 203A into delay line 203B. Optical shutter 210 is nominally in the transparent state. However in a time slot when no optical parcel may exit and all optical buffers are occupied and an optical parcel is arriving at ingress port 101, then optical shutter 210 is set to the absorbing state and the arriving optical parcel is discarded.

It should be noted that the FIFO implementation described above required no knowledge of any attributes associated with the optical parcels. The control information needed by the control unit 110 is only whether any optical parcel is allowed to exit on egress port 102 in a given time slot. The control unit 110 itself can maintain the state information of the number of optical buffers presently storing an optical parcel.

A more general service policy could make use of attributes associated with individual optical parcels. Via the control information input line 112, the control unit 110 could know the attributes associated with the optical parcels. Based on these attributes, the control unit 110 would determine which optical parcel, either buffered or just arriving, should exit on egress waveguide 102. If a previously buffered optical parcel is the appropriate parcel to exit the component, and a new optical parcel is arriving, the new optical parcel can be placed in the optical buffer being freed by the departing optical parcel.

One constraint imposed by the series configuration is that in a given time slot, if an arriving optical parcel is to be buffered and a buffered optical parcel is to exit, then the arriving optical parcel can not be buffered in a delay line that is situated downstream from the delay line that contained the exiting optical parcel. Using FIG. 19 as an example, if an optical parcel is exiting from delay line 203B to egress port 102, then the arriving optical parcel may be buffered in delay lines 201B, 202B, or 203B, but not in delay lines 204B or 205B.

FIG. 20 shows single-parcel optical buffers 201, 202, 203, and 204 arranged in parallel and interconnected with the ingress port 101 and egress port 102 via a 1×N optical switch device 130 (shown in area bordered by dashed lines) and N×1 optical combiner 140 (shown in area bordered by dashed lines), respectively. For reasons of simplicity and clarity, FIG. 20 shows the case when N is 4. As in FIG. 19, the single-parcel optical buffers use transparent-to-reflective optical shutters 201A, 202A, 203A, and 204A, and delay lines 201B, 202B, 203B, and 204B, where the latter are not fully shown and are indicated by lines with arrows to avoid complicating the figure. The configuration in FIG. 20 enables an arriving optical parcel to be stored in any "to be vacant" single-parcel optical buffer, regardless of which previously stored optical parcel is exiting on egress port 102 in the given time slot. To enable general discard policies, transparent-to-absorbing optical shutters 210, 211, 212, and 213 are positioned between the single-parcel optical buffers and the optical combiner 140. As an example of the operation of this embodiment, suppose optical parcels are previously stored in delay lines 201B and 202B, and suppose in the present time slot, the optical parcel in delay line 201B is to exit on port 102 and an arriving optical parcel is to be stored in single-parcel optical buffer 203. Then for this time slot, control unit 110 sets: (1) optical shutter 201A to be reflective, and optical shutter 210 to be transparent so that the optical parcel in delay line 201B will exit; (2) optical shutter 202A to be transparent, so that the optical parcel in delay line 202B will remain buffered; and (3) in the 1×N optical switch device 130, optical shutters 131 and 133 to be reflective, and optical shutter 132 to be transparent, and optical shutter 203A to be reflective so that the arriving optical parcel will enter delay line 203B. The state of the remaining optical shutters such as optical shutter 134 is not pertinent in this example for the present time slot. With some loss of flexibility but with some gain in simplicity, instead of N transparent-to-absorbing optical shutters with one downstream from each single-parcel optical buffer, a single transparent-to-absorbing optical shutter could be positioned between the N×1 optical combiner 140 and egress port 102.

Figure 21:
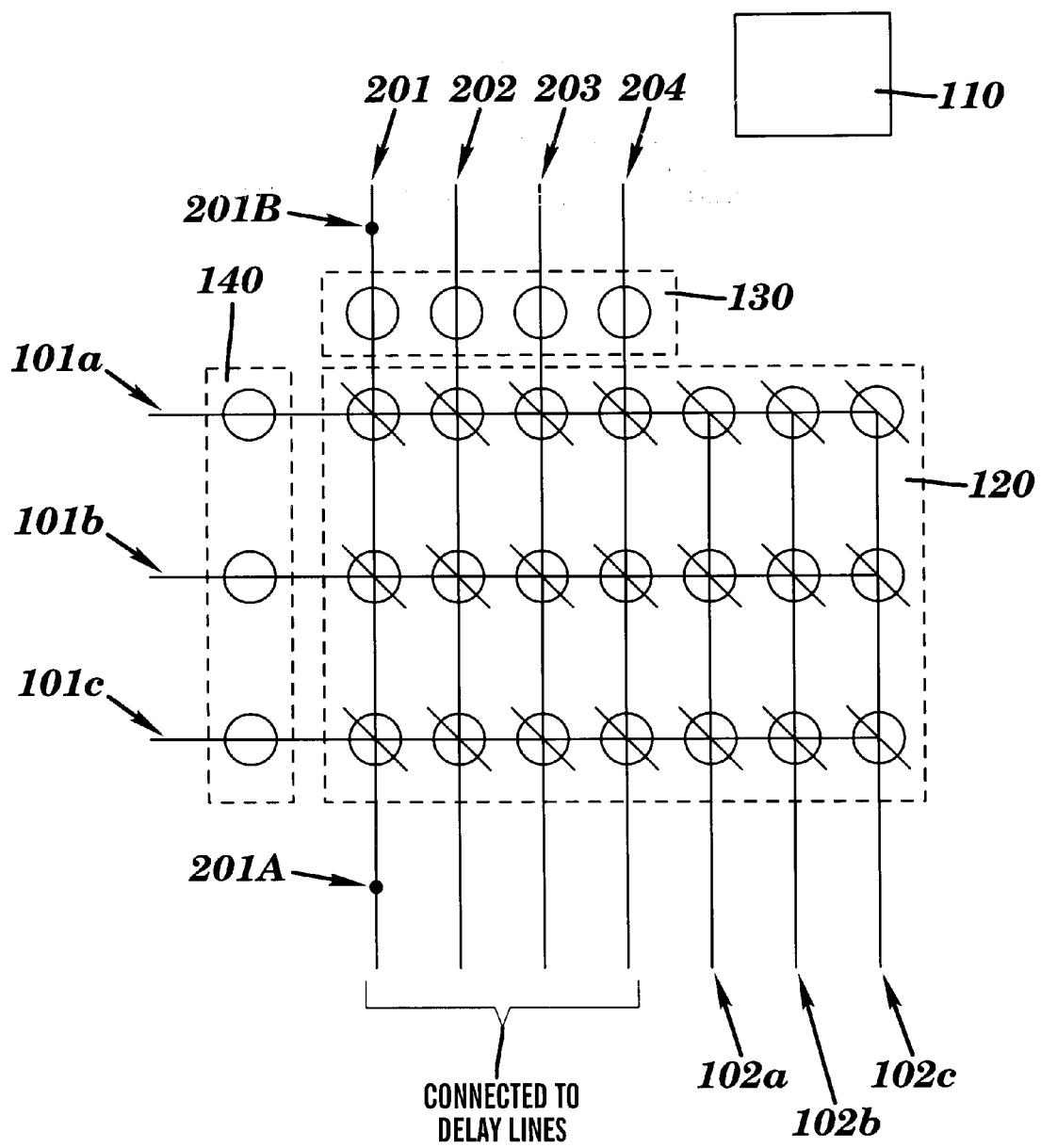
FIG. 21 illustrates one embodiment of an optical buffer with ingress ports, egress ports, and single-parcel optical buffers interconnected via a cross-bar configuration of optical shutters.
Figure 22:
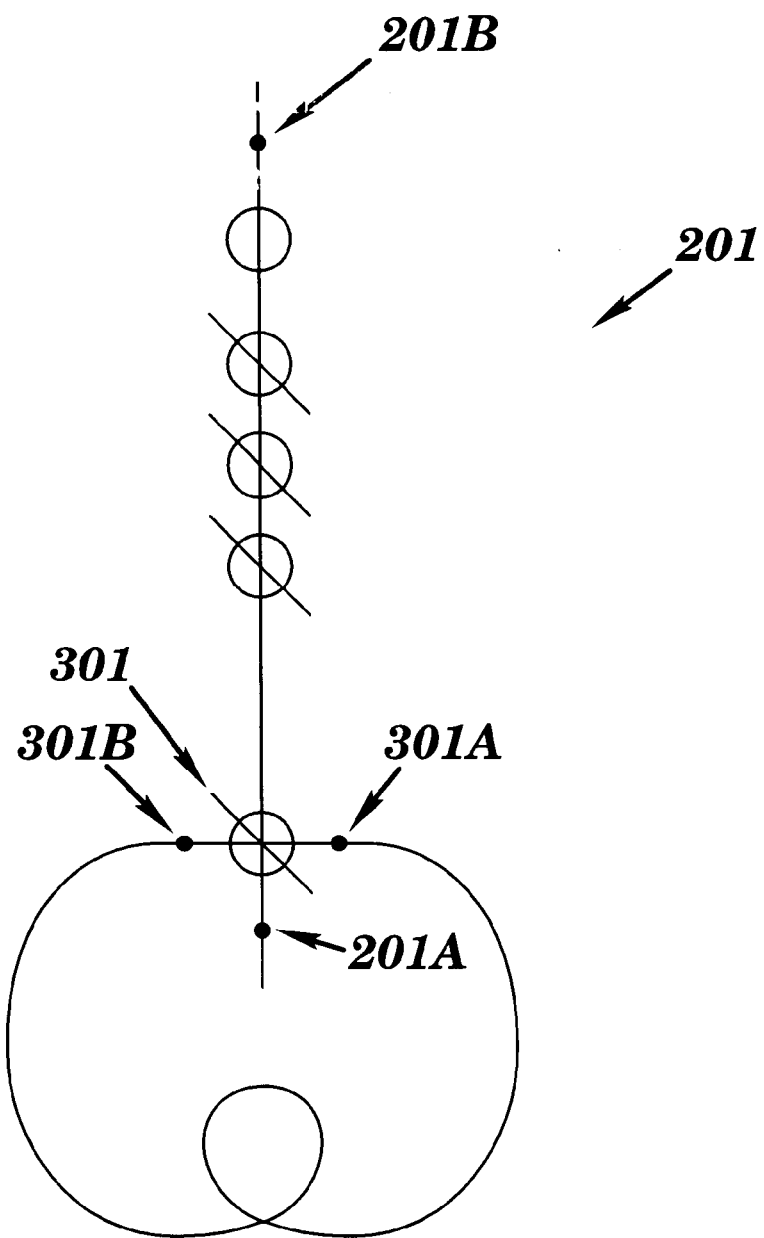
FIG. 22 shows one embodiment of an optical buffer where a stored optical parcel will pass through one optical shutter per time slot.

FIG. 21 shows an embodiment of an optical buffer where one or more ingress ports, egress ports, and single-parcel optical buffers are interconnected via a cross-bar configuration of optical shutters. This configuration places an emphasis on flexibility of service discipline and buffer management policies, at the expense of an otherwise greater number of optical shutters and associated complexity. In general, there may be M ingress ports, N egress ports, and B single-parcel optical buffers, where for simplicity and clarity, FIG. 22 shows three ingress ports 101a, 101b, and 101c, three egress ports 102a, 102b, and 102c, and four single-parcel optical buffers 201, 202, 203, and 204. Thus, in this example, M=3, N=3, and B=4. This configuration uses an M×(B+N) array 120 (shown in an area bordered by dashed lines) of transparent-to-reflective optical shutters to direct arriving optical parcels, or previously stored optical parcels, to any of the single-parcel optical buffers or to any of the egress ports 102. Also present are 1×B and M×1 arrays 130 and 140 (both shown in areas bordered by dashed lines), respectively, of transparent-to-absorbing optical shutters which can be used to implement discard policies. Also present is a control unit 110 that actuates the state of each of the optical shutters. An optical parcel that is stored in single-parcel optical buffer 201 passes through the column of optical shutters between points 201B and 201A and enters a delay line (not shown) that connects point 201A back to point 201B. The optical parcel first enters single-parcel optical buffer 201 when one of the transparent-to-reflective optical shutters in the column of optical shutters between points 201B and 201A is in the reflective state. Likewise, an optical parcel exits from single-parcel optical buffer 201 when one of the transparent-to-reflective optical shutters in the column of optical shutters between points 201B and 201A is in the reflective state. The other single-parcel optical buffers operate in a similar fashion.

One variation in the configuration of FIG. 21 minimizes the number of optical shutters that a stored optical parcel passes through per time slot. In FIG. 21, a stored optical parcel passes through M+1 optical shutters per time slot. FIG. 22 shows an alternative configuration for the single-parcel optical buffers wherein a stored optical parcel passes through only 1 optical shutter per time slot. In FIG. 22, the single-parcel optical buffer 201 of FIG. 21 is shown and contains an additional transparent-to-reflective optical shutter 301 upstream of point 201A. A delay line 108 is now connecting points 301A to 301B. Points 201A and 201B are still connected, but now with a short length connection on the order of the dimension of the M×(B+N) array. When an optical parcel is to be stored in optical buffer 201, the appropriate optical shutter in the M×(B+N) array and the optical shutter 301 are set to be reflective. For time slots where the optical parcel is to remain in the optical buffer 201, the optical shutter 301 is set to be transparent.

Thus, one aspect of this invention pertains to an optical buffer for storing an optical signal for a desired time, which optical buffer comprises two or more optical shutters positioned at one or more first distances and one or more first angles from each other, wherein the two or more optical shutters are imageable and have a first state of a low reflection, typically below 1% and preferably 0% or no reflectance, at a wavelength and a second state of a high reflection, typically above 3% reflectance and preferably above 80% reflectance and most preferably above 95% reflectance, at the wavelength, and wherein the two or more optical shutters are reversibly imageable between the first and second states. In one embodiment, at least two of the two or more optical shutters are interposed between an input optical path for the optical signal and an output optical path for the optical signal, and wherein a first imaging between the first and second states of at least one of the at least two of the two or more optical shutters directs the optical signal into storage in an optical buffer path between the input and output optical paths and wherein a subsequent imaging between the first and second states of at least one of the at least two of the two or more optical shutters directs the optical signal from the optical buffer path into the output optical path. In one embodiment, the wavelength is a near-infrared wavelength. In one embodiment, at least one of the two or more optical shutters is interposed between an input optical path for the optical signal and an output optical path for the optical signal, and wherein a first imaging between the first and second states of at least one of the two or more optical shutters directs the optical signal into storage in an optical buffer path between the input and output optical paths and wherein a subsequent imaging between the first and second states of at least one of the two or more optical shutters directs the optical signal from the optical buffer path into the output optical path.

In one embodiment of the optical buffers of this invention, the two or more optical shutters of the optical buffers comprise the optical shutters of the present invention, as described herein. In one embodiment, the two or more optical shutters in the second state comprise an organic free radical compound. In one embodiment, the two or more optical shutters are reversibly imageable between the first and second states by an absorption of photons. In one embodiment, the two or more optical shutters are imageable from the second state to the first state by an absorption of photons and are reversibly imageable from the first state to the second state by a thermal reaction after the absorption of photons. In one embodiment, the two or more optical shutters are reversibly imageable between the first and second states by applying an electric current.

In one embodiment of the optical buffers of the present invention, the first imaging is from the first state to the second state. In one embodiment, the subsequent imaging is from the second state to the first state.

In another embodiment of the optical buffers of this invention, the first imaging is from the second state to the first state. In one embodiment, the subsequent imaging is from the first state to the second state.

In one embodiment of the optical buffers of the present invention, the speed of imaging between the second state and the first state is from 0.5 to 100 nanoseconds, and wherein the speed of imaging between the first state and the second state is from 0.5 picoseconds to 100 nanoseconds. In one embodiment, the speed of imaging between the second state and the first state is from 1 picosecond to 100 picoseconds, and wherein the speed of imaging between the first state and the second state is from 1 picosecond to 100 picoseconds. In one embodiment, the wavelength is from 1250 nm to 1750 nm.

In one embodiment of the optical buffers of this invention, the optical buffer is an input optical buffer with the output optical path directed to an optical switch device having two or more output optical paths. In one embodiment, the optical buffer is switched to store one or more first optical signals, which one or more first optical signals having a timing contention with one or more second optical signals for switching at the same time to a specified output optical path of the optical switch device. In one embodiment, the optical buffer is subsequently switched to release the one or more first optical signals from storage in the optical buffer and to direct the one or more first optical signals to the optical switch device. In one embodiment, the one or more first optical signals are subsequently switched to the specified output optical path of the optical switch device.

In one embodiment of the optical buffers of the present invention, the optical buffer is a chromatic dispersion compensation device. In one embodiment, the output optical path of the chromatic dispersion compensation device is connected to a polarization dispersion compensation device prior to a multiplexing of the optical signal with one or more other optical signals. In one embodiment, the polarization dispersion compensation device further comprises a variable optical attenuator. In one embodiment, an optical amplifier is interposed between the chromatic dispersion compensation device and the polarization dispersion compensation device. In one embodiment, a variable optical attenuator is interposed between the optical amplifier and the multiplexer.

In one embodiment of the optical buffers of this invention, the two or more optical shutters comprise an organic free radical compound. In one embodiment, at least one of the two or more optical shutters absorbs photons to form a reaction product of the free radical compound, which reaction product has a change in reflection at the wavelength. In one embodiment, the reaction product undergoes a reverse reaction to regenerate the free radical compound.

In one embodiment of the optical buffers of the present invention, the two or more optical shutters comprise a surface layer having a low reflectivity state at the wavelength, wherein the two or more optical shutters absorb photons to form a surface layer having a high reflectivity state at the wavelength. In one embodiment, the two or more optical shutters undergo a reverse reaction of the high reflectivity state to regenerate the low reflectivity state.

In one embodiment of the optical buffers of this invention, the two or more optical shutters comprise a surface layer having a high reflectivity state at the wavelength, wherein the two or more optical shutters absorb photons to form a surface layer having a low reflectivity state at the wavelength. In one embodiment, the two or more optical shutters undergo a reverse reaction of the low reflectivity state to regenerate the high reflectivity state.

In one embodiment of the optical buffers of the present invention, the optical buffer comprises two or more reflective surfaces positioned at one or more second distances and one or more second angles from the two or more optical shutters to return the optical signal from the optical buffer path to at least one of the two or more optical shutters. In one embodiment, the first distances, first angles, one or more second distances, and one or more second angles are selected to return the optical signal in the desired time to at least one of the two or more optical shutters interposed between the input optical path and the output optical path. In one embodiment, the first distances, first angles, one or more second distances, and one or more second angles are adjustable to match changes in the desired time for storing the optical signal.

Methods of Storing Optical Signals in Optical Buffers

Figure 23:
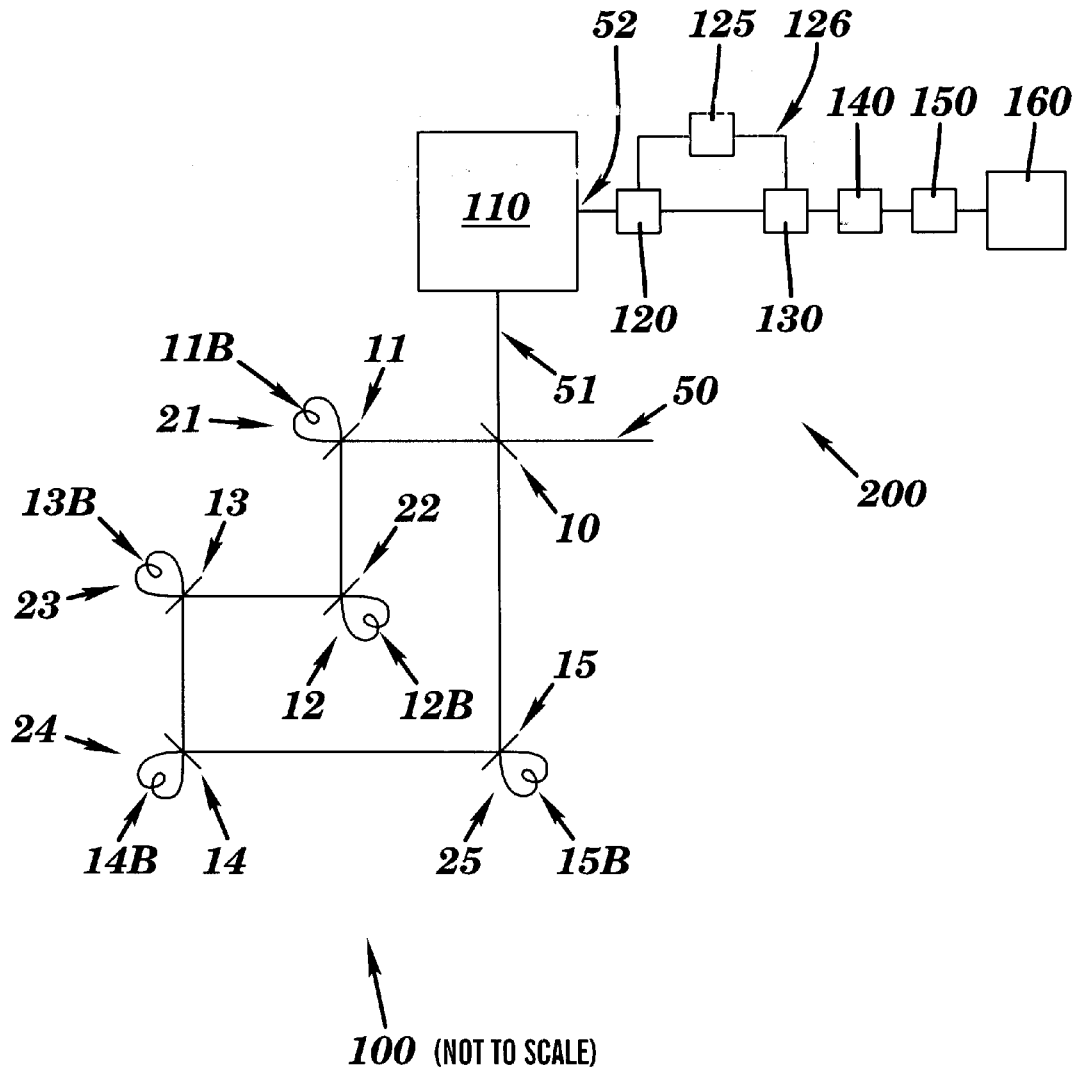
FIG. 23 shows one embodiment of an optical buffer interconnected into an optical system that includes an optical switch device and various optical signal monitoring and conditioning components.

Referring to FIG. 23, the optical shutters, switch devices, and buffers of the present invention are utilized in one embodiment to store an optical signal for a desired time. In optical buffer 100 (not to scale), optical shutters 10, 11, 12, 13, 14, and 15 are in the reflective state, as described, for example, in FIG. 11 and in the discussion relating to FIG. 11 herein. Since the organic free radical compounds are particularly stable in their absorbing and/or reflective state, the absorbing and/or reflective state is typically preferred, although not necessary, as the starting or default state of the optical shutters and switch devices of this invention. Delay lines 11B, 12B, 13B, 14B, and 15B function as both one of the input optical paths and one of the output optical paths in the 2×2-type single-parcel optical buffers 21, 22, 23, 24, and 25.

For the sake of clarity and simplification, only 5 single-parcel optical buffers and only a single optical buffer such as optical buffer 100 are shown, but the numbers of these optical buffers may vary over a large range. An egress port 51 from optical buffer 100 leads to an optical switch device 110. In turn, the optical switch device 110 is connected to an optical tap 120 to tap or switch off a small percentage of the optical signal to an optical channel monitor 125 to analyze the quality of the optical signal and provide feedback electrically to control a chromatic dispersion compensation device 130. Most of the optical signal from the optical tap 120 goes to the chromatic dispersion compensation device 130. In turn, after correcting the chromatic dispersion, the optical signal is sent to an optical amplifier 140 and further to a polarization dispersion compensation device 150 which may optionally comprise a variable optical attenuator and then to a multiplexer 160.

To illustrate one embodiment of the optical buffer and the method of storing an optical signal in an optical buffer for a desired time, for clarity and simplicity, only one input optical path into optical switch device 110 and only one of the possible output optical paths from optical switch device 110 is shown. An optical packet arriving at ingress port 50 may be reflected at optical shutter 10 to egress port 51 or may be buffered in optical buffer 100 by switching optical shutter 10 to the transparent and non-reflective state. If we consider optical switch device 110 to have four possible output optical paths for optical packets arriving at ingress port 50 and we assign single-parcel optical buffer 21 for temporary storage of an optical parcel and assign single-parcel optical buffers 22, 23, 24, and 25 to correspond respectively to each of the four possible output optical paths from the optical switch device 110, we will consider the case where output optical path 52 from the optical switch device 110 corresponds to single-parcel optical buffer 22. If the arriving optical parcel is buffered by switching optical shutter 10, it may either be temporarily stored in single-parcel optical buffer 21 by switching optical shutter 11 or it may be stored in one of the other single-parcel optical buffers depending on which output optical path from optical switch device 110 corresponds to the arriving optical parcel. Assuming that there is a signal contention and this arriving optical parcel is directed to an output optical path from optical switch device 110 that is different from output optical path 52 and an optical parcel already buffered in single-parcel optical buffer 22 is directed to go to output optical path 52, the arriving optical parcel is stored in single-parcel optical buffer 21. The buffered optical parcel is released from single-parcel optical buffer 22 by switching optical shutter 12. This previously buffered optical parcel then is directed by the reflective state of optical shutters 13, 14, and 15 to optical shutter 10, which is still in the transparent switched state during the time slot of the arriving optical packet. Thus, the buffered optical parcel is directed to egress port 51 and on to optical switch device 110 and output optical path 52. After the buffered optical packet is released from single-parcel optical buffer 22, the arriving optical parcel in single-parcel optical buffer 21 may be released by switching optical shutter 11 from its reflective to its transparent state and then switching the reflective optical shutter for whichever one of single-parcel optical buffers 13, 14, and 15 corresponds to the designated output optical path of optical switch device 110 for the arriving optical parcel. Thus, the temporary single-parcel optical buffer 21 provides flexibility in releasing an existing buffered optical parcel from a single-parcel optical buffer that is located before the desired single-parcel optical buffer for storing the arriving optical parcel.

As described herein, the optical shutters of this invention may be extremely small, such as 8 microns or less in each orthogonal dimension. However, the delay lines typically need to be many meters in length and typically utilize optical fibers with large diameters, such as 900 microns in diameter. These delay lines would be connected to the optical shutters of the single-parcel optical buffers, such as, for example, connected to a waveguide configuration of the optical shutters. Thus, the single-parcel optical buffers and the overall optical buffers comprising single-parcel optical buffers are relatively large in comparison to the optical shutters. Because of their size, many of these optical buffers can not be located conveniently together immediately adjacent to the optical switch devices and other optical components to which they are directly connected. For example, although optical shutter 10, ingress port 50, and egress port 51 may be in a waveguide configuration and may be integrated monolithically into the optical switch device 110, the optical path from optical shutter 10 to optical shutters 11 and 15 will typically be relatively long so as to provide the necessary space for the delay lines 11B, 12B, 13B, 14B, and 15B and for any other optical buffers (not shown in FIG. 23) also present.

The optical components in FIG. 23 that are in the optical path after the optical switch device 110 are shown for illustrative purposes, and each of them is optional and other types of optical components may be substituted or added to the overall optical transmission system 200. For example, after optical buffer 100 and optical switch device 110, some type of optical signal quality measurement, such as illustrated by an optical tap 120, optical channel monitor 125, and feedback control line 126, is typically desirable to determine the need for and the amount of optical signal conditioning. Since both optical buffering and optical switching have occurred for the optical signals, along with any chromatic dispersion that has occurred in the optical transmission line, there is typically a need for synchronizing the timing of the various wavelengths of the optical signals before any further signal conditioning, amplification, and multiplexing of the optical signals. It can be seen that the optical buffers of this invention with their ability to delay the timing of optical signals and optical parcels are suitable for use in chromatic dispersion compensation and other timing synchronization applications. After the timing of the various optical signals at the different wavelengths is compensated, the optical signal quality may be further improved by, for example, amplification and polarization dispersion compensation with optional gain equalization by a variable optical attenuator (VOA) as shown in FIG. 23, before the optical signals pass to a multiplexer or to a detector to convert them to electrical signals.

Thus, one aspect of this invention pertains to a method of storing an optical signal in an optical buffer for a desired time, which method comprises the steps of (i) providing one or more optical shutters interposed between an input optical path for the optical signal and an output optical path for the optical signal, wherein the one or more optical shutters are imageable and have a first state of a low reflection at a wavelength and a second state of a high reflection at the wavelength, and wherein the one or more optical shutters are reversibly imageable between the first and second states; (ii) imaging at least one of the one or more optical shutters between the first and second states to direct the optical signal into storage in an optical buffer path between the input and output optical paths; and (iii) subsequently imaging at least one of the one or more optical shutters between the first and second states to direct the optical signal from storage in the optical buffer path into the output optical path. In one embodiment, the one or more optical shutters comprise optical shutters of the present invention, as described herein.

In one embodiment of the methods of storing an optical signal in an optical buffer of this invention, the optical buffer path in step (ii) comprises a first optical buffer path for the optical signal; and, after step (ii) and prior to step (iii), there is a step of imaging at least one of the one or more optical shutters in the first optical buffer path between the first and second states to direct the optical signal from the first optical buffer path into storage in a second optical buffer path; and wherein step (iii) subsequently images at least one of the one or more optical shutters between the first and second states to direct the optical signal from storage in the second optical buffer path into the output optical path. In one embodiment, the one or more optical shutters of step (i) are interposed between an input optical path for the optical signal and two or more output optical paths for the optical signal; and wherein the second optical buffer path is associated with a specific output optical path of the two or more output optical paths, and wherein step (iii) directs the optical signal from storage in the second optical buffer path into the specific output optical path. In one embodiment, the one or more optical shutters of step (i) are interposed between an input optical path for the optical signal and an optical switch device having two or more output optical paths.

In one embodiment of the methods of storing an optical signal in an optical buffer of the present invention, the one or more optical shutters in the second state comprise an organic free radical compound. In one embodiment, the one or more optical shutters are reversibly imageable between the first and second states by an absorption of photons. In one embodiment, the one or more optical shutters are imageable from the second state to the first state by an absorption of photons and are reversibly imageable from the first state to the second state by a thermal reaction after the absorption of photons. In one embodiment, the one or more optical shutters are reversibly imageable between the first and second states by applying an electric current.

Optical Buffers and Other Optical Devices Utilizing Organic Free Radical Compounds Due to the excellent absorption, reflectance, ease of switching by a simple electron transfer reaction by either absorption of photons or by the application of an electric current to provide electrons or take them away, and other properties of organic free radical compounds, a wide range of optical shutters and optical switch devices may be made that comprise organic free radical compounds, as described herein. Because of the many superior properties of the organic free radical compounds, such as their opacity and reflectance in one state and their transparency and non-reflectance in a second state when their switching is induced by absorbing photons, by applying an electric current to organic free radical compounds and their electron transfer reaction products, thermally, or by some other external energy source, there are many combinations of one or more organic free radical compounds in one or more layers, areas, or sections of optical devices that may be used to achieve the desired properties in a wide range of optical devices. This disclosure covers some specific and general embodiments and examples of the use of organic free radical materials to make optical shutters, optical switch devices, and optical buffers, but it will be apparent to one skilled in the art that a wide range of combinations, changes, and modifications can be made therein without departing from the spirit and scope thereof.

Preferred organic free radical compounds for the optical shutters, optical switch devices, optical buffers, and other optical devices of this invention are salts of aminium compounds, and more preferably, salts of aminium radical cations. More preferred organic free radical compounds for the optical shutters, optical switch devices, optical buffers, and other optical devices of this invention are non-polymeric organic free radical compounds, such as salts of aminium radical cations. Most preferred organic free radical compounds are salts of tris(4-dialkylaminophenyl) aminium radical cations and salts of tetrakis[4-(dialkylamino)phenyl]-1,4-benzenediamine radical cations.

Chart 1 shows the chemical structure of IR-99, a representative free radical compound for the reflective optical switch elements of this invention. IR-99 is an example of a salt of a tris(4-dialkylaminophenyl) aminium radical cation.

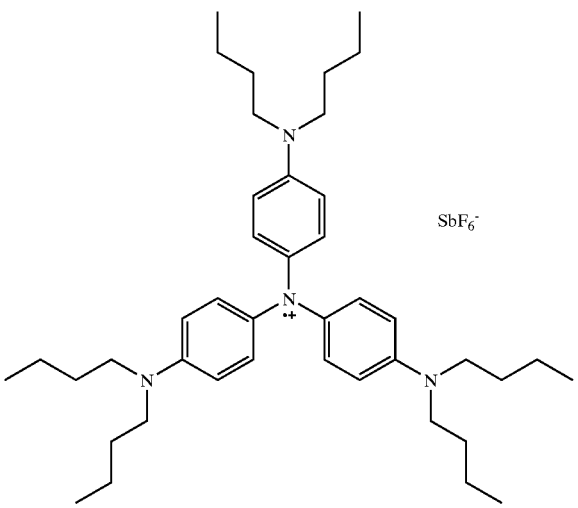

Chart 1

IR-99 Infrared Absorber for Reflective Optical Switch

It can be seen in Chart 1 that IR-99 is an organic free radical compound with a single free electron shown on one of the nitrogen atoms. It is present in a salt form with a hexafluoroantimonate anion in this case. The aminium radical cation in Chart 1 has excellent absorption and reflectance properties for a reflective optical switch layer, such as, for example, in a 100 nm thick layer of 100% IR-99 on PET film, where it has no significant absorption at wavelengths of 1250 nm and higher, while having a reflectance in the range of 3 to 20% over the 1250 to 1700 nm region for a single reflective optical switch layer. Multiple reflective switch layers comprising the organic free radical compounds with layers that are non-reflective interposed between the reflective, organic free radical-containing layers, may be utilized to increase the amount of reflectance to 80% and higher by forming a reflective stack comprised of multiple individual layers comprising reflective free radical compounds.

The optical devices of this invention typically reversibly switch to a transparent and non-reflective state by either a photon-induced or an electrically-induced addition of one or more electrons, i.e., by an electron transfer reaction. Thus, these optical devices have the flexibility of being driven by either photons from a light source or by electrical drivers, as electrical drivers are known in the art of electro-optic devices. Chart 2 shows the chemical structure of the leuco or transparent amine formed by one electron "bleaching" of the aminium-type infrared absorber for a reflective optical switch element, as shown in Chart 1.

Chart 2

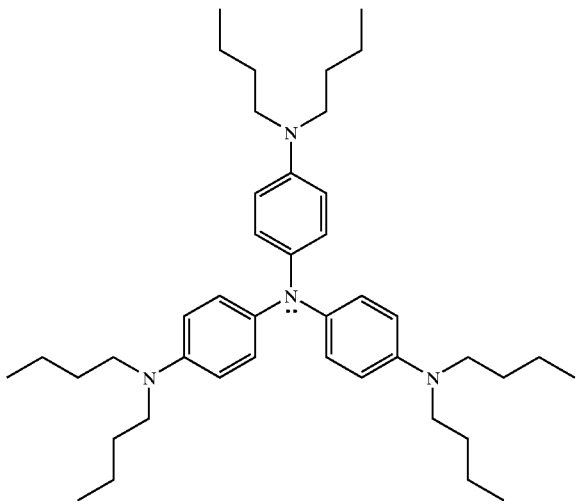

Transparent Amine from "Bleaching" of IR Absorber for Reflective Optical Switch

It can be seen by comparing Charts 1 and 2 that the switching from the reflective, infrared-absorbing aminium radical cation of Chart 1 to the non-reflective, non-infrared-absorbing amine compound of Chart 2 occurs with the addition of a single electron and that the reversal of this process by taking away a single electron in an one-electron oxidation state will convert the amine of Chart 2 back to the aminium radical cation of Chart 1. Thus, in basic terms, in the optical devices of this invention, only electrons need to move. The optical devices of this invention are solid state devices with no moving parts, unless optional moving parts are desired for some reason. Also, since the switching of the organic free radical compounds, such as aminium free radical compounds, may involve only the addition or removal of electrons and can be induced with photons as well as by the application of an electric current, the wide variety of processes for reversibly imaging the optical devices that utilize these optical shutters or switches of this invention is evident. These include, but are not limited to, reversible switching by photons, preferably photons of different wavelengths for each direction (reduction or oxidation) of switching; photons to switch in one direction and a thermal or "dark" reaction to switch back in the other direction; and by the addition and removal of electrons by the application of an electric current at an appropriate voltage.

Since the absorption of photons by the free radical compounds, such as, for example, by aminium compounds, may result in a photon-induced electron transfer reaction, optical devices comprising organic free radical compounds may also be utilized in many other applications where a photon-induced flow of electrons is critical. Examples of these other applications include, but are not limited to, photodetectors to convert an incoming optical signal into an electrical signal, for example, either to measure the intensity of the optical signal or to do an optical-to-electrical conversion, as known in the art of fiber optic communication systems; and solar cells where the incident sunlight is converted into an electrical current, as known in the art of photovoltaic solar cells. For solar cells, organic free radical compounds, such as salts of aminium radical cations, are advantageous for their intense absorption of sunlight above 800 nm and out to wavelengths over 2000 nm, which are infrared wavelength regions where conventional inorganic photovoltaics, such as silicon solar cells, are very inefficient in collecting the incident solar radiation. For solar cells, the organic free radical compounds may be used in combination with other organic free radical compounds and/or with inorganic and other known photovoltaics to achieve the optimum efficiency of solar energy conversion. For example, a layer comprising an organic free radical compound may be deposited over a layer of an inorganic photovoltaic material to provide a solar cell with increased solar energy conversion efficiency and also durability, since the organic free radical compounds, such as the salts of aminium radical cations, may be utilized as stabilizing materials, such as is known in the art of optical disks such as DVD disks.

Also, the photon-induced electron transfer reactions of organic free radical compounds, such as, for example, salts of aminium compounds, may be utilized for dye-sensitized splitting of water, as known in the art of solar energy conversion to form hydrogen from water. The extended absorption range of the organic free radical compounds in the infrared range that is useful in photovoltaic solar cells is also useful for this aspect of solar energy conversion that involves splitting water to form hydrogen. The organic free radical compounds may be utilized alone or in combination with other organic free radical compounds or other non-free radical dyes to sensitize the splitting of water, especially to provide efficient absorption of the solar radiation in the visible region where many of the organic free radical compounds do not have the broad, intense absorptions that they have in the infrared and ultraviolet wavelength regions. One aspect of this involves complexing of the one or more sensitizing dyes to an inorganic oxide layer such as a titanium oxide sol gel. Since the inorganic oxide layers are typically positively charged, anionic sensitizing dyes and other anionic compounds will complex readily, but typically the radical cation compounds can only be complexed by first complexing an anionic compound with multiple anions to the inorganic oxide layer and then complexing the positively charged radical cation compounds to the non-complexed anionic moieties that are still available from the complexed anionic compound.

Also, since organic free radical compounds, such as, for example, salts of aminium radical cations, may be converted from one distinct state to another by the addition or removal of an electron, they may be utilized in electrical devices where electrons are stored and then removed. Preferred organic free radical compounds in such electrical devices are non-polymeric organic free radical compounds which are monomeric with no repeating moiety in their chemical structure, such as, for example, salts of aminium radical cations such as, for example, IR-99 and IR-126. Besides providing stable materials to which to add or remove an electron to form other typically stable materials, many of the organic free radical compounds, particularly the anion radical salts and cation radical salts, have some level of electrically conductive properties in the free radical state and typically become non-conductive when reversibly converted to a non-free radical state. Where the electrical conductivity of the organic free radical compounds in any of their switched states, before or after the application of an electrical current, is not sufficient by itself to provide the desired efficiency and speed of switching, other electrically conductive materials may be added to the active layer of the electrically-driven devices comprising an organic free radical compound to promote the desired electrically-induced reaction. Examples of suitable electrically conductive materials to add to the devices comprising an organic free radical compound include, but are not limited to, vanadium (V) oxide, vanadium (IV) oxide, antimony-doped tin oxide, indium-doped tin oxide, sulfonated polystyrenes, and polydioxythiophenes. Also, the voltages and current required to electrically induce switching in the organic free radical compounds are typically very low, such as 1 to 4 volts or less at a low current.

Thus, electrical devices comprising organic free radical compounds, particularly comprising salts of aminium radical cations, may be utilized in a variety of electrical devices including, but not limited to, batteries and single electron transistors. Due to the ability of the organic free radical compounds to generally operate effectively in submicron sizes, they may be utilized for quantum well, quantum dot, and quantum wire configurations for single electron transistors and for other electrical devices, such as, for example, in submicron devices as described in U.S. Pat. No. 6,121,075 to Yamashita; U.S. Pat No. 6,204,517 to Wu; U.S. Pat. No. 6,211,013 to Park, et al.; U.S. Pat. No. 6,221,720 to Fukuda; and 6,307,422 to Roesner, et al. The organic free radical compounds, such as, for example, the non-polymeric organic free radical compounds such as the salts of aminium radical cations, with their reversible electrochemistry and electroactive properties, may be utilized in battery electrodes, such as, for example, in positive electrodes with a negative electrode comprising lithium. The anion of the organic free radical cation compound may be changed to provide an anion with increased electroactive properties in order to greatly increase the energy density in the battery. For example, the hexafluoroantimonate anion of IR-165 could be replaced with an electroactive polysulfide anion, $S_x^{2-}$, where x is an integer greater than 2.

Also, since the reduction and oxidation of the organic free radical compounds may be induced by the absorption of photons, one aspect of the batteries comprising an organic free radical compound, preferably non-polymeric organic free radical compounds such as salts of aminium radical cations, pertains to a battery that may be recharged by exposure to photons, such as from the incident solar radiation, to provide a solar rechargeable battery.

Besides applications in optical switch fabrics for switching the output optical paths of optical signals, the optical shutters and optical switch devices of this invention may be utilized in a wide range of other optical devices, such as in optical buffers and optical chromatic dispersion compensators, that may utilize the switching of an optical signal from one path to another path where, for example, one of these paths involves circulating in a delay line.

A number of these other optical devices are variations of optical switch devices for specific applications. For example, as described herein, in one aspect of the optical buffers of the present invention, the optical buffers may be viewed as 1×N optical switch devices comprising an organic free radical compound, where N paths are recirculating "storage" paths which may be switched at ultrafast speeds, such as at nanosecond speeds back into the optical signal transmission path. The timing of the length of delay or storage in the optical buffer can be varied with multiples of the time slot of the optical signal transmission to provide "dynamic optical buffers." Besides resolving data contention and data routing issues, another application for these optical buffers is as dispersion compensators where the optical buffers function as dynamic delay lines to reduce the dispersion of the optical signals. Also, for example, in another aspect of the optical buffers of this invention, the optical buffer may utilize a 2×2 optical switch device comprising an organic free radical compound, to switch off the optical signal to a delay line in a buffering configuration such as, for example, described in Hunter et al., "Buffering in Optical Packet Switches," J. Lightwave Tech., Vol. 16, pp. 2081–2094 (1998). Thus, for example, a chromatic dispersion compensator may utilize an optical switch device of the present invention to provide a desired compensation or correction of the timing of an optical signal through switching into the appropriate dynamic and variable delay line to adjust for the different speeds of propagation of different wavelengths of the optical signals which causes chromatic dispersion in optical fibers and other optical transmission lines.

The delay lines utilized in the optical switch devices, including optical buffers and chromatic dispersion compensators, of this invention may be any optical fibers and other optical transmission lines, such as the various types of optical waveguides, which are known in the art of fixed or variable delay lines for optical signal transmissions, as for example described in U.S. Pat. No. 4,750,802 to Bhagavitula and U.S. Pat. No. 5,995,695 to Aikawa, et al. Preferred delay lines are single mode glass optical fibers, and more preferred delay lines are single mode, dispersion-compensated glass optical fibers.

A particularly advantageous aspect of this invention is the unique reflective switching properties of optical shutters and other optical devices comprising organic free radical compounds, particularly salts of aminium radical cations, and most preferably when the organic free radical compounds are reflective in a range of near-infrared wavelengths, but are not significantly absorptive or have no absorption in this same range of near-infrared wavelengths, as, for example, described herein in the case of IR-99.

Besides its advantageous use in a wide variety of optical switch devices, the reflective optical switches comprising organic free radical compounds of the present invention are suitable for optical devices for demultiplexing and multiplexing optical signals where different path lengths of the different wavelengths are produced through a reflective stack with multiple individual reflective switch layers of the unique type of the transparent-to-reflective optical shutters of this invention that comprise reflective organic free radical compounds. This unique reflective stack comprising reflective organic free radical compounds is in contrast to a reflective stack based on alternating layers of specific layer thicknesses and differences in index of refraction, as known in the art of mirrors. In addition, the reflective stack of the optical shutters and switch devices of this invention and the optical devices based on these reflective stacks are dynamic and are reversibly switchable from an "on" state to an "off" state, in contrast to the passive nature of conventional reflective stacks such as those that utilize index of refraction and layer thickness effects. Besides optical devices for demultiplexing and multiplexing, the reflective stacks of the reflective optical shutters and switch devices of this invention, may be utilized for interference filters where, after demultiplexing which puts each wavelength in a unique position apart from the other wavelengths, an optical switch may be utilized for each wavelength to drop it, if desired, by switching it to a desired output path or, if desired, to discard it by using an absorptive optical shutter, such as the transparent-to-opaque optical shutters of this invention. Similarly, in a multiplexing mode, the reflective stacks of the reflective optical shutters of this invention may be utilized to add one or more wavelengths.

One particularly unique aspect of the optical shutters, optical switch devices, and optical buffers of this invention are the transparent and non-reflective-to-reflective optical shutters, optical switch devices, and optical buffers comprising a reflective organic free radical compound, most particularly when the reflective organic free radical compound has no absorption at the wavelengths where the reflective switching occurs. These unique properties of reflecting optical signals while having no absorption of the optical signals is particularly useful for avoiding degradation by absorption of photons by the optical device, for minimizing the insertion loss of the optical signal being switched or transmitted, and for maximizing the contrast ratio of the output signal between the "switched" and "non-switched" states. Besides the solid state, "no moving parts" aspect of the optical shutters, optical switch devices, and optical buffers of this invention in contrast to the moving nature of other reflective optical switches such as, for example, those based on microelectromechanical system (MEMS) devices, these optical devices comprising reflective organic free radical compounds of this invention are unique and useful in involving actually reflective materials to reflect in a passive function and to also switch in a dynamic reflective mode, in contrast to the use of multiple layers of materials of differing indices of refraction to provide reflection or mirror-like properties in a passive form or dynamically if a mechanical motion of the layers is induced.

Thus, the optical shutters and optical devices of this invention comprising a reflective organic free radical compound provide unique classes of passive and dynamic reflective optical shutters and devices. For example, applications for the unique reflective materials and optical devices of this invention include, but are not limited to, optical demultiplexing and multiplexing devices, electro-reflective modulators, and optical projection devices for computer, movie, high definition television (HDTV), and other digital projection devices.

For example, in addition to the description of optical demultiplexing and multiplexing hereinabove, the unique multiple reflective layer or reflective stack configurations of the optical shutters and optical switch devices of this invention may be adapted for use in providing a demultiplexing and a multiplexing optical component where individual wavelengths travel different distances through the optical component comprising a reflective stack that comprises a reflective material, such as an organic free radical compound, and, with the optional use of a lens, may then arrive at a certain plane of the optical waveguide or other optical transmission matrix with each specific wavelength at a different two-dimensional position and thus available to be coupled into a specific output path in the case of demultiplexing. Conversely, when the optical signals are demultiplexed and have a different two-dimensional position in a certain plane of the optical waveguide or other optical transmission matrix, the optical signals may be multiplexed by passing through the optical component comprising a reflective stack of multiple layers of a reflective material of this invention. Since the optical shutters and optical devices comprising a reflective stack of the present invention may be reversibly switched from non-reflective and transparent to reflective at a variety of wavelengths, optical demultiplexing and multiplexing devices based on such reflective stacks would be unique in being dynamic and capable of being switched from demultiplexing and/or multiplexing in the reflective state to be transmissive in the non-reflective and transparent state. This feature could be utilized in transmitting or switching the optical signal to another output path that is different from the output path from demultiplexing or multiplexing.

Also, for example, the reflective optical shutters comprising a reflective material, such as a reflective organic free radical compound, of the present invention are adapted to provide a unique "electro-reflective" modulator, where the optical modulator is reversibly switched by the injection and removal of electrons, such as by the application of an electric current, and where the switching is from non-reflective and transparent to reflective states. Preferred electro-reflective modulators are those where the reflective material reflects but does not absorb at the wavelengths that are being modulated. This preferred embodiment has features such as, for example, of reduced exposure of the modulator to incident photons that may cause degradation and of reduced insertion loss of the reflected optical signals.

Further, for example, the reflective optical shutters and optical switch devices of this invention may be utilized in a variety of applications for mirror-like reflectivity where MEMS devices are now utilized, such as, for example, in optical switch devices and in reflective elements for projectors for computers, movies, HDTV, and other digital projection applications, as for example described in U.S. Pat. No. 5,943,157 to Florence, et al. for a deformable mirror device (DMD) for digital display devices.

The preferred optical transmission configuration for the optical shutters and optical switch devices of this invention is a waveguide configuration, especially when a three-dimensional configuration, such as, for example, as described in regards to a large optical switch array such as shown in FIG. 9 with multiple planes of optical switch devices. Besides utilizing silica, polymer, sol gel, and other waveguide materials as known in the art of optical waveguides, the optical shutters and optical switch devices of this invention may utilize an optical waveguide comprising a material selected from the group consisting of organic free radical compounds and non-free radical products by electron transfer reaction of an organic free radical compound. Preferred materials for the optical waveguides of this invention are non-free radical products by electron transfer reaction of an organic free radical compound. These non-free radical products are typically in the non-reflective and transparent state and thus are most suitable for high transmission efficiencies and low insertion losses in an optical waveguide. Other advantages of using these non-free radical products are that they may be activated only in the areas desired to be active switching areas by providing the appropriate access to the source of external energy for switching and, if needed, by doping in a specific desired area with one or more materials to activate the waveguide to switching; and they typically have similar indices of refraction to the corresponding organic free radical compounds so that coupling losses and other optical signal degradations between the passive optical waveguide and the dynamic optical shutters are minimized. For example, electrode tabs could be provided in the region of the optical shutter for switching electrically, or a sensitizing dye could be doped into the waveguide in the region of the optical shutter for switching photolytically. Also, for example, aminium free radical compounds and their non-free radical products from electron transfer reactions typically have an index of refraction in the range of 2.2 to 2.8, and this relatively high index of refraction is useful in preventing losses of the optical signal from an optical waveguide comprising these aminium-type compounds.

Another advantage of the organic free radical compounds is the excellent intensity of their absorption and reflectance properties which permit the optical shutters and optical switch devices of this invention to be very small. For example, an individual optical shutter may be less than 1 micron in the optical path length direction and also less than 1 micron in the orthogonal directions, if desired and consistent with transmission and coupling of the optical shutter into the overall optical system.

The sub-wavelength size of the active optical shutters and optical devices of this invention, such as, for example, 0.5 to 1.0 micron dimensions in contrast to the 1.3 to 1.7 micron wavelength of the optical signal in many applications, lends itself to integration with a variety of waveguide materials, including, for example, waveguide materials comprising the reaction products of an organic free radical compound, as described hereinabove. Also, since optical amplifiers may comprise organic free radical compounds, as for example described in co-pending U.S. patent application Ser. No. 09/944,935, filed Aug. 31, 2001, to Carlson of the common assignee, the disclosure of which is fully incorporated herein by reference, the sub-wavelength integration of the optical components may extend from optical shutters and optical switch devices to include optical amplifiers and optical lasers, where the optical lasers would also operate on the same principle of stimulated emission from an organic free radical compound, such as, for example, an aminium radical cation compound having a strong luminescence.

Also, for example, as described in one embodiment in U.S. patent application Ser. No. 09/706,166, filed Nov. 3, 2000, to Carlson of the common assignee, optical shutters, such as the optical shutters and switch devices of the present invention, may be utilized in optical serial-to-parallel converters to convert a serial optical signal transmission into a parallel optical signal pattern. In addition, a 1×N optical switch device of this invention, which had a switching speed fast enough to do per-bit switching, would also provide an optical serial-to-parallel converter to convert a serial optical signal transmission into a parallel optical signal pattern. This parallel optical signal pattern may be utilized to switch an optical switch device as described in the '166 patent application referenced above or to switch one or more optical shutters in another optical switch device. For example, if an optical switch device, such as for example that shown in FIG. 9 and as further described for FIG. 9 herein as a three-dimensional (3-D) optical switch array with 80 planes of optical switch devices, had transparent-to-opaque optical shutters instead of non-reflective-to-reflective optical shutters, the optical switch device would be switched to either an absorptive or a transparent state for each optical shutter and may thereby operate as an optical storage memory device. The state of each optical shutter could be read from a different direction by an incident optical source of a chosen wavelength, such as the same as the original wavelength of the serial optical signal transmission or a different wavelength if desired. This "read" step could then utilize an optical parallel-to-serial converter to provide the output optical signal into a serial optical signal transmission, if desired. This optical parallel-to-serial converter could operate in a reverse process to the optical serial-to-parallel converter. For example, an ultrafast N×1 optical switch device, such as one comprising the double-sided reflective optical shutters of this invention, could be interposed between the optical storage memory device and the output serial optical signal transmission to convert the parallel pattern of the "read" optical signals to a serial optical signal transmission.

Thus, this optical converter technology leads to optical storage where the parallel or 2-D optical signal with its specific location can be used, probably with wavelength conversion by frequency multiplying and with amplification, to switch or image a specific location in a 3-D storage medium containing picosecond-speed transparent-to-opaque optical shutters, such as for example the transparent-to-opaque optical shutters of this invention. The transparent-to-opaque optical shutters are typically not sensitive to the optical Internet wavelengths in the near-infrared so the photons to expose the optical shutters in a "write" step may need to be converted to a lower wavelength such as for example about 775 nm or about 515 nm. Similarly, an "erase" step may need different wavelengths, such as another wavelength in the range of 350 to 800 nm, for reversing the imaging of the "write" step. The light sources for the write, read, and erase steps may be located orthogonally to each other or at other relative angles, as is known in the art of optical data storage. The wavelength of the read step may be the same as the wavelength of the original incoming optical signal or it may be changed to another wavelength to provide per-packet wavelength conversion. In such an optical storage medium with an ultrafast 3-D optical switch array with photon-activated optical shutters, the write step could be used to switch from one state to another, such as from opaque to transparent, and, if the light for this write step is split and converted to the required wavelength for the erase step, this split signal could be delayed slightly, such as by utilizing the optical buffers of this invention, and used to reverse the optical shutter at the specific 3-D location back to its original state. This type of control of optical shutters using a portion of the optical signal being transmitted is described further in the '166 application referenced above.

Thus, the optical shutters and optical switch devices of this invention have the features of being able to be integrated into an optical bench or chip where nearly all or all of the optical components from passive components such as waveguides to the active components from lasers, modulators, amplifiers, switch fabrics, multiplexers, demultiplexers, dispersion compensators, taps, gain filters or variable optical attenuators, buffers, wavelength converters, detectors, serial-to-parallel converters, parallel-to-serial converters, optical storage memory, and other dynamic optical components, are integrated into one monolithic unit in either a planar or a three-dimensional configuration. This integration could be done on a substrate, such as, for example, on a silicon substrate for further integration with the purely electrical components of the optical system. All of these integrated components may optionally comprise an organic free radical compound or an electron-transfer reaction product of an organic free radical compound as an active material in the case of dynamic optical components and as a passive material in the case of passive optical components such as an optical waveguide.

The applications for the optical shutters and optical switch devices of this invention extend beyond Internet transmission applications and include, but are not limited to, applications for optical interconnects where optical signal transmission and detection is used to very rapidly move signals from one point to another, such as in very high speed computing where the use of all-electrical devices does not provide adequate bandwidth, speed, and thermal and power characteristics.

While the invention has been described in detail and with reference to specific and general embodiments thereof, it will be apparent to one skilled in the art that various changes and modifications can be made therein without departing from the spirit and scope thereof.

What is claimed is:

1. An optical buffer for storing an optical signal for a desired time, said optical buffer comprising two or more optical shutters positioned at one or more first distances and one or more first angles from each other, wherein said two or more optical shutters are imageable and have a first state of a low reflection at a wavelength and a second state of a high reflection at said wavelength, and wherein said two or more optical shutters are reversibly imageable between said first and second states;

wherein at least two of said two or more optical shutters are interposed between an input optical path for said optical signal and an output optical path for said optical signal, and wherein a first imaging between said first and second states of at least one of said at least two of said two or more optical shutters directs said optical signal into storage in an optical buffer path between said input and output optical paths and wherein a subsequent imaging between said first and second states of at least one of said at least two of said two or more optical shutters directs said optical signal from said optical buffer path into said output optical path.

2. The optical buffer of claim 1, wherein said first imaging is from said first state to said second state.

3. The optical buffer of claim 2, wherein said subsequent imaging is from said second state to said first state.

4. The optical buffer of claim 1, wherein said first imaging is from said second state to said first state.

5. The optical buffer of claim 4, wherein said subsequent imaging is from said first state to said second state.

6. The optical buffer of claim 1, wherein said two or more optical shutters in said second state comprise an organic free radical compound.

7. The optical buffer of claim 1, wherein said two or more optical shutters are reversibly imageable between said first and second states by an absorption of photons.

8. The optical buffer of claim 1, wherein said two or more optical shutters are imageable from said second to said first state by an absorption of photons and are reversibly imageable from said first state to said second state by a thermal reaction after said absorption of photons.

9. The optical buffer of claim 1, wherein said two or more optical shutters are reversibly imageable between said first and second states by applying an electric current.

10. The optical buffer of claim 1, wherein the speed of imaging between said second state and said first state is from 0.5 picoseconds to 100 nanoseconds, and wherein the speed of imaging between said first state and said second state is from 0.5 picoseconds to 100 nanoseconds.

11. The optical buffer of claim 1, wherein the speed of imaging between said second state and said first state is from 1 picosecond to 100 picoseconds, and wherein the speed of imaging between said first state and said second state is from 1 picosecond to 100 picoseconds.

12. The optical buffer of claim 1, wherein said wavelength is from 1250 nm to 1750 nm.

13. The optical buffer of claim 1, wherein said optical buffer is an input optical buffer with said output optical path directed to an optical switch device having two or more output optical paths.

14. The optical buffer of claim 13, wherein said optical buffer is switched to store one or more first optical signals, which one or more first optical signals have a timing contention with one or more second optical signals for switching at the same time to a specified output optical path of said optical switch device.

15. The optical buffer of claim 14, wherein said optical buffer is subsequently switched to release said one or more first optical signals from storage in said optical buffer and to direct said one or more first optical signals to said optical switch device.

16. The optical buffer of claim 15, wherein said one or more first optical signals are subsequently switched to said specified output optical path of said optical switch device.

17. The optical buffer of claim 1, wherein said optical buffer is a chromatic dispersion compensation device.

18. The optical buffer of claim 17, wherein said output optical path of said chromatic dispersion compensation device is connected to a polarization dispersion compensation device prior to a multiplexing of said optical signal with one or more other optical signals.

19. The optical buffer of claim 18, wherein said polarization dispersion compensation device further comprises a variable optical attenuator.

20. The optical buffer of claim 18, wherein an optical amplifier is interposed between said chromatic dispersion compensation device and said polarization dispersion compensation device.

21. The optical buffer of claim 18, wherein an optical amplifier is interposed between said polarization dispersion compensation device and a multiplexer.

22. The optical buffer of claim 21, wherein a variable optical attenuator is interposed between said optical amplifier and said multiplexer.

23. The optical buffer of claim 1, wherein said two or more optical shutters comprise an organic free radical compound.

24. The optical buffer of claim 23, wherein at least one of said two or more optical shutters absorbs photons to form a reaction product of said free radical compound, which reaction product has a change in reflection at said wavelength.

25. The optical buffer of claim 24, wherein said reaction product undergoes a reverse reaction to regenerate said free radical compound.

26. The optical buffer of claim 1, wherein said two or more optical shutters comprise a surface layer having a low reflectivity state at said wavelength, wherein said two or more optical shutters absorb photons to form a surface layer having a high reflectivity state at said wavelength.

27. The optical buffer of claim 26, wherein said two or more optical shutters undergo a reverse reaction of said high reflectivity state to regenerate said low reflectivity state.

28. The optical buffer of claim 1, wherein said two or more optical shutters comprise a surface layer having a high reflectivity state at said wavelength, wherein said two or more optical shutters absorb photons to form a surface layer having a low reflectivity state at said wavelength.

29. The optical buffer of claim 28, wherein said two or more optical shutters undergo a reverse reaction of said low reflectivity state to regenerate said high reflectivity state.

30. The optical buffer of claim 1, wherein said optical buffer comprises two or more reflective surfaces positioned at one or more second distances and one or more second angles from said two or more optical shutters to return said optical signal from said optical buffer path to at least one of said two or more optical shutters.

31. The optical buffer of claim 30, wherein said first distances, first angles, one or more second distances, and one or more second angles are selected to return said optical signal in said desired time to at least one of said two or more optical shutters interposed between said input optical path and said output optical path.

32. The optical buffer of claim 31, wherein said first distances, first angles, one or more second distances, and one or more second angles are adjustable to match changes in said desired time for storing said optical signal.

33. An optical buffer for storing an optical signal for a desired time, said optical buffer comprising two or more optical shutters, wherein said two or more optical shutters are imageable and have a first state of a low reflection at a near-infrared wavelength and a second state of a high reflection at said near-infrared wavelength, and wherein said two or more optical shutters are reversibly imageable between said first and second states;

wherein at least one of said two or more optical shutters is interposed between an input optical path for said optical signal and an output optical path for said optical signal, and wherein a first imaging between said first and second states of at least one of said two or more optical shutters directs said optical signal into storage in an optical buffer path between said input and output optical paths and wherein a subsequent imaging between said first and second states of at least one of said two or more optical shutters directs said optical signal from said optical buffer path into said output optical path.

34. The optical buffer of claim 33, wherein said two or more optical shutters in said second state comprise an organic free radical compound.

35. The optical buffer of claim 33, wherein said two or more optical shutters are reversibly imageable between said first and second states by an absorption of photons.

36. The optical buffer of claim 33, wherein said two or more optical shutters are imageable from said second state to said first state by an absorption of photons and are reversibly imageable from said first state to said second state by a thermal reaction after said absorption of photons.

37. The optical buffer of claim 33, wherein said two or more optical shutters are reversibly imageable between said first and second states by applying an electric current.

38. A method of storing an optical signal in an optical buffer for a desired time, said method comprising the steps of:

(i) providing one or more optical shutters interposed between an input optical path for said optical signal and an output optical path for said optical signal, wherein said one or more optical shutters are imageable and have a first state of a low reflection at a wavelength and a second state of a high reflection at said wavelength, and wherein said one or more optical shutters are reversibly imageable between said first and second states;

(ii) imaging at least one of said one or more optical shutters between said first and second states to direct said optical signal into storage in an optical buffer path between said input and output optical paths; and (iii) subsequently imaging at least one of said one or more optical shutters between said first and second states to direct said optical signal from storage in said optical buffer path into said output optical path.

39. The method of claim 38, wherein said optical buffer path in step (ii) comprises a first optical buffer path for said optical signal; and, after step (ii) and prior to step (iii), there is a step of imaging at least one of said one or more optical shutters in said first optical buffer path between said first and second states to direct said optical signal from said first optical buffer path into storage in a second optical buffer path; and wherein step (iii) subsequently images at least one of said one or more optical shutters between said first and second states to direct said optical signal from storage in said second optical buffer path into said output optical path.

40. The method of claim 39, wherein said one or more optical shutters of step (i) are interposed between an input optical path for said optical signal and two or more output optical paths for said optical signal; and wherein said second optical buffer path is associated with a specific output optical path of said two or more output optical paths, and wherein step (iii) directs said optical signal from storage in said second optical buffer path into said specific output optical path.

41. The method of claim 38, wherein said one or more optical shutters of step (i) are interposed between an input optical path for said optical signal and an optical switch device having two or more output optical paths.

42. The method of claim 38, wherein said one or more optical shutters in said second state comprise an organic free radical compound.

43. The method of claim 38, wherein said one or more optical shutters are reversibly imageable between said first and second states by an absorption of photons.

44. The method of claim 38, wherein said one or more optical shutters are imageable from said second state to said first state by an absorption of photons and are reversibly imageable from said first state to said second state by a thermal reaction after said absorption of photons.

45. The method of claim 38, wherein said one or more optical shutters are reversibly imageable between said first and second states by applying an electric current.

* * * * *